US007440942B2

(12) United States Patent
Dixon et al.

(10) Patent No.: US 7,440,942 B2
(45) Date of Patent: Oct. 21, 2008

(54) DATABASE MANIPULATIONS USING GROUP THEORY

(75) Inventors: Heidi E. Dixon, Eugene, OR (US); Matthew L. Ginsberg, Eugene, OR (US); David Hofer, Eugene, OR (US); Eugene M. Luks, Eugene, OR (US)

(73) Assignee: The State of Oregon Acting by and Through the State Board of Higher Education on Behalf of the University of Oregon, Eugene, OR (US)

( * ) Notice: Subject to any disclaimer, the term of this patent is extended or adjusted under 35 U.S.C. 154(b) by 262 days.

(21) Appl. No.: 10/989,982

(22) Filed: Nov. 15, 2004

(65) Prior Publication Data

US 2005/0177558 A1   Aug. 11, 2005

Related U.S. Application Data

(63) Continuation-in-part of application No. 10/773,351, filed on Feb. 5, 2004.

(51) Int. Cl.
*G06F 7/00* (2006.01)
*G06F 17/30* (2006.01)
(52) U.S. Cl. .............................. 707/5; 707/4
(58) Field of Classification Search ...................... 707/3; 706/19, 45
See application file for complete search history.

(56) References Cited

U.S. PATENT DOCUMENTS 6,556,978 B1 *   4/2003   Ginsberg et al. .............. 706/19
6,601,058 B2 *   7/2003   Forster et al. .................. 707/3
6,886,153 B1 *   4/2005   Bevis .......................... 716/19
6,912,700 B1 *   6/2005   Franco et al. .................. 716/5
2003/0046061 A1 *   3/2003   Preston et al. ................. 704/9
2004/0019468 A1 *   1/2004   De Moura et al. ............. 703/2

(Continued)

OTHER PUBLICATIONS

Aloul, F., Ramani, A., Markov, I., and Sakallah, K., PBS: A Backtrack Search Pseudo-Boolean Solver, Fifth International Symposium on the Theory and Applications of Satisfiability Testing, May 6-9, 2000, pp. 346-353.

Babai, L., Luks, E., and Seress, A., Fast Management Of Permutation Groups I, Siam J. On Computing, 1997, vol. 1, No. 1, pp. 1-33.

(Continued)

*Primary Examiner*—Apu Mofiz
*Assistant Examiner*—Susan Y. Chen
(74) *Attorney, Agent, or Firm*—Fenwick & West LLP

(57) ABSTRACT

Data in a database describe an application domain such as a satisfiability problem. The data are represented in a manner that expresses the structure inherent in the data and one such representation uses group theory and represents the data as one or more "augmented clauses," where each clause has a pair (c, G) including a database element c and a group G of group elements g acting on it. A query is encoded in a group theory representation and is executed on the group theory representation of the data to identify database elements and associated group elements satisfying the query. If desired, the satisfying database elements are converted from the group theory representation to the native representation of the data.

27 Claims, 11 Drawing Sheets

OTHER PUBLICATIONS

Baker, A. B., The Hazards Of Fancy Backtracking, In Proceedings of the Twelfth National Conference on Artificial Intelligence, 1994.

Barth, P., A Davis-Putnam Based Enumeration Algorithm For Linear Pseudo-Boolean Optimization, Technical Report MPI-I-95-2-003, Max Planck Institut fur Informatik, Saarbrucken, Germany, Jan. 1995.

Baumgartner, P., FDPLL—A First-Order Davis-Putnam-Logeman-Loveland Procedure, In D. McAllester, editor, CADE-17 The 17th International Conference on Automated Deduction, vol. 1831, pp. 200-219. Springer, 2000.

Baumgartner, P. and Massacci, F., The Taming of the (X)OR, In J. Lloyd, V. Dahl, U. Furbach, M. Kerber, K.-K. Lau, C. Palamidessi, L. M. Pereira, Y. Sagiv, and P. J. Stuckey, editors, Computational Logic—CL 2000, vol. 1861, pp. 508-522. Springer, 2000.

Bayardo, R. J. and Miranker, D. P., A Complexity Analysis Of Space-Bounded Learning Algorithms For The Constraint Satisfaction Problem, In Proceedings of the Thirteenth National Conference on Artificial Intelligence, pp. 298-304, 1996.

Bayardo, R. J. and Schrag, R. C., Using CSP Look-Back Techniques To Solve Real-World SAT Instances, In Proceedings of the Fourteenth National Conference on Artificial Intelligence, pp. 203-208, 1997.

Beame, P. and Pitassi, T., Propositional Proof Complexity: Past, Present And Future, In G. Paun, G. Rozenberg, and A. Salomaa, editors, Current Trends in Theoretical Computer Science, Entering the 21th Century, pp. 42-70. World Scientific, 2001.

Biere, A., Clarke, E., Raimi, R., and Zhu, Y., Verifying Safety Properties Of A PowerPC Microprocessor Using Symbolic Model Checking Without BDDs, Lecture Notes in Computer Science, 1633, 1999.

Bonet, M. L., Pitassi, T., and Raz, R., Lower Bounds For Cutting Planes Proofs With Small Coefficients, Journal of Symbolic Logic, 62(3):708-728, 1997.

Bryant, R. E., Graph-Based Algorithms For Boolean Function Manipulation, IEEE Trans. Comput., C-35(8):677-691, Aug. 1986.

Bryant, R. E., Symbolic Boolean Manipulation With Ordered Binary-Decision Diagrams, ACM Computing Surveys, 24(3):293-318, Jun. 1992.

Buchberger, B., Ein Algorithms Zum Auffinden Der Basiselemente Des Restklassenringes Nach Einum Nulldimensionalen Polynomideal, PhD thesis, University of Innsbruck, Innsbruck, 1965.

Cadoli, M., Schaerf, M., Giovanardi, A., and Giovanardi, M., An Algorithm To Evaluate Quantified Boolean Formulae And Its Experimental Evaluation, Journal of Automated Reasoning, 28(2):101-142, 2002.

Chai, D. and Kuehlmann, A., A Fast Pseudo-Boolean Constraint Solver, In Proceedings of the 40th Design Automation Conference, pp. 830-835, 2003.

Clegg, M., Edmonds, J., and Impagliazzo, R., Using The Groebner Basis Algorithm To Find Proofs Of Unsatisfiability, In Proceedings of the Twenty-Eighth Annual ACM Symp. on Theory of Computing, pp. 174-183, 1996.

Coarfa, C., Demopoulos, D. D., San Miguel Aguirre, A., Subramanian, D. and Vardi, M., Random 3-SAT: The Plot Thickens, In Proceedings of the International Conference on Constraint Programming, 2000.

Cook, S. A., The Complexity Of Theorem-Proving Procedures, In Proceedings of the 3rd Annual ACM Symposium on the Theory of Computing, pp. 151-158, 1971.

Copty, F., Fix, L., Fraer, R., Giunchiglia, E., Kamhi, G., Tacchella, A., and Vardi, M., Benefits Of Bounded Model Checking In An Industrial Setting, In 13th Conference on Computer Aided Verification, CAV'01, Paris, France, Jul. 2001.

Crawford, J. M., A Theoretical Analysis Of Reasoning By Symmetry In First-Order Logic, (Extended Abstract), In AAAI Workshop on Tractable Reasoning, 1992.

Crawford, J. M. and Auton, L. D., Experimental Results On The Crossover Point In Random 3SAT, Artificial Intelligence, 81:31-57, 1996.

Crawford, J. M., Ginsberg, M. L., Luks, E., and Roy, A., Symmetry Breaking Predicates For Search Problems, In Proceedings of the Fifth International Conference on Principles of Knowledge Representation and Reasoning, Boston, MA, 1996.

Dixon, H. E. and Ginsberg, M. L., Combining Satisfiability Techniques From AI And OR, Knowledge Engrg. Rev., 15:31-45, 2000.

Dixon, H., Ginsberg, M., and Parkes, A., Generalizing Boolean Satisfiability I: Background and Survey of Existing Work, Journal of Artificial Intelligence Research 21 (Feb. 2004) 193-243.

Dixon, H. E. and Ginsberg, M. L., Inference Methods For A Pseudo-Boolean Satisfiability Solver, In Proceedings of the Eighteenth National Conference on Artificial Intelligence, 2002.

Dubois, O. and Dequen, G., A Backbone-Search Heuristic For Efficient Solving Of Hard 3-SAT Formulae, In Proceedings of the Seventeenth International Joint Conference on Artificial Intelligence, pp. 248-253, 2001.

East, D. and Truszczynski, M., Propositional Satisfiability In Answer-Set Programming, Lecture Notes in Computer Science, 2174, 2001.

East, D. and Truszczynski, M., Propositional Satisfiability In Declarative Programming, Extended version of papers that appeared in Proceedings of AAA1-2000, and Proceedings of K1-2001. http://xxx.lanl.gov/abs/cs.LO/0211033, Nov. 2002.

Freeman, J. W., Improvements To Propositional Satisfiability Search Algorithms, PhD thesis, University of Pennsylvania, PA, 1995.

Frost, D. and Dechter, R., Dead-End Driven Learning, In Proceedings of the Twelfth National Conference on Artificial Intelligence, pp. 294-300, 1994.

GAP, GAP—Groups, Algorithms and Programming, The GAP Group, 2003, http://www-gap.dcs.st-and.ac.uk/gap.

Gelfond, M. and Lifschitz, V., The Stable Model Semantics For Logic Programming, In Proceedings of the 5th International Conference on Logic Programming, pp. 1070-1080. MIT Press, 1988.

Ginsberg, M. L., Dynamic Backtracking, Journal of Artificial Intelligence Research, 1:25-46, 1993.

Ginsberg, M. L. and Geddis, D. F., Is There Any Need For Domain-Dependent Control Information? In Proceedings of the Ninth National Conference on Artificial Intelligence, 1991.

Ginsberg, M. L. and Parkes, A. J., Search, Subsearch and QPROP, In Proceedings of the Seventh International Conference on Principles of Knowledge Representation and Reasoning, Breckenridge, Colorado, 2000.

Goldberg, E. and Novikov, Y., BerkMin: A Fast And Robust SAT Solver, In Design Automation and Test in Europe (DATE), pp. 142-149, 2002.

Guignard, M. and Spielberg, K., Logical Reduction Methods In Zero-One Programming, Operations Research, 29, 1981.

Haken, A., Counting Bottlenecks To Show Monotone P ≠NP, In Proceedings 36th Annual IEEE Symp. on Foundations of Computer Science (FOCS-95), pp. 38-40, Milwaukee, MN, 1995. IEEE.

Harrision, M. A., Introduction To Switching And Automata Theory, McGraw-Hill, 1989.

Hooker, J. N. and Vinay, V., Branching Rules For Satisfiability, J. Automated Reasoning, 15:359-383, 1995.

Joslin, D. and Roy, A., Exploiting Symmetry In Lifted CSPs, In Proceedings of the Fourteenth National Conference on Artificial Intelligence, pp. 197-202, 1997.

Kautz, H. and Selman, B., Blackbox: A New Approach To The Application Of Theorem Proving To Problem Solving, In Artificial Intelligence Planning Systems: Proceedings of the Fourth International Conference. AAAI Press, 1998.

Kautz, H. A. and Selman, B., Planning As Satisfiability, In Proceedings of the Tenth European Conference on Artificial Intelligence (ECAI'92), pp. 359-363, 1992.

Kirkpatrick, S. and Selman, B., Critical Behavior In The Satisfiability Of Random Boolean Formulae, Science, 264:1297-1301, 1994.

Knuth, D. E., Notes On Efficient Representation Of Permutation Ggroups, Combinatorica, 11:57-68, 1991.

Kraj'icek, J., Interpolation Theorems, Lower Bounds For Proof Systems, And Independence Results For Bounded Arithmetic. J. Symb. Logic, 62(2):457-486, 1997.

Krishnamurthy, B., Short Proofs For Tricky Formulas, Acta Informatica, 22(3):253-275, 1985.

Leone, N., Pfeifer, G. et al, The DLV System For Knowledge Representation And Reasoning, Technical Report 1843-02-14, Technical University of Vienna, 2002.

Li, C. M., Integrating Equivalency Reasoning Into Davis-Putnam Procedure, In Proceedings of the Seventeenth National Conference on Artificial Intelligence, pp. 291-296, 2000.

Li, C. M. and Anbulagan, Heuristics Based On Unit Propagation For Satisfiability Problems, In Proceedings of the Fifteenth International Joint Conference on Artificial Intelligence, pp. 366-371, 1997.

Luks, E. and Roy, A., Symmetry Breaking In Constraint Satifaction, In Intl. Conf. of Artificial Intelligence and Mathematics, Ft. Lauderdale, Florida, 2002.

Luks, E. M., Permutation Groups and Polynomial-Time Computation, vol. 11 of DIMACS Series in Discrete Mathematics and Theoretical Computer Scienc,e, pp. 139-175, Amer. Math. Soc., 1993.

Marek, V. W. and Truszczynski, M., Stable Models And An Alternative Logic Programming Paradigm, 1999.

McCune, W. and Wos, L., Otter—the CADE-13 Competition Incarnations, Journal of Automated Reasoning, 18(2):211-220, 1997.

Mitchell, D. G., Hard Problems For CSP Algorithms, In Proceedings of the Fifteenth National Conference on Artificial Intelligence, pp. 398-405, 1998.

Moskewicz, M., Madigan, C., Zhao, Y., Zhang, L., and Malik, S., Chaff: Engineering An Efficient SAT Solver, In 39th Design Automation Conference, 2001.

Niemela, I., Logic Programs With Stable Model Semantics As A Constraint Programming Paradigm, Annals of Mathematics and Artificial Intelligence, 25:241-273, 1999.

Parkes, A. J., Lifted Search Engines For Satisfiability, PhD thesis, University of Oregon, Jun. 1999, Available from http://www.cirl.uoregon.edu/parkes.

Pitassi, T., Propositional Proof Complexity Lecture Notes, www.cs.toronto.edu/toni/Courses/Proofcomplexity/Lectures/Lecture1/lecture1.ps (other lectures titled similarly), 2002.

Prestwich, S., Randomised Backtracking For Linear Pseudo-Boolean Constraint Problems, In Proceedings of the 4th International Workshop on Integration of AI and OR Techniques in Constraint Programming for Combinatorial Optimisation Problems (CPAIOR-02), pp. 7-20, 2002.

Pudlak, P., Lower Bounds For Resolution And Cutting Plane Proofs And Monotone Computations, J. Symbolic Logic, 62(3):981-998, 1997.

Rotman, J. J., An Introduction to the Theory of Groups, Springer, 1994.

Savelsbergh, M. W. P., Preprocessing And Probing Techniques For Mixed Integer Programming Problems, ORSA Journal on Computing, 6:445-454, 1994.

Schaefer, T. J., The Complexity Of Satisfiability Problems, In Proceedings of the Tenth Annual ACM Symposium on the Theory of Computing, pp. 216-226, 1978.

Selman, B., Kautz, H. A., and Cohen, B., Local Search Strategies For Satisfiability Testing, In Proceedings 1993 DIMACS Workshop on Maximum Clique, Graph Coloring, and Satisfiability, 1993.

Seress, A., Permutation Group Algorithms, vol. 152 of Cambridge, Tracts in Mathematics, Cambridge University Press, Cambridge, UK, 2003.

Simons, P., Extending And Implementing The Stable Model Semantics, 2000, Research Report 58, Helsinki University of Technology, Helsinki, Finland.

Szeider, S., The Complexity Of Resolution With Generalized Symmetry Rules, In H. Alt and M. Habib, editors, Proceedings of STACS03, vol. 2607 of Springer Lecture Notes in Computer Science, pp. 475-486, 2003.

Urquhart, A., The Complexity Of Propositional Proofs, Bull. Symbolic Logic, 1(4):425-467, 1995.

Velev, M. N. and Bryant, R. E., Effective Use Of Boolean Satisfiability Procedures In The Formal Verification Of Superscalar And VLIW Microprocessors, In Proceedings of the 38th Conference on Design Automation, Conference 2001, pp. 226-231, New York, NY, USA, 2001. ACM Press.

Walser, J. P., Solving Linear Pseudo-Boolean Constraint Problems With Local Search, In Proceedings of the Fourteenth National Conference on Artificial Intelligence, pp. 269-274, 1997.

* cited by examiner

DATABASE MANIPULATIONS USING GROUP THEORY

CROSS-REFERENCE TO RELATED APPLICATIONS

This application is a continuation-in-part of application Ser. No. 10/773,351, filed Feb. 5, 2004, which is hereby incorporated by reference herein. This application is related to U.S. Pat. No. 6,556,978, which is hereby incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract nos. F30602-00-2-0534 and F33615-02-C-4032, awarded by the Defense Advanced Research Laboratory and the Air Force Research Laboratory.

BACKGROUND OF THE INVENTION

1. Field of the Invention

This invention pertains in general to searching and manipulating database information in order to identify database elements satisfying specified properties. The invention more particularly pertains to manipulating database information to represent and solve satisfiability and other types of logic problems such as those involved in microprocessor verification and testing.

2. Description of the Related Art

Most computer systems that manipulate large amounts of data store the data by using general patterns of which the individual data elements are instances. The last few years have seen extraordinary improvements in the effectiveness of general-purpose algorithms that manipulate these data, as represented by improvements in the performance of Boolean satisfiability engines. These techniques have been applied in a wide range of application domains such as generative planning, circuit layout, and microprocessor verification and testing.

As the application domains become more sophisticated, the amount of information manipulated by these systems grows. In many cases, this information is represented by the set of ground instances of a single universally quantified axiom, but a single axiom such as $$\forall xyz.[a(x,y) \char`\^ b(y,z) \rightarrow c(x,z)]$$

has $d^3$ ground instances if d is the size of the domain from which x, y and z are taken. In most cases, the prior art has dealt with the difficulty of managing the large number of ground instances by increasing computer memory and by finding axiomatizations for which ground theories remain manageably sized. In general, memory and these types of axiomatizations are both scarce resources and a more natural solution is desired. There have been some attempts to manipulate quantified axioms directly, but these attempts have been restricted to axioms of a particular form and structure. What is needed is a general approach that is capable of utilizing whatever structure exists in the data describing the application domain in order to minimize the memory and reduce the dependency on axiomatizations.

BRIEF SUMMARY OF THE INVENTION

The above need is met by using group theory to represent the data describing the application domain. This representation expresses the structure inherent in the data. Moreover, group theory techniques are used to solve problems based on the data in a manner that uses computational resources efficiently.

In one embodiment, the data describing the application domain are represented as sets of database entries, where each set (c, G) includes a database element c and a group G of elements g that can act on the database element c to produce a new database element (which is typically denoted as g(c)). The present invention uses computational techniques to perform database manipulations (such as a query for a database entry satisfying certain syntactic properties) on the data in the group theory representation, rather than on the data in the non-group theory representation (referred to herein as the data's "native representation").

A database query asks whether the data describing the application domain have one or more specified properties, seeks to identify any input data having the properties and, in some cases, constructs new database elements. In one embodiment, a query specifies a Boolean satisfiability problem and seeks to determine whether any solutions or partial solutions to the problem exist (and to identify the solutions or partial solutions), whether any element of the problem is unsatisfiable given known or hypothesized problem features, or whether any single element of the problem can be used to derive new features from existing ones. The input query is typically directed toward the native representation of the data and is therefore converted into an equivalent query on the data in the group theory representation.

The converted query is executed on the data in the group theory representation. In one embodiment, query execution produces a collection of zero or more group elements g that can act on database elements c associated to the group elements and satisfy the properties specified by the input query. If necessary or desired, the results of the query are converted from the group theory representation into the native representation of the data for the application domain.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

In this description, "SAT" refers to the Boolean Satisfiability Problem, "NP" refers to non-deterministic polynomial time, and "DIMACS" refers to the Center for Discrete Mathematics and Theoretical Computer Science.

Figure 1:
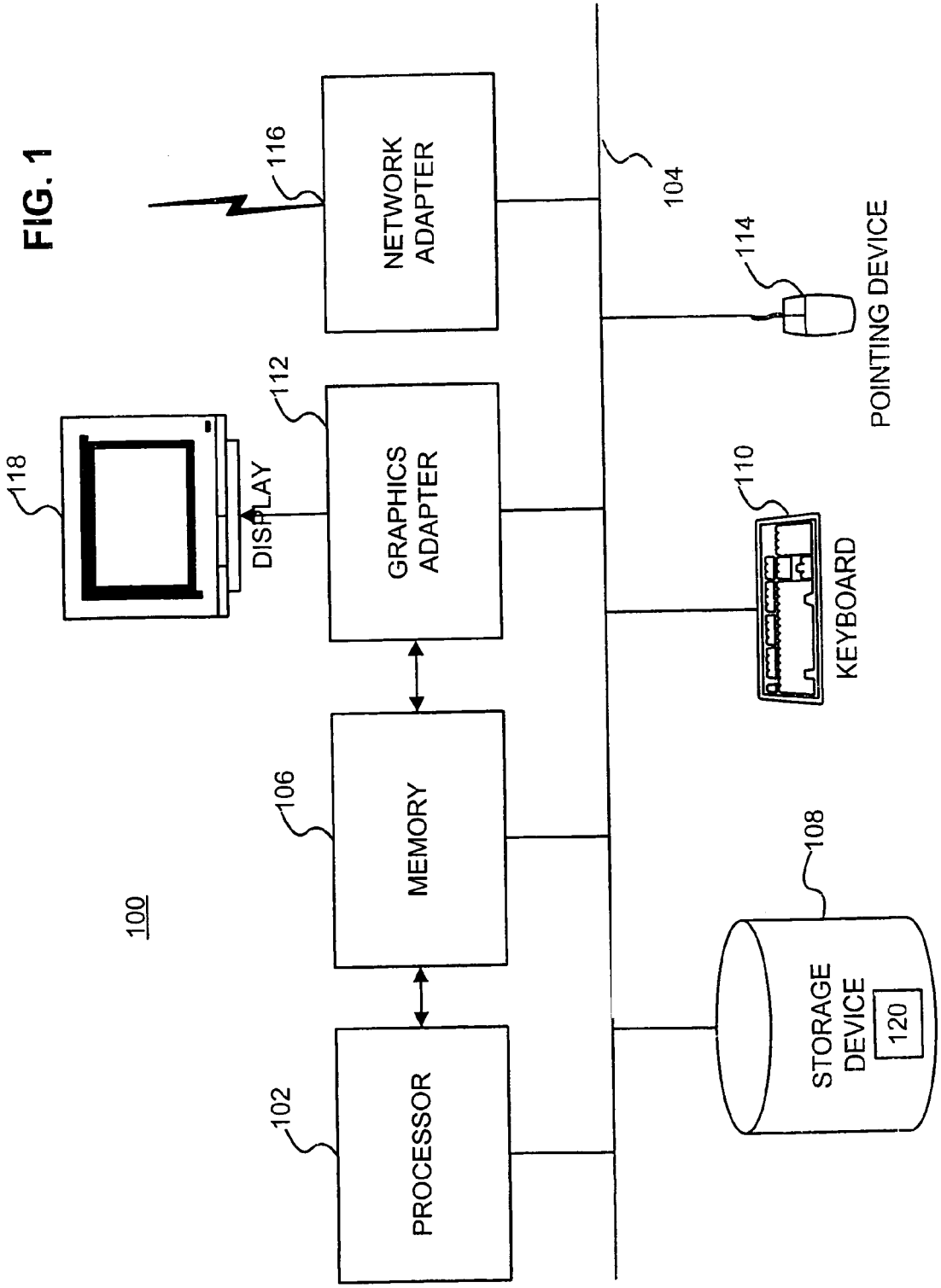
FIG. 1 is a high-level block diagram of a computer system for storing and manipulating data using group theory according to an embodiment of the present invention.

FIG. 1 is a high-level block diagram of a computer system 100 for storing and manipulating database information using group theory according to an embodiment of the present invention. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Some embodiments of the computer system 100 have different and/or additional components than the ones described herein.

The processor 102 may be any general-purpose processor such as an INTEL x86 compatible-, POWERPC compatible-, or SUN MICROSYSTEMS SPARC compatible-central processing unit (CPU). The storage device 108 may be any device capable of holding large amounts of data, like a hard drive, compact disk read-only memory (CD-ROM), DVD, etc. The memory 106 holds instructions and data used by the processor 102. The pointing device 114 may be a mouse, track ball, light pen, touch-sensitive display, or other type of pointing device and is used in combination with the keyboard 110 to input data into the computer system 100. The network adapter 116 optionally couples the computer system 100 to a local or wide area network.

Program modules 120 for storing and manipulating database information using group theory according to an embodiment of the present invention are stored on the storage device 108, from where they are loaded into the memory 106 and executed by the processor 102. Alternatively, hardware or software modules may be stored elsewhere within the computer system 100 or on one or more other computer systems connected to the computer system 100 via a network or other means. As used herein, the term "module" refers to computer program instructions, embodied in software and/or hardware, for performing the function attributed to the module. In one embodiment of the present invention, the operation of the computer system 100 is controlled by the LINUX operating system, although other operating systems can be used as well.

An embodiment of the present invention receives data describing objects or activities external to the computer system 100 and formulates the data in a representation that expresses structure inherent in the data. In a preferred embodiment, the representation utilizes a branch of mathematics referred to as "Group Theory" and the data are represented as sets of database entries, where each set (c, G) includes a database element c and a group G of elements g that can act on the database element. In one embodiment, the group elements g are permutations acting on the associated database element c.

The present invention uses computational techniques to perform database manipulations (such as a query for a database entry satisfying certain syntactic properties) on the data in the group theory representation, rather than on the data in the non-group theory representation (referred to herein as the data's "native representation"). These database manipulations are more efficient than equivalent manipulations on native or other representations of the data.

Figure 2:
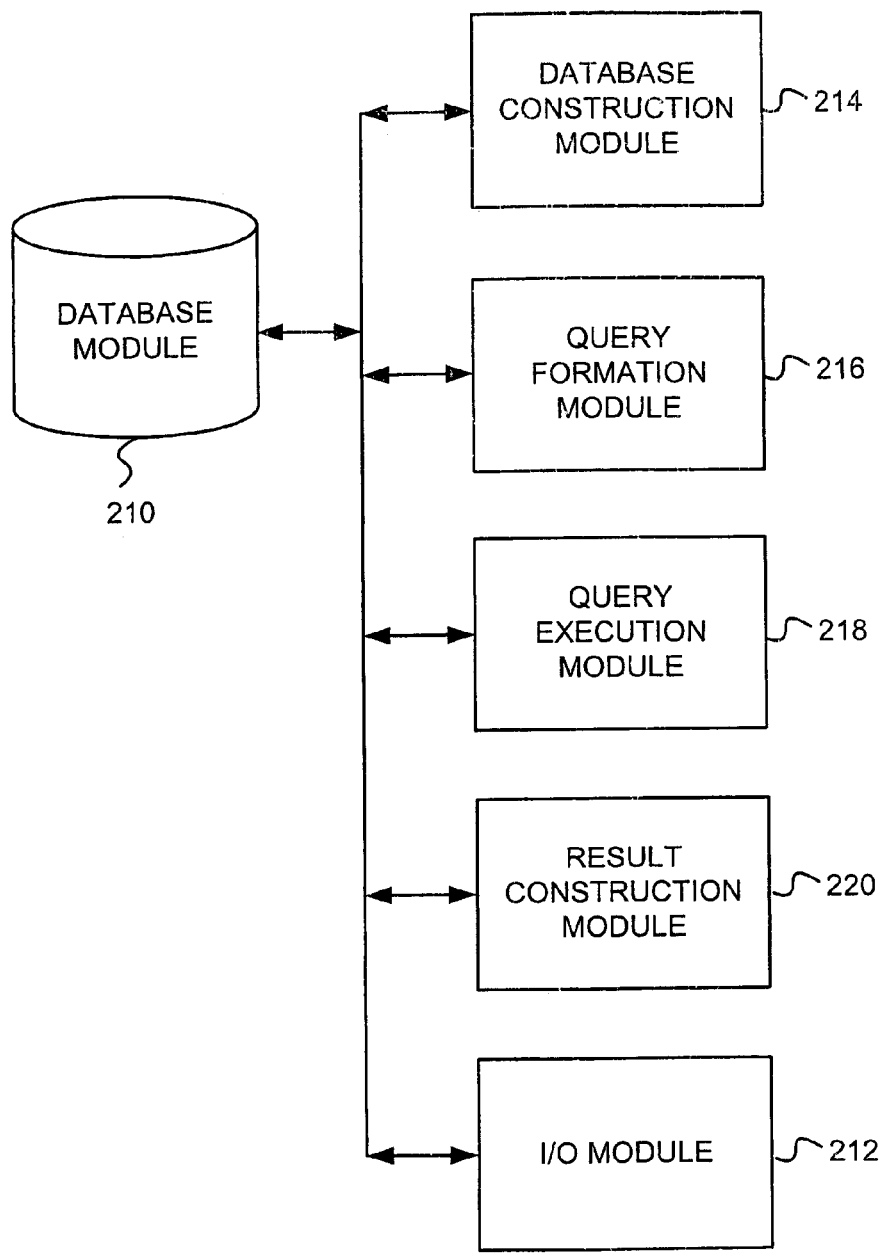
FIG. 2 is a high-level block diagram of program modules for storing and manipulating data using group theory according to one embodiment of the present invention.

FIG. 2 is a high-level block diagram of program modules 120 for storing and manipulating database information using group theory according to one embodiment of the present invention. Those of skill in the art will recognize that embodiments of the present invention can include different modules in addition to, or instead of, the ones illustrated herein. Moreover, the modules can provide other functionalities in addition to, or instead of, the ones described herein. Similarly, the functionalities can be distributed among the modules in a manner different than described herein.

A database module 210 (often referred to as the "database") stores data utilized by the present invention. As used herein, the term "database" refers to a collection of data and does not imply any particular arrangement of the data beyond that described herein. The data are within one or more application domains. The data within each application domain represent and/or describe one or more objects or activities external to the computer system, including prospective and/or theoretical instances of the objects and activities, relevant to the domain. For example, data within a given application domain can represent a design for a microprocessor or other digital logic device. Likewise, data within a given application domain can represent a series of actions that must or can be performed on a construction project for building a complex object such as a ship or bridge. In another application domain, the data can represent an employee directory containing names, telephone numbers, and reporting paths. Those of skill in the art will recognize that the data can belong to a wide variety of application domains beyond those described here.

The data within an application domain have inherent structure due to the nature of the domain. This structure can be explicit and/or implicit. The data within each application domain are preferably represented using group theory in order to express this structure. The group theory representation is contrasted with the data's non-group theory, or native, representation where the structure is not necessarily expressed. For example, if the application domain describes an employee directory, the data in the native representation include a listing of names and reporting paths or perhaps a machine-readable (but not group theory-based) equivalent of the listing and paths. The data in the group theory representation, on the other hand, are represented as sets of database elements c and groups G of group elements g, i.e. (c, G). Each element g of the group G "acts" on its associated database element c (the action is typically denoted as g(c)) to produce a new database element.

An input/output (I/O) module 212 controls the flow of data into, and out of, the computer system 100. In general, the I/O module 212 receives "input data," which are data within an application domain and describing one or more objects or activities external to the computer system, including prospective and/or theoretical instances of the objects and/or activities, and "input queries," which are queries asking whether the input data have certain properties. The input data received by the I/O module 212 can be encoded in either a group theory representation or the data's native representation.

The input data and/or input queries are provided to the computer system 100 by, for example, transmission over a computer network, loading from a computer-readable medium, and/or via the keyboard 110, pointing device 114, or other interface device. The input data are preferably stored in the database 210. The input queries are stored in the database 210 or elsewhere within the computer system 100.

In general, the input data are generated by creating electronic representations of objects and/or activities in the pertinent application domains, such as representations of the aforementioned digital logic device, construction project, or employee directory, and providing the electronic representations to the computer system 100. In one embodiment, the input data are generated by taking measurements of physical or prospective physical objects. The input data can be provided to the computer system 100 in their native representation or after the data are converted from their native representation to the group theory representation.

An input query asks whether the input data have given properties and, in some cases, seeks to identify the input data having the properties. For example, a query can ask whether a digital logic device behaves in a specified manner, whether an optimal set of steps for a construction project exist, etc. In one embodiment, a query specifies a Boolean satisfiability problem and seeks to determine whether any solutions or partial solutions to the problem exist (and to identify the solutions or partial solutions), whether any element of the problem is unsatisfiable given known or hypothesized problem features, or whether any single element of the problem can be used to derive new features from existing ones. A query can also cause new database elements to be added in response to results of a query. For example, a query can save its results in the database 210 in a group theory representation for use by subsequent queries.

The data flowing out of the computer system 100 are referred to herein as "output data" and represent a result of the operation of an input query on the input data as achieved through one or more database manipulations using group theory. The output data represent a concrete, tangible, and useful result of the database manipulations and can include data resulting from physical transformations of the input data. For example, the output data can represent a result of a verification and test procedure indicating whether a digital logic device contains any logic errors. Similarly, the output data can represent a result of a process that determines an optimal ordered sequence of steps for a construction project or other multi-step task. A computer system or human being can use the output data to redesign the digital logic device to correct any errors, to perform the steps of the construction project, etc. The computer system 100 outputs the output data by, for example, transmitting the data over a computer network, loading the data onto a computer-readable medium, displaying the data on a monitor, etc.

A database construction module 214 receives input data within an application domain from the I/O module 212, converts the data from their native representation into the group theory representation (if necessary), and stores the data in the group theory representation in the database 210. In one embodiment, the database construction module 214 converts the data from their native representation to the group theory representation by encoding the input data as one or more augmented clauses, where each clause has a pair (c, G) including a database element c and a group G of elements g acting on it, so that the augmented clause is equivalent to the conjunction of the results of operating on c with the elements of G. This encoding expresses the structure inherent in the input data.

A query formulation module 216 receives the input query from the I/O module 212. The input query is typically directed toward the native representation of the input data. The query formulation module 216 therefore converts the input query into one or more equivalent queries on the input data in the group theory representation. In general, a query specifies a search for database elements satisfying a property P. The query formulation module 216 converts this query into a search for a pair (g,c) where g is a group element and c is a database element, such that g(c) satisfies property P.

In one embodiment, the input query is a "high-level" query. A high-level query is a general question about the input data. Examples of high-level queries are "are the data consistent?" and "does the logic device described by the data have errors?" The answer to a high-level query is not generally a database element, but rather is information derived from the database elements. For example, the answer can be a description of an error in a digital logic device or a report that the device does not have any errors.

In one embodiment, the query formulation module 216 converts the high-level query directly into a group theory based representation. In another embodiment, the query formulation module 216 converts the high-level query into multiple "low-level" queries. A low-level query corresponds to a search for a database element satisfying a particular property, such as "is there a single element of the data in the application domain that is unsatisfiable given the assignments made so far?" The query formulation module 216 converts each of these low-level queries into a group theory representation.

In another embodiment, the input query received by the query formulation module 216 is a low-level query. The low-level query can be derived from a high-level query by an entity external to the module 216. Alternatively, the low-level query can be the entire query desired to be executed on the input data. In either case, the query formulation module 216 converts the low-level query into one or more queries in the group theory representation.

A query execution module 218 receives the one or more converted queries from the query formulation module 216 and executes the queries on the data in the group theory representation of the input data in the database 210. The query execution module 218 preferably uses techniques drawn from computational group theory in order to execute the queries efficiently. The result of a query is a set of zero or more pairs (g,c) where g is a group element and c is a database element, where each g(c) satisfies the property P specified by the query. In one embodiment, the set of answers to the query form a subgroup. In this case, the result of the query can be represented using a compact representation of the subgroup where a small number of group elements $h_1 \ldots h_n$ are described explicitly and the other elements of the subgroup can then be computed by combining $h_1 \ldots h_n$.

A result construction module 220 receives the results of the one or more query executions from the query execution module 218 and converts the results from the group theory representation to the native representation of the data. Depending upon the application domain, the result produced by the result construction module 220 can be a result of a test on a digital logic device, a sequence of steps for a construction project, etc. The native representation of the query results is received by the I/O module 212, which outputs it as the output data.

In the simple case where a query executed by the query execution module 218 produces a set of pairs (g,c) where g is a group element and c is a database element, such that each g(c) satisfies property P, the result construction module 220 generates g(c) to reconstruct the result of the original query in terms familiar to the native representation of the input data. In a more complex case where the query execution module 218 executes multiple queries and generates multiple results in response to an input query, one embodiment of the result construction module 220 combines the results into a collective result answering the input query. For example, a high-level query can lead to multiple low-level queries and corresponding results. In this case, an embodiment of the result construction module 220 analyzes the results of the low-level queries to generate an answer to the high-level query in terms familiar to the native representation of the input data. In one embodiment, the result construction module 220 constructs answers to both high and low-level queries in terms familiar to the native representation of the input data. This latter embodiment can be used, for example, when the results of the low-level queries allow one to understand the answer to the high-level query.

Figure 3:
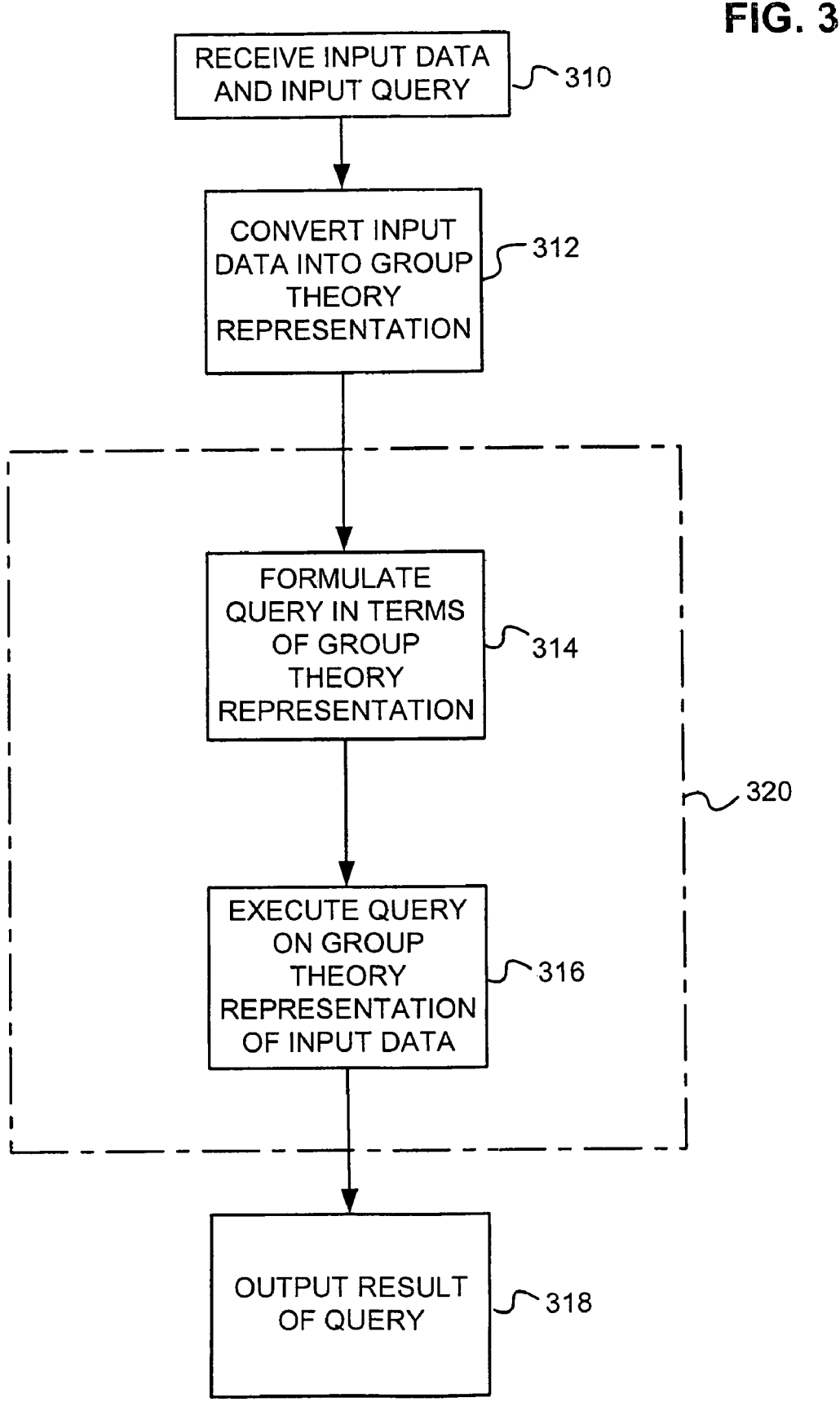
FIG. 3 is a flowchart illustrating steps for performing database manipulations using group theory according to an embodiment of present invention

FIG. 3 is a flowchart illustrating steps for performing database manipulations using group theory according to an embodiment of present invention. Those of skill in the art will recognize that embodiments of the present invention can have additional and/or other steps than those described herein. In addition, the steps can be performed in different orders. Moreover, depending upon the embodiment, the functionalities described herein as being within certain steps can be performed within other steps. In one embodiment, the steps described herein are performed by the modules illustrated in FIG. 2. However, in alternative embodiments, some or all of the steps are performed by other entities.

Initially, the input data and input query are received 310. For example, the input data can describe a digital logic device and the input query can ask whether the device behaves in a specified manner. The input data need not be received contemporaneously with the input query, and the input data and input query are not necessarily received in a particular order. The input data either are already in the group theory representation, or are converted 312 from their native representation into the group theory representation. In addition, the input query is formulated 314 in terms of the group theory representation. The group theory representation of the query is executed 316 on the group theory representation of the input data to produce a result. The result is then output 318.

Figure 4:
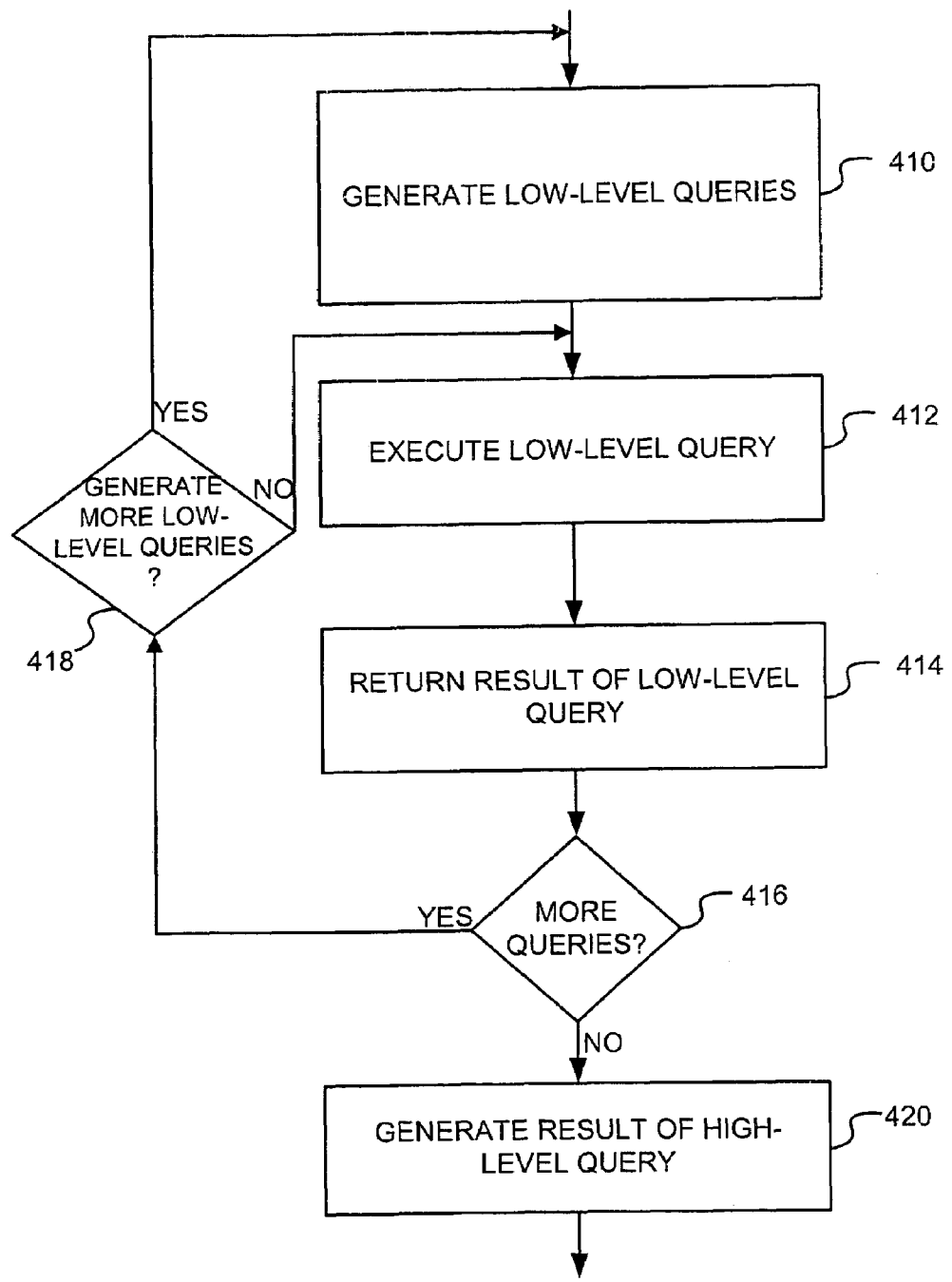
FIG. 4 is a flowchart illustrating the "formulate query" and "execute query" steps of FIG. 3 according to an embodiment of the present invention wherein multiple low-level queries are generated from an initial query.

FIG. 4 is a flowchart illustrating a view of the "formulate query" 314 and "execute query" 316 steps of FIG. 3 according to an embodiment where a high-level query is reduced into multiple low-level queries. These steps are identified by a broken line 320 in FIG. 3. Initially, the low-level queries in the group theory representation are generated 410 from the high-level query (or from another low-level query as described below). A low-level query is executed 412 on the group theory representation of the input data to produce a result. This result is returned 414 to the entity performing the method and can be used, for example, to create new database elements and/or modify existing elements. If 416 there are more low-level queries, the method returns to step 412 and continues to execute. In one embodiment, the results of one or more of the low-level queries are used 418 to generate 410 additional low-level queries and the method therefore returns to step 410. Once the low-level queries have executed, the method uses the results of the low-level queries to generate 420 a result of the high-level query. This result is then output 318.

Figure 5:
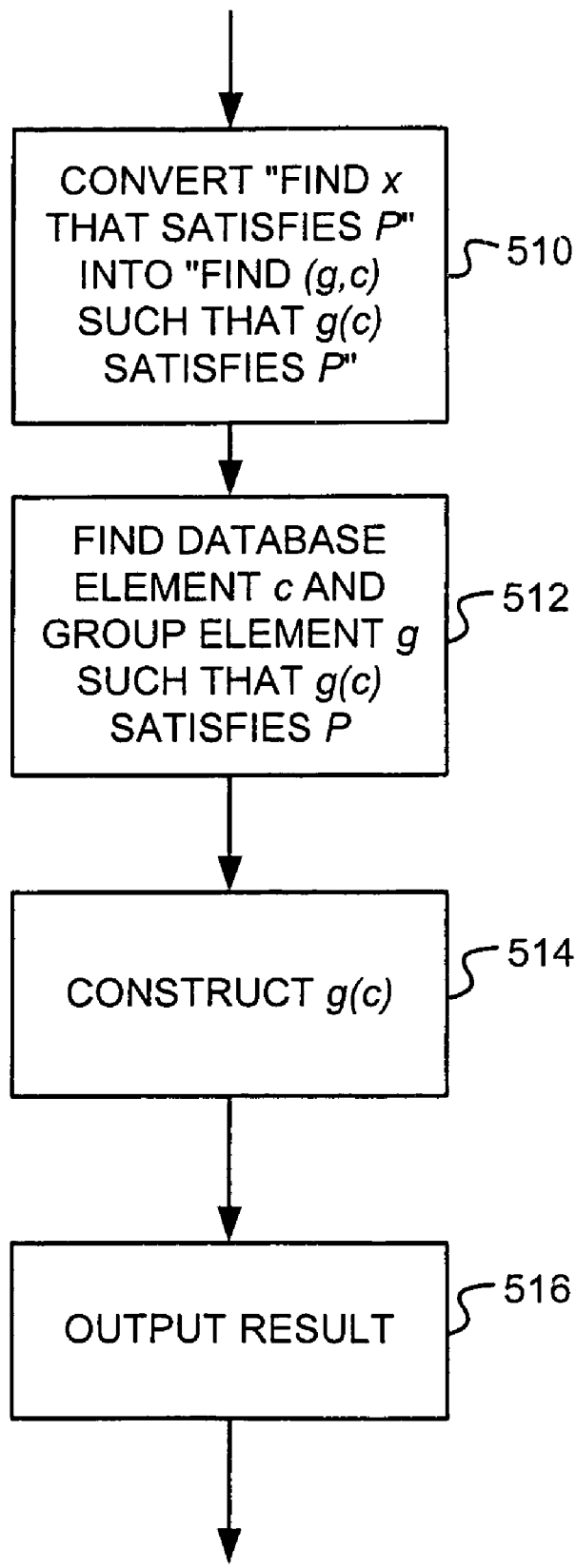
FIG. 5 is a flowchart illustrating a more detailed view of the "formulate query" and "execute query" steps of FIG. 3.

FIG. 5 is a flowchart illustrating a detailed view of the "formulate query" 314 and "execute query" 316 steps of FIG. 3, which can correspond to the "execute low-level query" 412 step of FIG. 4 in certain embodiments. The native representation of the input query (or low-level queries generated from a high-level query) are generally of the type "find element x that satisfies property P." This query is converted 510 into the equivalent group theory query, which is "find database element c and element g of a group G, such that g(c) satisfies property P." Next, the formulated query is executed 512 on the input data in the group theory representation to identify any database elements c and group elements g where g(c) satisfies P. The zero or more pairs (g,c) that are identified in response to the query are converted from the group theory representation into the native representation of the input data. This conversion is performed by using the group element g, and the database element c, to construct 514 g(c). The resulting value 516 is returned as the result of the query.

The following description includes three sections describing an embodiment of the present invention. The first section describes the theory of the present invention. The second section describes an implementation of one embodiment. The third section describes an example of using an embodiment of the present invention for circuit verification and test. Those of skill in the art will recognize that embodiments of the present invention can differ from the ones described herein.

THEORY

1 Introduction

This document describes ZAP, a satisfiability engine that substantially generalizes existing tools while retaining the performance characteristics of existing high-performance solvers such as ZCHAFF. Those of skill in the art will recognize that the concepts described herein can be utilized for problem domains other than satisfiability. The following table describes a variety of existing computational improvements to the Davis-Putnam-Logemann-Loveland (DPLL) inference procedure:

|   | rep'l efficiency | p-simulation hierarchy | inference | propagation | learning |
|---|---|---|---|---|---|
| SAT | 1 | EEE | resolution | watched literals | relevance |
| cardinality | exp | P?E | not unique | watched literals | relevance |
| pseudo-Boolean | exp | P?E | unique | watched literals | +strengthening |
| symmetry | 1 | EEE* | not in P | same as SAT | same as SAT |
| QPROP | exp | ??? | in P using reasons | exp improvement | +first-order |

The lines of the table correspond to observations regarding existing representations used in satisfiability research, as reflected in the labels in the first column:

1. SAT refers to conventional Boolean satisfiability work, representing information as conjunctions of disjunctions of literals (CNF).
2. cardinality refers to the use of "counting" constraints; if we think of a conventional disjunction of literals $\vee_i l_i$ as $$\sum_i l_i \geq 1$$

then a cardinality constraint is one of the form $$\sum_i l_i \geq k$$

for a positive integer k.

3. pseudo-Boolean constraints extend cardinality constraints by allowing the literals in question to be weighted:

$$\sum_i w_i l_i \geq k$$

Each $w_i$ is a positive integer giving the weight to be assigned to the associated literal.
4. symmetry involves the introduction of techniques that are designed to explicitly exploit local or global symmetries in the problem being solved.
5. QPROP deals with universally quantified formulae where all of the quantifications are over finite domains of known size.

The remaining columns in the table measure the performance of the various systems against a variety of metrics:
1. Representational efficiency measures the extent to which a single axiom in a proposed framework can replace many in CNF. For cardinality, pseudo-Boolean and quantified languages, it is possible that exponential savings are achieved. We argue that such savings are possible but relatively unlikely for cardinality and pseudo-Boolean encodings but are relatively likely for QPROP.
2. p-simulation hierarchy gives the minimum proof length for the representation on three classes of problems: the pigeonhole problem, parity problems and clique coloring problems. An E indicates exponential proof length; P indicates polynomial length. While symmetry-exploitation techniques can provide polynomial-length proofs in certain instances, the method is so brittle against changes in the axiomatization that we do not regard this as a polynomial approach in general.
3. Inference indicates the extent to which resolution can be lifted to a broader setting. This is straightforward in the pseudo-Boolean case; cardinality constraints have the problem that the most natural resolvent of two cardinality constraints may not be one. Systems that exploit local symmetries must search for such symmetries at each inference step, a problem that is not believed to be in P. Provided that reasons are maintained, inference remains well defined for quantified axioms, requiring only the introduction of a (linear complexity) unification step.
4. Propagation describes the techniques available to draw conclusions from an existing partial assignment of values to variables. For all of the systems except QPROP, Zhang and Stickel's watched literals idea is the most efficient mechanism known. This approach cannot be lifted to QPROP, but a somewhat simpler method can be lifted and average-case exponential savings obtained as a result.
5. Learning reflects the techniques available to save conclusions as the inference proceeds. In general, relevance-bounded learning is the most effective technique known here. It can be augmented with strengthening in the pseudo-Boolean case and with first-order reasoning if quantified formulae are present.

An embodiment of the present invention, referred to herein as "ZAP" is represented in the table as:

| ZAP | exp | PPP p-simulates extended res'n | in P using reasons | watched literals, exp improvement | +first-order +parity +others |
|---|---|---|---|---|---|

Some comments are in order:

Unlike cardinality and pseudo-Boolean methods, which seem unlikely to achieve exponential reductions in problem size in practice, and QPROP, which seems likely to achieve such reductions, ZAP is guaranteed to replace a set of n axioms for which the requisite structure is present with a single axiom of size log(n) (Proposition 3.6).

In addition to providing robust, polynomially sized proofs of the three "benchmark" proof complexity problems cited previously, ZAP can p-simulate extended resolution, so that if P is a proof in extended resolution, there is a proof P' of size polynomial in P in ZAP (Theorem 5.12).

The fundamental inference step in ZAP is in NP with respect to the ZAP representation, and therefore has worst case complexity exponential in the representation size (i.e., polynomial in the number of Boolean axioms being resolved). The average case complexity appears to be low-order polynomial in the size of the ZAP representation (i.e., polynomial in the logarithm of the number of Boolean axioms being resolved).

ZAP obtains the savings attributable to subsearch in the QPROP case while casting them in a general setting that is equivalent to watched literals in the Boolean case. This particular observation is dependent on a variety of results from computational group theory.

In addition to learning the Boolean consequences of resolution, ZAP continues to support relevance-based learning schemes while also allowing the derivation of first-order consequences, conclusions based on parity arguments, and combinations thereof.

The next section summarizes both the DPLL algorithm and the modifications that embody recent progress, casting DPLL into the precise form that is both needed in ZAP and that seems to best capture the architecture of modern systems such as zCHAFF.

In a later section, we present the insights underlying ZAP. Beginning with a handful of examples, we see that the structure exploited in earlier examples corresponds to the existence of particular subgroups of the group of permutations of the literals in the problem; this corresponds to the representational efficiency column of our table. The "inference" section describes resolution in this broader setting, and the p-simulation hierarchy section presents a variety of examples of these ideas at work, showing that the pigeonhole problem, clique-coloring problems, and Tseitin's parity examples all admit short proofs in the new framework. We also show that our methods p-simulate extended resolution. The learning section recasts the DPLL algorithm in the new terms and discusses the continued applicability of relevance in our setting.

2 Boolean Satifiability Engines

We begin here by being precise about Davis-Putnam-Logemann-Loveland extensions that deal with learning. We give a description of the DPLL algorithm in a learning/reason-maintenance setting, and prove that it is possible to implement these ideas while retaining the soundness and completeness of the algorithm but using an amount of memory that grows polynomially with problem size.

Procedure 2.1 (Davis-Putnam-Logemann-Loveland) Given a SAT problem C and a partial assignment P of values to variables, to compute DPLL(C, P):

```
1    P ← UNIT-PROPAGATE(P)
2    if P = FAILURE
3       then return FAILURE
4    if P is a solution to C
5       then return SUCCESS
6    l ← a literal not assigned a value by P
7    if DPLL(C, P ∪ {l = true}) = SUCCESS
8       then return SUCCESS
9       else return DPLL(C, P ∪ {l = false})
```

Variables are assigned values via branching and unit propagation. In unit propagation (described below), the existing partial assignment is propagated to new variables where possible. If unit propagation terminates without reaching a contradiction or finding a solution, then a branch variable is selected and assigned a value, and the procedure recurs. Here is a formal description of unit propagation:

Procedure 2.2 (Unit propagation) To compute UNIT-PROPAGATE(P):

```
1    while there is a currently unsatisfied clause c ∈ C that contains at
     most one literal unassigned a value by P
2       do if every variable in c is assigned a value by P
3          then return FAILURE
4          else v ← the variable in c unassigned by P
5             P ← P ∪ {v = V : V is selected so that c is satisfied}
6    return P
```

We can rewrite this somewhat more formally using the following definition:

Definition 2.3 Let $\vee_i l_i$ be a clause, which we will denote by c. Now suppose that P is a partial assignment of values to variables. We will say that the possible value of c under P is given by $$\text{poss}(c, P) = |\{i \mid \neg l_i \notin P\}| - 1$$

If no ambiguity is possible, we will write simply poss(c) instead of poss(c, P). In other words, poss(c) is the number of literals that are either already satisfied or not valued by P, reduced by one (since the clause requires one literal true be true).

If S is a set of clauses, we will write $\text{poss}_n(S, P)$ for the subset of c∈S for which poss(c, P)≦n and $\text{poss}_{>n}(S, P)$ for the subset of learned clauses c∈S for which poss(c, P)>n.

The above definition can be extended easily to deal with pseudo-Boolean instead of Boolean constraints, although that extension will not be our focus here.

Procedure 2.4 (Unit propagation) To compute UNIT-PROPAGATE(P):

```
1    while poss₀(C, P) ≠ ∅
2       do if poss₋₁(C, P) ≠ ∅
3          then return FAILURE
4          else c ← an element of poss₀(C, P)
5             v ← the variable in c unassigned by P
6             P ← P ∪ {v = V : V is selected so that c is satisfied}
7    return P
```

As with Definition 2.3, the above description can be extended easily to deal with pseudo-Boolean or other clause types.

Procedures 2.4 and 2.1 are generally extended to include some sort of learning. For our ideas to be consistent with this, we introduce:

Definition 2.5 A partial assignment is an ordered sequence $$\langle l_1, \ldots, l_n \rangle$$

of literals. An annotated partial assignment is an ordered sequence $$\langle (l_1, c_1), \ldots, (l_n, c_n) \rangle$$

of literals and clauses, where $c_i$ is the reason for literal $l_i$ and either $c_i$=true (indicating the $l_i$ was a branch point) or $c_i$ is a clause such that:

1. $l_i$ is a literal in $c_i$; and
2. $\text{poss}(c_i, \langle l_1, \ldots, l_{i-1} \rangle) = 0$ An annotated partial assignment will be called sound with respect to a set of constraints C if C⊨$c_i$ for each reason $c_i$.

The point of the definition is that the reasons have the property that after the literals $l_1, \ldots, l_{i-1}$ are all set to true, it is possible to conclude $l_i$ from $c_i$ by unit propagation.

Definition 2.6 If $c_1$ and $c_2$ are reasons, we will define the result of resolving $c_1$ and $c_2$ to be:

$$\text{resolve}(c_1, c_2) = \begin{cases} c_2, & \text{if } c_1 = \text{true}; \\ c_1, & \text{if } c_2 = \text{true}; \\ \text{the conventional resolvent} \\ \text{of } c_1 \text{ and } c_2, & \text{otherwise.} \end{cases}$$

We can now rewrite the unit propagation procedure as follows:

Procedure 2.7 (Unit propagation) To compute UNIT-PROPAGATE(P) for an annotated partial assignment P:

```
1    while poss₀(C, P) ≠ ∅
2       do if poss₋₁(C, P) ≠ ∅
3          then c ← an element of poss₋₁(C, P)
4             lᵢ ← the literal in c with the highest index in P
5             return <true, resolve(c, cᵢ)>
6          else c ← an element of poss₀(C, P)
7             l ← the variable in c unassigned by P
8             P ← P ∪ (l, c)
9    return <false, P>
```

The above procedure returns a pair of values. The first indicates whether a contradiction has been found. If so, the second value is the reason for the failure, an unsatisfiable consequence of the clausal database C. If no contradiction is found, the second value is a suitably modified partial assignment. Procedure 2.7 has also been modified to work with annotated partial assignments, and to annotate the new choices that are made when P is extended.

Proposition 2.8 Suppose that C is a Boolean satisfiability problem, and P is a sound annotated partial assignment. Then:

1. If unit-propagate(P)=⟨false, P'⟩, then P' is a sound extension of P, and
2. If unit-propagate(P)=⟨true, c⟩, then C⊨c and c is falsified by the assignments in P.

When the unit propagation procedure "fails" and returns <true, c> for a new nogood c, there are a variety of choices that must be made by the overall search algorithm. The new clause can be added to the existing collection of axioms to be solved, perhaps simultaneously deleting other clauses in order to ensure that the clausal database remains manageably sized. It is also necessary to backtrack at least to a point where c becomes satisfiable. Some systems such as zCHAFF backtrack further to the point where c is unit. Here is a suitable modification of Procedure 2.1:

Procedure 2.9 Given a SAT problem C and an annotated partial assignment P, to compute DPLL(C, P):

```
1   if P is a solution to C
2     then return P
3   <x, y> ← UNIT-PROPAGATE(P)
4   if x = true
5     then c ← y
6       if c is empty
7         then return FAILURE
8         else C ← C ∪ {c}
9           delete clauses from C as necessary to keep C small
10          backtrack at least to the point that c is satisfiable
11          return DPLL(C, P)
12    else P ← y
13      if P is a solution to C
14        then return P
15        else l ← a literal not assigned a value by P
16          return DPLL(C, <P, (l, true)>)
```

This procedure is substantially modified from Procedure 2.1, so let us go through it.

The fundamental difference is that both unit propagation and the DPLL procedure can only fail if a contradiction (an empty clause c) is derived. In all other cases, progress is made by augmenting the set of constraints to include at least one new constraint that eliminates the current partial solution. Instead of simply resetting the branch literal l to take the opposite value as in the original procedure 2.1, a new clause is learned and added to the problem, which will cause either l or some previous variable to take a new value.

The above description is ambiguous about a variety of points. We do not specify how the branch literal is chosen, the precise point to backtrack to, or the scheme by which clauses are removed from C. The first two of these are of little concern to us; ZAP makes the same choices here that zCHAFF does and implementing these choices is straightforward. Selecting clauses for removal involves a search through the database for clauses that have become irrelevant or meet some other condition, and the computational implications of this "subsearch" problem need to be considered as the algorithm evolves.

It will be useful for us to make this explicit, so let us suppose that we have some relevance bound k. The above procedure now becomes:

Procedure 2.10 (Relevance-bound reasoning, RBL) Given a SAT problem C and an annotated partial assignment P, to compute RBL(C, P):

```
1   if P is a solution to C
2     then return P
3   <x, y> ← UNIT-PROPAGATE(P)
4   if x = true
5     then c ← y
6       if c is empty
7         then return FAILURE
8         else remove successive elements from P so that c is satisfiable
9           C ← C ∪ {c} − poss_{>k}(C, P)
10          return RBL(C, P)
11    else P ← y
12      if P is a solution to C
13        then return P
14        else l ← a literal not assigned a value by P
15          return RBL(C, <P, (l, true)>)
```

Note that the clauses deleted because they belong to $\text{poss}_{>k}(C, P)$ are only learned irrelevant clauses (see Definition 2.3); it is inappropriate to remove clauses that are part of the original problem specification.

Theorem 2.11 RBL is sound and complete, and uses an amount of memory polynomial in the size of C (although exponential in the relevance bound k).

3 Axiom Structure As a Group

3.1 Examples of Structure

While we use the implementation details embodied in Procedures 2.10 and 2.7 to implement our ideas, the procedures themselves inherit certain weaknesses of DPLL as originally described. Two weaknesses that we address are:

1. The appearance of $\text{poss}_0(C, P)$ in the inner unit propagation loop of the procedure requires an examination of a significant subset of the clausal database at each inference step, and
2. Both DPLL and RBL are fundamentally resolution-based methods; there are known problem classes that are exponentially difficult for resolution-based methods but which are easy if the language in use is extended to include either cardinality or parity constraints.

Let us consider each of these issues in turn.

3.1.1 Subsearch

The set of axioms that need to be investigated in the DPLL inner loop often has structure that can be exploited to speed the examination process. If a ground axiomatization is replaced with a lifted one, the search for axioms with specific syntactic properties is NP-complete in the number of variables in the lifted axiom, and is called subsearch for that reason.

In many cases, search techniques can be applied to the subsearch problem. As an example, suppose that we are looking for unit instances of the lifted axiom $$a(x, y) \vee b(y, z) \vee c(x, z) \tag{1}$$

where each variable is taken from a domain of size d, so that (1) corresponds to $d^3$ ground axioms. If $a(x, y)$ is true for all x and y (which we can surely conclude in time $o(d^2)$ or less), then we can conclude without further work that (1) has no unit instances. If $a(x, y)$ is true except for a single $(x, y)$ pair, then we need only examine the d possible values of z for unit instances, reducing our total work from $d^3$ to $d^2+d$.

It will be useful in what follows to make this example still more specific, so let us assume that x, y and z are all chosen from a two element domain $\{A, B\}$. The single lifted axiom (1) now corresponds to the set of ground instances:

$a(A, A) \vee b(A, A) \vee c(A, A)$ $a(A, A) \vee b(A, B) \vee c(A, B)$ $a(A, B) \vee b(B, A) \vee c(A, A)$ $a(A, B) \vee b(B, B) \vee c(A, B)$ $a(B, A) \vee b(A, A) \vee c(B, A)$ $$a(B,A) \lor b(A,B) \lor c(B,B)$$

$$a(B,B) \lor b(B,A) \lor c(B,A)$$

$$a(B,B) \lor b(B,B) \lor c(B,B)$$

If we introduce ground literals $l_1, l_2, l_3, l_4$ for the instances of $a(x, y)$ and so on, we get:

$$l_1 \lor l_5 \lor l_9$$
$$l_1 \lor l_6 \lor l_{10}$$
$$l_2 \lor l_7 \lor l_9$$
$$l_2 \lor l_8 \lor l_{10}$$
$$l_3 \lor l_5 \lor l_{11}$$
$$l_3 \lor l_6 \lor l_{12}$$
$$l_4 \lor l_7 \lor l_{11}$$
$$l_4 \lor l_8 \lor l_{12} \qquad (2)$$

at which point the structure implicit in (1) has apparently been obscured. We will return to the details of this example shortly.

3.1.2 Cardinality

Structure is also present in the sets of axioms used to encode the pigeonhole problem, which is known to be exponentially difficult for any resolution-based method. The pigeonhole problem can be solved in polynomial time if we extend our representation to include cardinality axioms such as $$x_1 + \ldots + x_m \geq k \qquad (3)$$

The single axiom (3) is equivalent to $\binom{m}{k-1}$ conventional disjunctions.

Once again, we will have use for an example presented in full detail. Suppose that we have the constraint $$x_1 + x_2 + x_3 + x_4 + x_5 \geq 3 \qquad (4)$$

saying that at least 3 of the $x_i$'s are true. This is equivalent to $$x_1 \lor x_2 \lor x_3$$
$$x_1 \lor x_2 \lor x_4$$
$$x_1 \lor x_2 \lor x_5$$
$$x_1 \lor x_3 \lor x_4$$
$$x_1 \lor x_3 \lor x_5$$
$$x_1 \lor x_4 \lor x_5$$
$$x_2 \lor x_3 \lor x_4$$
$$x_2 \lor x_3 \lor x_5$$
$$x_2 \lor x_4 \lor x_5$$
$$x_3 \lor x_4 \lor x_5 \qquad (5)$$

3.1.3 Parity Constraints

Finally, we consider constraints that are most naturally expressed using modular arithmetic, or exclusive or's, such as $$x_1 \oplus \ldots \oplus x_k = 0$$

or $$x_1 \oplus \ldots \oplus x_k = 1 \qquad (6)$$

In either case, the parity of the sum of the $x_i$'s is specified.

It is well known that axiom sets consisting of parity constraints in isolation can be solved in polynomial time using Gaussian elimination, but there are examples that are exponentially difficult for resolution-based methods. As in the other examples we have discussed, single axioms such as (6) reveal structure that a straightforward Boolean axiomatization obscures. In this case, the single axiom (6) with k=3 is equivalent to:

$$x_1 \lor x_2 \lor x_3$$
$$x_1 \lor \neg x_2 \lor \neg x_3$$
$$\neg x_1 \lor x_2 \lor \neg x_3$$
$$\neg x_1 \lor \neg x_2 \lor x_3 \qquad (7)$$

3.2 Formalizing Structure

Of course, the ground axiomatizations (2), (5) and (7) cannot erase the structure in the original axioms (1), (4) and (6); they can only obscure that structure. Our goal in this section is to begin the process of understanding the structure in a way that lets us describe it in general terms.

As a start, note that each of the axiom sets consists of axioms of equal length; it follows that the axioms can all be obtained from a single one simply by permuting the literals in the theory. In (2) and (5), literals are permuted with other literals of the same sign; in (7), literals are permuted with their negated versions. But in every instance, a permutation suffices.

In general, the collection of permutations on a set L is denoted by Sym(L). If the elements of L can be labeled 1, 2, ..., n in some obvious way, the collection is often denoted simply $S_n$. If we take L to be the integers from 1 to n, a particular permutation can be denoted by a series of disjoint cycles, so that the permutation $$w = (135)(26) \qquad (8)$$

for example, would map 1 to 3, then 3 to 5, then 5 back to 1. It would also exchange 2 and 6. The order in which the disjoint cycles are written is irrelevant, as is the choice of first element within a particular cycle.

If $w_1$ and $w_2$ are two permutations, it is obviously possible to compose them; we will write the composition as $w_1 w_2$ where the order means that we operate on a particular element of $\{1, \ldots, n\}$ first with $w_1$ and then with $w_2$. It is easy to see that while composition is associative, it is not necessarily commutative.

As an example, if we compose w from (8) with itself, we get $$w^2 = (135)(26)(135)(26) = (135)(135)(26)(26) = (153)$$

where the second equality holds because disjoint cycles commute and the third holds because $(26)^2$ is the identity cycle ( ).

The composition operator also has an inverse, since any permutation can obviously be inverted by mapping x to that y with w(y)=x. In our running example, it is easy to see that $$w^{-1} = (153)(26)$$

We see, then, that the set $S_n$ is equipped with a binary operator that is associative, and has an inverse and an identity element. This is the definition of an algebraic structure known as a group. We draw heavily on results from group theory and some familiarity with group-theoretic notions is helpful for understanding the present invention. One definition and some notation we will need:

Definition 3.1 A subset S of a group G will be called a subgroup of G if S is closed under the group operations of inversion and multiplication. We will write S≦G to denote the fact that S is a subgroup of G, and will write S>G if the inclusion is proper.

For a finite group, closure under multiplication suffices.

But let us return to our examples. The set of permutations needed to generate (5) from the first ground axiom alone is clearly just the set $$\Omega = \mathrm{Sym}(\{x_1, x_2, x_3, x_4, x_5\}) \tag{9}$$

since these literals can be permuted arbitrarily to move from one element of (5) to another. Note that the set $\Omega$ in (9) is a subgroup of the full permutation group $S_{2n}$ on 2n literals in n variables, since $\Omega$ is easily seen to be closed under inversion and composition.

What about the example (7) involving a parity constraint? Here the set of permutations needed to generate the four axioms from the first is given by:

$$(x_1, \neg x_1)(x_2, \neg x_2) \tag{10}$$

$$(x_1, \neg x_1)(x_3, \neg x_3) \tag{11}$$

$$(x_2, \neg x_2)(x_3, \neg x_3) \tag{12}$$

Although literals are now being exchanged with their negations, this set, too, is closed under the group inverse and composition axiom. Since each element is a composition of disjoint transpositions, each element is its own inverse. The composition of the first two elements is the third.

The remaining example (2) is a bit more subtle; perhaps this is to be expected, since the axiomatization (2) obscures the underlying structure far more effectively than does either (5) or (7).

To understand this example, note that the set of axioms (2) is "generated" by a set of transformations on the underlying variables. In one transformation, we swap the values of A and B for x, corresponding to the permutation $$(a(A,A), a(B,A))(a(A,B), a(B,B))(c(A,A), c(B,A))$$
$$(c(A,B), c(B,B))$$

where we have included in a single permutation the induced changes to all of the relevant ground literals. (The relation b doesn't appear because b does not have x as an argument in (1).) In terms of the literals in (7), this becomes $$w_x = (l_1 l_3)(l_2 l_4)(l_9 l_{11})(l_{10} l_{12})$$

In a similar way, swapping the two values for y corresponds to the permutation $$w_y = (l_1 l_2)(l_3 l_4)(l_5 l_7)(l_6 l_8)$$

and z produces $$w_z = (l_5 l_6)(l_7 l_8)(l_9 l_{10})(l_{11} l_{12})$$

Now consider the subgroup of $\mathrm{Sym}(\{l_i\})$ that is generated by $w_x$, $w_y$, and $w_z$. We will follow the usual convention and denote this by $$\Omega = \langle w_x, w_y, w_z \rangle \tag{13}$$

Proposition 3.2 The image of any single clause in the set (2) under $\Omega$ as in (13) is exactly the complete set of clauses (2).

As an example, operating on the first axiom in (2) with $w_x$ produces $$l_3 \vee l_5 \vee l_{11}$$

This is the fifth axiom, exactly as it should be, since we have swapped a(A, A) with a(B, A) and c(A, A) with c(B, A).

Alternatively, a straightforward calculation shows that $$w_x w_y = (l_1 l_4)(l_2 l_3)(l_5 l_7)(l_6 l_8)(l_9 l_{11})(l_{10} l_{12})$$

and maps the first axiom in (5) to the next-to-last, the second axiom to last, and so on.

It should be clear at this point what all of these examples have in common. In every case, the set of ground instances corresponding to a single non-Boolean axiom can be generated from any single ground instance by the elements of a subgroup of the group $S_{2n}$ of permutations of the literals in the problem. The fact that only a tiny fraction of the subsets of $S_{2n}$ is closed under the group operations and therefore a subgroup suggests that this subgroup property in some sense captures and generalizes the general idea of structure that underlies our motivating examples.

Note, incidentally, that some structure is surely needed here; a problem in random 3-SAT for example, can always be encoded using a single 3-literal clause c and then that set of permutations needed to recover the entire problem from c in isolation. There is no structure because the relevant subset of $S_{2n}$ has no structure. The structure is implicit in the requirement that the set $\Omega$ used to produce the clauses be a group; as we will see, this structure has just the computational implications needed if we are to lift RBL and other Boolean satisfiability techniques to this broader setting.

Let us also point out the surprising fact that the subgroup idea captures all of the structures discussed in the introduction. It is not surprising that the various structures used to reduce proof size all have a similar flavor, or that the structure used to speed the inner loop be uniform. But it strikes us as remarkable that these two types of structure, used for such different purposes, are in fact instances of a single framework.

Instead of generalizing the language of Boolean satisfiability as seems required by the range of examples we have considered, it suffices to annotate ground clauses with the $\Omega$ needed to reproduce a larger axiom set. Before we formalize this, however, let us note that any "reasonable" permutation that switches $l_1$ and $l_2$ should respect the semantics of the axiomatization and switch $\neg l_1$ and $\neg l_2$ as well.

Definition 3.3 Given a set of n variables, we will denote by $W_n$ that subgroup of $S_{2n}$ that swaps $\neg l_1$ and $\neg l_2$ whenever it swaps $l_1$ and $l_2$.

Informally, an element of $W_n$ corresponds to a permutation of the n variables, together with a choice to flip some subset of them.

Proposition 3.4 $W_n$ is the wreath product of $S_2$ and $S_n$, typically denoted $S_2 \wr S_n$.

We are now in a position to state:

Definition 3.5 An augmented clause in an n-variable Boolean satisfiability problem is a pair (c, G) where c is a Boolean clause and $G \leq W_n$. A ground clause c' is an instance of an augmented clause (c, G) if there is some $g \in G$ such that c'=g(c).

The sections below demonstrate that augmented clauses have the following properties:

1. They can be represented compactly,
2. They can be combined efficiently using a generalization of resolution,
3. They generalize existing concepts such as quantification over finite domains, cardinality, and parity constraints, together with providing natural generalizations for proof techniques involving such constraints and for extended resolution,
4. RBL can be extended with little or no computational overhead to manipulate augmented clauses instead of ground ones, and
5. Propagation can be computed efficiently in this generalized setting.

3.3 Efficiency of Representation

For the first point, the fact that the augmentations G can be represented compactly is a consequence of G's group structure. In the example surrounding the reconstruction of (5) from (9), for example, the group in question is the full symmetry group on m elements, where m is the number of variables in the cardinality constraint. In the lifting example (7), we can describe the group in terms of the generators $w_x$, $w_y$, and $w_z$ instead of listing all eight elements that the group contains. In general, we have:

Proposition 3.6 Let S be a set of ground clauses, and (c, G) an equivalent augmented clause. Then a set of generators for $G = \langle w_1, \ldots, w_k \rangle$ can be found in polynomial time such that $k \leq \log_2 |G|$.

Let us make a remark regarding computational complexity. Essentially any group-theoretic construct can be computed in time polynomial in the group size; basically one simply enumerates the group and evaluates the construction (generate and test, as it were). What is interesting is the collection of group constructions that can be computed in time polynomial in the number of generators of the group. In our case, this corresponds to polylog time in the number of instances of the augmented clauses involved.

In any event, Proposition 3.6 is the first of the results promised: In any case where n Boolean axioms can be captured as instances of an augmented clause, that augmented clause can be represented using $O(\log_2 n)$ generators.

The proof of Proposition 3.6 requires the following result from group theory:

Theorem 3.7 (Lagrange) If G is a finite group and $S \leq G$, then $|S|$ divides $|G|$.

Corollary 3.8 Any augmented clause in a theory containing n literals can be expressed in $O(n^2 \log_2 n)$ space.

In fact, Corollary 3.8 can be strengthened using:

Proposition 3.9 Any subgroup of $S_n$ can be described in polynomial time using at most $O(n)$ generators.

This reduces the $O(n^2 \log_2 n)$ in the corollary to simply $O(n^2)$.

4 Inference

4.1 Resolution

In this section, we begin the process of discussing derivations based on augmented clauses instead of ground ones. We begin with a few preliminaries:

Definition 4.1 Two augmented clauses $(c_1, G_1)$ and $(C_2, G_2)$ will be called equivalent if they have identical sets of instances. This will be denoted $(c_1, G_1) \equiv (c_2, G_2)$.

Proposition 4.2 Let (c, G) be an augmented clause. Then if c' is any instance of (c, G), $(c, G) \equiv (c', G)$.

Proposition 4.3 For ground clauses $c_1$ and $c_2$ and a permutation $w \in W_n$, $$\text{resolve}(w(c_1), w(c_2)) = w(\text{resolve}(c_1, c_2))$$

Definition 4.4 If C is a set of augmented clauses, we will say that C entails an augmented clause (c, G), writing $C \models (c, G)$, if every instance of (c, G) is entailed by the set of instances of the augmented clauses in C.

Lemma 4.5 If $G_1$ and $G_2$ are subgroups of G, so is $G_1 \cap G_2$.

We are now in a position to consider lifting the idea of resolution to our setting, but let us first discuss the overall intent of this lifting and explain an approach that doesn't work.

What we would like to do is to think of an augmented clause as having force similar to all of its instances; as a result, when we resolve two augmented clauses $(c_1, G_1)$ and $(c_2, G_2)$, we would like to obtain as the (augmented) resolvent the set of all resolutions that are sanctioned by resolving an instance of $(c_1, G_1)$ with one of $(c_2, G_2)$. At a minimum, we can certainly conclude (c, $G_1 \cap G_2$) where c is the conventional resolvent of $c_1$ and $c_2$, since every instance corresponds to a permutation that is sanctioned by the individual augmented resolvents. Is this good enough?

Consider an example. Suppose that there are four variables in our problem, a, b, c and d and that we are resolving the two clauses $$(a \lor b, \langle (bc) \rangle)$$

which has instances $a \lor b$ and $a \lor c$ and $$(\neg a \lor d, \langle \rangle)$$

which has the single instance $\neg a \lor d$. We will write these somewhat more compactly as $$(a \lor b, (bc)) \tag{14}$$

and $$(\neg a \lor d, 1) \tag{15}$$

respectively. If we resolve and intersect the groups, we conclude $$(b \lor d, 1)$$

If we resolve the clauses individually, however, we see that we should be able to derive the pair of clauses $b \lor d$ and $c \lor d$; in other words, the augmented clause $$(b \lor d, (bc)) \tag{16}$$

It certainly seems as if it should be possible to capture this in our setting, since the clause in (16) is just the resolvent of the clauses appearing in (14) and (15). Where does the group generated by (bc) come from?

If we want to retain the idea of intersecting the groups in the original clauses, the most natural approach seems to be to recognize that neither b nor c appears in (15), so that we can rewrite (15) in the equivalent form $$(\neg a \lor d, (bc)) \tag{17}$$

because exchanging b and c in $\neg a \lor d$ has no effect at all. The group (bc) in (16) is now the intersection of the groups in (14) and (17), as desired.

Unfortunately, there are two problems with this idea. The simpler is that it seems inappropriate to require that an augmented version of the clause $\neg a \lor d$ refer explicitly to the remaining variables in the theory (b and c). Surely the representation of a clause should be independent of the problem of which that clause is a part.

More serious, however, is that the approach that we have just given simply doesn't work. Suppose that we augment our existing theory with a fifth variable e. Now assuming that we keep track of all of the unmentioned variables in the augmented clauses, (14) becomes $$(a \lor b, (bc) \times W_{de}) \tag{18}$$

where $W_{de}$ denotes the group that exchanges d and e arbitrarily and may flip either (or both) of them as well. We continue to be able to exchange b and c, of course. In an analogous way, (15) becomes $$(\neg a \lor d, W_{\{bce\}}) \tag{19}$$

where we indicate that we are free to swap b, c and e in any way consistent with Definition 3.3 of the $W_i$.

It is not hard to see that $$W_{\{bce\}} \cap ((bc) \times W_{de}) = (bc) \times W_e$$

so that the result of resolving (18) and (19) would be $$(b \vee d, (bc) \times W_e)$$

This appears to be successful, but is not, because the resolvent needs instead to be $$(b \vee d, (bc) \times W_{ae})$$

if we are to continue to resolve with other augmented clauses. We have lost the implicit symmetry resulting from the fact that a has been eliminated from the resolved clause.

The difficulties become clearer if we imagine resolving $$(a \vee b, \text{Sym}(\{bcd\}))$$

corresponding to the three clauses $a \vee b$, $a \vee c$ and $a \vee d$, with $$(\neg a \vee e, (de))$$

corresponding to $\neg a \vee e$ and $\neg a \vee d$. The clauses that are sanctioned by the resolution should be $$b \vee d$$
$$b \vee e$$
$$c \vee d$$
$$c \vee e$$
$$d \vee e$$

where we have not included $d \vee d$ because it would correspond to a permutation where both b and e are mapped to d.

The difficulty is that there is no subgroup of the permutation group that concisely captures the above clauses. It appears that the best that we can do is the following:

Definition 4.6 Let w be a permutation and S a set. Then by $w|_S$ we will denote the result of restricting the permutation to the given set.

Definition 4.7 For $K_i \subseteq L$ and $G_i \leq \text{Sym}(L)$, we will say that a permutation $w \in \text{Sym}(L)$ is an extension of $\{G_i\}$ if there are $g_i \in G_i$ such that for all i, $w|_{K_i} = g_i|_{K_i}$. We will denote the set of extensions of $\{G_i\}$ by $\text{extn}(K_i, G_i)$.

The extensions need to simultaneously extend elements of all of the individual groups $G_i$, acting on the various subsets $K_i$.

Definition 4.8 Suppose that $(c_1, G_1)$ and $(c_2, G_2)$ are augmented clauses. Then a resolvent of $(c_1, G_1)$ and $(c_2, G_2)$ is any augmented clause of the form $(\text{resolve}(c_1, c_2), G)$ where $G \leq (\text{extn}(c_i, G_i) \cap W_n)$.

Proposition 4.9 Augmented resolution is sound, in that $$(c_i, G_1) \vee (c_2, G_2) \models (c, G)$$

for any $(c, G)$ that is a resolvent of $(c_1, G_1)$ and $(c_2, G_2)$.

We also have:

Proposition 4.10 If $\text{extn}(c_i, G_i) \cap W_n$ is a subgroup of $W_n$, then augmented resolution is complete in the sense that $$(\text{resolve}(c_1, c_2), \text{extn}(c_i, G_i) \cap W_n) \models \text{resolve}(w(c_1), w(c_2))$$

for any permutation of literals $w \in W_n$ such that $w|_{c_1} \in G_1$ and $w|_{c_2} \in G_2$.

In general, however, the set of extensions need not be a subgroup of $W_n$, and we would like a less ambiguous construction. To that end, we can modify Definition 4.7 as follows:

Definition 4.11 For $K_i \subseteq L$ and $G_i \leq \text{Sym}(L)$, we will say that a permutation $w \in \text{Sym}(L)$ is a stable extension of $\{G_i\}$ if there are $g_i \in G_i$ such that for all i, $w|_{G_i(K_i)} = g_i|_{G_i(K_i)}$. We will denote the set of stable extensions of $\{G_i\}$ by $\text{stab}(K_i, G_i)$.

This definition is modified from Definition 4.7 only in that the restriction of w is not just to the original variables in $K_i$, but to $G_i(K_i)$, the image of $K_i$ under the action of the group $G_i$.

Proposition 4.12 $\text{stab}(K_i, G_i) \leq \text{Sym}(L)$.

In other words, $\text{stab}(K_i, G_i)$ is a subgroup of $\text{Sym}(L)$.

Definition 4.13 Suppose that $(c_1, G_1)$ and $(c_2, G_2)$ are augmented clauses. Then the canonical resolvent of $(c_1, G_1)$ and $(c_2, G_2)$, to be denoted by $\text{resolve}((c_1, G_1), (c_2, G_2))$, is the augmented clause $(\text{resolve}(c_1, c_2), \text{stab}(c_i, G_i) \cap W_n)$.

Although this definition is stronger than one involving intersection, note that we might have $$(c, G) \models (c', G')$$

but not have $$\text{resolve}((c, G), (d, H)) \models \text{resolve}((c', G'), (d, H))$$

The reason is that if $c = c'$ but $G' < G$, the image of c under G may be larger than the image under G', making the requirement of stability for images under G more stringent than the requirement of stability for images under G'. We know of no examples where this phenomenon occurs in practice, although one could presumably be constructed.

Proposition 4.14 $\text{resolve}((c_1, G), (c_2, G)) \equiv (\text{resolve}(c_1, c_2), G)$.

Proposition 4.15 $\text{resolve}((c_1, G_1), (c_2, G_2)) \models (\text{resolve}(c_1, c_2), G_1 \cap G_2)$.

There is a variety of additional remarks to be made about Definition 4.13. First, the resolvent of two augmented clauses can depend on the choice of the representative elements in addition to the choice of subgroup of $\text{extn}(c_i, G_i)$. Thus, if we resolve $$(l_1, (l_1 l_2)) \qquad (20)$$

with $$(\neg l_1, 1) \qquad (21)$$

we get a contradiction. But if we rewrite (20) so that we are attempting to resolve (21) with $$(l_2, (l_1 l_2))$$

no resolution is possible at all.

We should also point out that there are computational issues involved in either finding a subgroup of $\text{extn}(c_i, G_i)$ or evaluating the specific subgroup $\text{stab}(c_i, G_i)$. If the component groups $G_1$ and $G_2$ are described by listing their elements, an incremental construction is possible where generators are gradually added until it is impossible to extend the group further without violating Definition 4.8 or Definition 4.13. But if $G_1$ and $G_2$ are described only in terms of their generators as suggested by Proposition 3.6, computing either $\text{stab}(c_i, G_i)$ or a maximal subgroup of $\text{extn}(c_i, G_i)$ involves the following computational subtasks:

1. Given a group G and set C, find the subgroup $G' \leq G$ of all $g \in G$ such that $G'(C) = C$.

This set is easily seen to be a subgroup and is called the set stabilizer of C. It is often denoted $G_{\{c\}}$.

2. Given a group G and set C, find the subgroup $G' \leq G$ of all $g \in G$ such that $g(c) = c$ for every $c \in C$. This set is also a subgroup and is called the pointwise stabilizer of C. It is typically denoted $G_C$.

3. Given two groups $G_1$ and $G_2$ described in terms of generators, find a set of generators for $G_1 \cap G_2$.
4. Given G and C, let $w \in G_{\{C\}}$. Now $w|_c$, the restriction of w to C, makes sense because $w(C)=C$. Given a pthat is such a restriction, find an element $p' \in G$ such that $p'|=p$.

Although the average case complexity of the above operations appears to be polynomial, the worst case complexity is known to be polynomial only for the second and fourth. The worst case for the other two tasks is unknown but is generally believed not to be in P (as usual, in terms of the number of generators of the groups, not their absolute size).

In the introduction, we claimed that the result of resolution was unique using reasons and that, "The fundamental inference step in ZAP is in NP with respect to the ZAP representation, and therefore has worst case complexity exponential in the representation size (i.e., polynomial in the number of Boolean axioms being resolved). The average case complexity appears to be low-order polynomial in the size of the ZAP representation." The use of reasons breaks the ambiguity surrounding (20) and (21), and the remarks regarding complexity correspond to the computational observations just made.

4.2 Introduction of New Groups

There is another type of inference that is possible in the ZAP setting. Suppose that we have derived $$a \vee b$$

and $$a \vee c$$

or, in augmented form, $$(a \vee b, 1) \quad (22)$$

and $$(a \vee c, 1) \quad (23)$$

Now we would like to be able to replace the above axioms with the single $$(a \vee b, (bc)) \quad (24)$$

Not surprisingly, this sort of replacement will underpin our eventual proof that augmented resolution can p-simulate extended resolution.

Definition 4.16 Let $S=\{(c_i, G_i)\}$ be a set of augmented clauses. We will say that an augmented clause (c, G) follows from S by introduction if every instance of (c, G) is an instance of one of the $(c_i, G_i)$.

Lemma 4.17 Let S be a set of augmented clauses. Then an augmented clause (c, G) follows from S by introduction if there is a single $(c_0, G_0) \in S$ such that c is an instance of $(c_0, G_0)$ and $G \leq G_0$.

Note that the converse does not hold. If $S=\{(a, (abc))\}$ and the augmented clause (c, G) is (a, (ab)), then (c, G) has as instances a and b, each of which is an instance of the single augmented clause in S. But the group generated by (ab) is not a subgroup of the group generated by (abc).

There is one additional technique that we will need. Suppose that we know $$a \vee x \quad (25)$$

and $$b \vee y \quad (26)$$

and want to conclude $a \vee b \vee (x \vee y)$ or, in our terms, the augmented clause $$(a \vee b \vee x, (xy)) \quad (27)$$

Can we do this via introduction?

We would like to, but we cannot. The reason is that the instances of (27) do not actually appear in (25) or (26); a $\vee b \vee x$ is not an instance of a $\vee x$, but is instead a weakening of it. (This definition describes weakening the clausal part of an augmented clause; weakening the group by restricting to a subgroup is covered by introduction as described in Lemma 4.17.)

Definition 4.18 An augmented clause (c', G) is a weakening of an augmented clause (c, G) if c' is a superset of c.

It is known that proof lengths under resolution or extended resolution do not change if weakening is included as an allowable inference. (Roughly speaking, the literals introduced during a weakening step just have to be resolved away later anyway.) For augmented resolution, this is not the case.

As we will see in the next section, introduction of new groups is equivalent to the introduction of new variables in extended resolution. Unlike extended resolution, however, where it is unclear when new variables should be introduced and what those variables should be, the situation in ZAP is clearer because the new groups are used to collapse the partitioning of a single augmented clause. One embodiment of ZAP itself does not include introduction as an inference step.

5 Examples and Proof Complexity

Let us now turn to the examples that we have discussed previously: first-order axioms that are quantified over finite domains, along with the standard examples from proof complexity, including pigeonhole problems, clique coloring problems and parity constraints. For the first, we will see that our ideas generalize conventional notions of quantification while providing additional representational flexibility in some cases. For the other examples, we will present a ground axiomatization, recast it using augmented clauses, and then give a polynomially sized derivation of unsatisfiability using augmented resolution. Finally, we will show that augmented resolution can p-simulate extended resolution.

5.1 Lifted Clauses and QPROP

To deal with lifted clauses, suppose that we have a quantified clause such as $$\forall xyz. a(x, y) \vee b(y, z) \vee c(z) \quad (28)$$

We will assume for simplicity that the variables have a common domain D, so that a grounding of the clause (28) involves working with a map that takes a pair of elements $d_1, d_2$ of D and produces the ground variable corresponding to $a(d_1, d_2)$. In other words, if V is the set of variables in our problem, there is an injection $$a: D \times D \to V$$

In a similar way, there are injections $$b: D \times D \to V$$

and $$c: D \to V$$

where the images of a, b and c are disjoint and each is an injection because distinct relation instances must be mapped to distinct ground atoms.

Now given a permutation w of the elements of D, it is not hard to see that w induces a permutation $w_x$ on V given by:

$$\omega_x(v) = \begin{cases} a(\omega(x), y), & \text{if } v = a(x, y); \\ v; & \text{otherwise.} \end{cases}$$

In other words, there is a mapping x from the set of permutations on D to the set of permutations on V:

x: Sym(D)→Sym(V)

Definition 5.1 Let G and H be groups and f: G→H a function between them. f will be called a homomorphism if it respects the group operations in that $f(g_1 g_2) = f(g_1) f(g_2)$ and $f(g^{-1}) = f(g)^{-1}$.

Proposition 5.2 x: Sym(D)→Sym(V) is an injection and a homomorphism.

In other words, x makes a "copy" of Sym(D) inside of Sym(V) corresponding to permuting the elements of x's domain.

In a similar way, we can define homomorphisms y and z given by $$\omega_y(v) = \begin{cases} a(x, \omega(y)), & \text{if } v = a(x, y); \\ b(\omega(y), z), & \text{if } v = b(y, z); \\ v; & \text{otherwise.} \end{cases}$$

and $$\omega_z(v) = \begin{cases} b(y, \omega(z)), & \text{if } v = b(y, z); \\ c(\omega(z)), & \text{if } v = c(z); \\ v; & \text{otherwise.} \end{cases}$$

Now consider the subgroup of Sym(V) generated by $w_x(\text{Sym}(D))$, $w_y(\text{Sym}(D))$ and $w_z(\text{Sym}(D))$. It is clear that the three subgroups commute with one another, and that their intersection is only the trivial permutation. This means that x, y and z collectively inject the product D×D×D into Sym(V); we will denote this by xyz: $D^3$→Sym(V)

and it should be clear that the original quantified axiom (28) is equivalent to the augmented axiom (a(A, B) ∨ b(B, C) ∨ c(C), xyz($D^3$)))

where A, B and C are any (not necessarily distinct) elements of D. The quantification is exactly captured by the augmentation.

An interesting thing is what happens to resolution in this setting:

Proposition 5.3 Let p and q be quantified clauses such that there is a term $t_p$ in p and $\neg t_q$ in q where $t_p$ and $t_q$ have common instances. Suppose also that ($p_g$, P) is an augmented clause equivalent to p and ($q_g$, Q) is an augmented clause equivalent to q, with $p_g$ and $q_g$ resolving nontrivially. Then if no other terms in p and q have common instances, the result of resolving p and q in the conventional lifted sense is equivalent to resolve(($p_g$, P), ($q_g$, Q)).

Note that the condition requiring lack of commonality of ground instances is necessary; consider resolving a(x) ∨ b with a(y) ∨ ¬b In the quantified case, we get ∀xy.a(x) ∨ a(y)         (29)

In the augmented case, it is not hard to see that if we resolve (a(A) ∨ b, G) with (a(A) ∨ ¬b, G) we get (a(A), G)

corresponding to

∀x.a(x)         (30)

while if we choose to resolve (a(A) ∨ b, G) with (a(B) ∨ ¬b, G), we get instead

∀x≠y.a(x) ∨ a(y)

It is not clear which of these representations is superior. The conventional (29) is more compact, but obscures the fact that the stronger (30) is entailed as well. This particular example is simple, but other examples involving longer clauses and some residual unbound variables can be more complex.

5.2 Proof Complexity without Introduction 5.2.1 Pigeonhole Problems

Of the examples known to be exponentially difficult for conventional resolution-based systems, pigeonhole problems are in many ways the simplest. As usual, we will denote by $p_{ij}$ the fact that pigeon i (of n+1) is in hole j of n, so that there are $n^2$+n variables in the problem. We denote by G the subgroup of $W_{n^2+n}$ that allows arbitrary exchanges of the n+1 pigeons or the n holes, so that G is isomorphic to $S_{n+1} \times S_n$. This is the reason that this particular example will be so straightforward: there is a single global group that we will be able to use throughout the entire analysis.

Our axiomatization is now:

(¬$p_{11}$ ∨ ¬$p_{21}$, G)         (31)

saying that no two pigeons can be in the same hole, and ($p_{11}$ ∨ ... ∨ $p_{1n}$, G)         (32)

saying that the first (and thus every) pigeon has to be in some hole.

Proposition 5.4 There is an augmented resolution proof of polynomial size of the mutual unsatisfiability of (31) and (32).

Proposition 5.5 Any implementation of Procedure 2.10 that branches on positive literals in unsatisfied clauses on line 14 will produce a proof of polynomial size of the mutual unsatisfiability of (31) and (32), independent of specific branching choices made.

This strikes us as a remarkable result: Not only is it possible to find a proof of polynomial length in the augmented framework, but in the presence of unit propagation, it is difficult not to!

5.2.2 Clique Coloring Problems

The pigeonhole problem is difficult for resolution but easy for many other proof systems; clique coloring problems are difficult for both resolution and other approaches such as pseudo-Boolean axiomatizations.

The clique coloring problems are derivatives of pigeonhole problems where the exact nature of the pigeonhole problem is obscured. Somewhat more specifically, they say that a graph includes a clique of n+1 nodes (where every node in the clique is connected to every other), and that the graph must be colored in n colors. If the graph itself is known to be a clique, the problem is equivalent to the pigeonhole problem. But if we know only that the clique can be embedded into the graph, the problem is more difficult.

To formalize this, we will use $e_{ij}$ to describe the graph, $c_{ij}$ to describe the coloring of the graph, and $q_{ij}$ to describe the embedding of the cliQue into the graph. The graph has m nodes, the clique is of size n+1, and there are n colors available. The axiomatization is:

$$\neg e_{ij} \vee \neg c_{il} \vee \neg c_{jl} \text{ for } 1 \leq i < j \leq m, l=1, \ldots, n \quad (33)$$

$$c_{i1} \vee \ldots \vee c_{in} \text{ for } i=1, \ldots, m \quad (34)$$

$$q_{i1} \vee \ldots \vee q_{im} \text{ for } i=1, \ldots, n+1 \quad (35)$$

$$\neg q_{ij} \vee \neg q_{kj} \text{ for } 1 \leq i < k \leq n+1, j=1, \ldots, m \quad (36)$$

$$e_{ij} \vee \neg q_{ki} \vee \neg q_{lj} \text{ for } 1 \leq i < j \leq m, 1 \leq k \neq l \leq n+1 \quad (37)$$

Here $e_{ij}$ means that there is an edge between graph nodes i and j, $c_{ij}$ means that graph node i is colored with the jth color, and $q_{ij}$ means that the ith element of the clique is mapped to graph node j. Thus the first axiom (33) says that two of the m nodes in the graph cannot be the same color (of the n colors available) if they are connected by an edge. (34) says that every graph node has a color. (35) says that every element of the clique appears in the graph, and (36) says that no two elements of the clique map to the same node in the graph. Finally, (37) says that the clique is indeed a clique—no two clique elements can map to disconnected nodes in the graph. As in the pigeonhole problems, there is a global symmetry in this problem in that any two nodes, clique elements or colors can be swapped.

Proposition 5.6 There is an augmented resolution proof of polynomial size of the mutual unsatisfiability of (33)-(37).

5.2.3 Parity Constraints

Rather than discuss a specific example here, we can show the following:

Proposition 5.7 Let C be a theory consisting entirely of parity constraints. Then determining whether or not C is satisfiable is in P for augmented resolution.

Definition 5.8 Let S be a subset of a set of n variables. We will denote by $F_S$ that subset of $W_n$ consisting of all permutations that leave the variable order unchanged and flip an even number of variables in S.

Lemma 5.9 $F_S \leq W_n$.

Lemma 5.10 Let $S = \{x_1, \ldots x_k\}$ be a subset of a set of n variables. Then the parity constraint $$\Sigma x_i = 1 \quad (38)$$

is equivalent to the augmented constraint $$(x_1 \vee \ldots \vee x_k, F_S) \quad (39)$$

The parity constraint $$\Sigma x_i = 0$$

is equivalent to the augmented constraint $$(\neg x_1 \vee x_2 \vee \ldots \vee x_k, F_S)$$

The construction in the proof fails in the case of modularity constraints with a base other than 2. One of the (many) problems is that the set of permutations that flip a set of variables of size congruent to m (mod n) is not a group unless m=0 and n<3. We need m=0 for the identity to be included, and since both $$(x_1, \neg x_1) \ldots (x_n, \neg x_n)$$

and $$(x_2, \neg z_2) \ldots (x_{n+1}, \neg x_{n+1})$$

are included, it follows that $$(x_1, \neg x_1)(x_{n+1}, \neg x_{n+1})$$

must be included, so that n=1 or n=2.

5.3 Extended Resolution and Introduction

We conclude this section by describing the relationship between our methods and extended resolution. As a start, we have:

Definition 5.11 An extended resolution proof for a theory T is one where T is first augmented by a collection of sets of axioms, each set of the form $$\neg x_1 \vee \ldots \vee \neg x_n \vee w$$

$$x_1 \vee \neg w \ldots x_n \vee \neg w \quad (40)$$

where $x_1, \ldots, x_n$ are literals in the (possibly already extended) theory T and w is a new variable. Derivation then proceeds using conventional resolution on the augmented theory.

The introduction defines the new variable w as equivalent to the conjunction of the $x_i$'s. This suffices to allow the definition of an equivalent to any subexpression, since de Morgan's laws can be used to convert disjunctions to conjunctions if need be. A conventional definition of extended resolution allows only n=2, since complex terms can be built up from pairs. The equivalent definition that we have given makes the proof of Theorem 5.12 more convenient.

Theorem 5.12
1. If resolution cannot p-simulate a proof system P, neither can augmented resolution without introduction.
2. Augmented resolution with introduction and weakening can p-simulate extended resolution.

This theorem, together with the results of the previous subsection, support the proof complexity claims made for ZAP in the introduction.

6 Theoretical and Procedural Description

In addition to resolution, an examination of Procedures 2.10 and 2.7 shows that we need to be able to eliminate nogoods when they are irrelevant and to identify instances of augmented clauses that are unit. Let us now discuss each of these issues.

The problems around irrelevance are incurred only when a new clause is added to the database and are therefore not in the ZAP inner loop. Before discussing these in detail, however, let us discuss a situation involving the quantified transitivity axiom $$\neg a(x, y) \vee \neg a(y, z) \vee a(x, z)$$

Now if we are trying to derive a(A, B) for an A and a B that are "far apart" given the skeleton of the relation a that we already know, it is possible that we derive $$a(A, x) \vee a(x, B) \rightarrow a(A, B)$$

as we search for a proof involving a single intermediate location, and then $$a(A, x) \vee a(x, y) \vee a(y, B) \rightarrow a(A, B)$$

as we search for a proof involve two such locations, and so on, eventually concluding $$a(A, x_1) \vee \ldots \vee a(x_n, B) \to a(A, B) \qquad (41)$$

for some suitably large n. The problem is that if d is the size of our domain, (41) will have $d^{2n-2}$ ground instances and is in danger of overwhelming our unit propagation algorithm even in the presence of reasonably sophisticated subsearch techniques. We argued previously that this problem requires that we learn only a version of (41) for which every instance is relevant. A way to do this is as follows:

Procedure 6.1 Given a SAT problem C and an annotated partial assignment P, to compute learn(C, P, (c, G)), the result of adding to C an augmented clause (c, G):

```
1   remove from C any (d, H) for which every instance d' has
    poss(d', P) > k
2   {g_i} ← the generators of G
3   S ← ∅
4   while there is a g ∈ {g_i} − S such that ∀d ∈ (c,
    <S ∪ {g}>) . poss(d, P) ≦ k
5      do select such a g
6         S ← S ∪ {g}
7   return C ∪ {(c, <S>)}
```

The procedure gradually adds generators of the group until it is impossible to add more without introducing an irrelevant clause (or perhaps because the entire group G has been added). We will defer until below a discussion of a procedure for determining whether (c, <S∪{g}>) has an irrelevant instance or whether (d, H) has only irrelevant instances as checked in line 1.

We will also defer discussion of a specific procedure for computing unit-propagate(P), but do include a few theoretical comments at this point. In unit propagation, we have a partial assignment P and need to determine which instances of axioms in C are unit. To do this, suppose that we denote by S(P) the set of Satisfied literals in the theory, and by U(P) the set of Unvalued literals. Now for a particular augmented clause (c, G), we are looking for those g∈G such that g(c)∩S(P)=∅ and |g(c)∩U(P)|≦1. The first condition says that g(c) has no satisfied literals; the second, that it has at most one unvalued literal.

Procedure 6.2 (Unit propagation) To compute UNIT-PROPAGATE(P) for an annotated partial assignment P=<($l_1$, $c_1$), . . . , ($l_n$, $c_n$)>:

```
1   while there is a (c, G) ∈ C and g ∈ G with g(c) ∩ S(P) = ∅ and
    |g(c) ∩ U(P)| ≦ 1
2      do if g(c) ∩ U(P) = ∅
3         then l_i ← the literal in g(c) with the highest index in P
4            return <true, resolve((c, G), c_i)>
5         else l ← the literal in g(c) unassigned by P
6            add (l, (g(c), G)) to P
7   return <false, P>
```

Note that the addition made to P when adding a new literal includes both g(c), the instance of the clause that led to the propagation, and the augmenting group as usual. We can use (g(c), G) as the augmented clause by virtue of Proposition 4.2.

Finally, the augmented version of Procedure 2.10 is:

Procedure 6.3 (Relevance-bound reasoning, RBL) Given a SAT problem C and an annotated partial assignment P, to compute RBL(C, P):

```
1   if P is a solution to C
2      then return P
3   <x, y> ← UNIT-PROPAGATE(P)
4   if x = true
5      then (c, G) ← y
6         if c is empty
7            then return FAILURE
8            else remove successive elements from P so that c is unit
9               C ← learn(C, P, (c, G))
10              return RBL(C, P)
11  else P ← y
12     if P is a solution to C
13        then return P
14        else l ← a literal not assigned a value by P
15           return RBL(C, <P, (l, true)>)
```

Examining the previous three procedures, we see that we need to provide implementations of the following:
1. A routine that computes the group of stable extensions appearing in the definition of augmented resolution, needed by line 4 in the unit propagation procedure 6.2.
2. A routine that finds instances of (c, G) for which g(c) ∩S=∅ and |g(c)∩U|≦1 for disjoint S and U, needed by line 1 in the unit propagation procedure 6.2.
3. A routine that determines whether (c, G) has instances for which poss(g(c), P)>k for some fixed k, as needed by line 4 in Procedure 6.1.
4. A routine that determines whether (c, G) has an instance for which poss(g(c), P)≦k for some fixed k, as needed by line 1 in Procedure 6.1.

Our focus below is on the development of efficient procedures that achieve these goals.

7 Conclusion

Our aim in this paper has been to give a theoretical description of a generalized representation scheme for satisfiability problems. The basic building block of the approach is an "augmented clause," a pair (c, G) consisting of a ground clause c and a group G of permutations acting on it; the intention is that the augmented clause is equivalent to the conjunction of the results of operating on c with elements of G. We argued that the structure present in the requirement that G be a group provides a generalization of a wide range of existing notions, from quantification over finite domains to parity constraints.

We went on to show that resolution could be extended to deal with augmented clauses, and gave a generalization of relevance-based learning in this setting (Procedures 6.1-6.3). We also showed that the resulting proof system generalized first-order techniques when applied to finite domains of quantification, and could produce polynomially sized proofs of the pigeonhole problem, clique coloring problems, Tseitin's graph coloring problems, and parity constraints in general. These results are obtained without the introduction of new variables or other choice points; a resolution in our generalized system is dependent simply on the selection of two augmented clauses to combine. We also showed that if new groups could be introduced, the system was at least as powerful as extended resolution.

Finally, we described the specific group-theoretic problems that need to be addressed in implementing our ideas. As discussed in the previous section, they are:
1. Implementing the group operation associated with the generalization of resolution,
2. Finding unit instances of an augmented clause, 3. Determining whether an augmented clause has irrelevant instances, and
4. Determining whether an augmented clause has relevant instances.

We will return to these issues below.

IMPLEMENTATION

1 Introduction

Our overall plan for describing an embodiment of ZAP is as follows:
1. Section 2 is a review of material from ZAP2. We begin in Section 2.1 by presenting both the Boolean satisfiability algorithms that we hope to generalize and the basic algebraic ideas underlying ZAP. Section 2.2 describes the group-theoretic computations utilized by the ZAP implementation.
2. Section 3 gives a brief introduction to some of the ideas in computational group theory that we use.
3. Sections 4 and 5 describe the implementations of the computations discussed in Section 2. For each basic construction, we describe the algorithm used and give an example of the computation in action.
4. Section 6 extends the basic algorithms of Section 5 to deal with unit propagation, where we want to compute not a single unit clause instance, but a list of all of the unit consequences of an augmented clause.
5. Section 7 discusses the implementation of Zhang and Stickel's watched literal idea in our setting.
6. Section 8 describes a technique that can be used to select among the possible resolvents of two augmented clauses. This is functionality with no analog in a conventional prover, where there is only a single ground reason for the truth or falsity of any given variable. If the reasons are augmented clauses, there may be a variety of ways in which ground instances of those clauses can be combined.

After describing the implementation, we describe the interface to one embodiment in Section 9.

2 Zap Fundamentals and Basic Structure

Our overview of ZAP involves summarizing work from two distinct areas: existing Boolean satisfiability engines, and the group-theoretic elements underlying ZAP.

2.1 Boolean Satisfiability

We begin with a description of the architecture of modern Boolean satisfiability engines. We start with the unit propagation procedure, which we describe as follows:

Definition 2.1 Given a Boolean satisfiability problem described in terms of a set C of clauses, a partial assignment is an assignment of values (true or false) to some subset of the variables appearing in C. We represent a partial assignment P as a sequence of literals $P=<l_i>$ where the appearance of $v_i$ in the sequence means that $v_i$ has been set to true, and the appearance of $\neg v_i$ means that $v_i$ has been set to false.

An annotated partial assignment is a sequence $P=<(l_i, c_i)>$ where $c_i$ is the reason for the associated choice $l_i$. If $c_i$=true, it means that the variable was set as the result of a branching decision; otherwise, $c_i$ is a clause that entails $l_i$ by virtue of the choices of the previous $l_j$ for j<i. An annotated partial assignment will be called sound with respect to a set of constraints C if C|=$c_i$ for each reason $c_i$. (See ZAP2 for additional details.)

Given a (possibly annotated) partial assignment P, we denote by S(P) the literals that are satisfied by P, and by U(P) the set of literals that are unvalued by P.

Procedure 2.2 (Unit propagation) To compute UNIT-PROPAGATE (C, P) for a set C of clauses and an annotated partial assignment $P=<(l_1, c_1), \ldots, (l_n, c_n)>$:

```
1  while there is a c ∈ C with c ∩ S(P) = ∅ and |c ∩ U(P)| ≤ 1
2      do if c ∩ U(P) = ∅
3          then l_i ← the literal in c with the highest index in P
4              return <true, resolve(c, c_i)>
5          else l ← the literal in c unassigned by P
6              P ← <P, (l, c)>
7  return <false, P>
```

The result returned depends on whether or not a contradiction was encountered during the propagation, with the first result returned being true if a contradiction was found and false if none was found. In the former case (where the clause c has no unvalued literals in line 2), then if c is the clause and $c_i$ is the reason that the last variable was set in a way that caused c to be unsatisfiable, we resolve c with $c_i$ and return the result as a new nogood for the problem in question. Otherwise, we eventually return the partial assignment, augmented to include the variables that were set during the propagation process.

Given unit propagation, the overall inference procedure is the following:

Procedure 2.3 (Relevance-bounded reasoning, RBL) Given a SAT problem C, a set of learned nogoods D and an annotated partial assignment P, to compute RBL(C, D, P):

```
1   <x, y> ← UNIT-PROPAGATE(C ∪ D, P)
2   if x = true
3       then c ← y
4           if c is empty
5               then return FAILURE
6               else remove successive elements from P so that c is unit
7                   D ← learn(D, P, c)
8                   return RBL(C, D, P)
9       else P ← y
10          if P is a solution to C
11              then return P
12              else l ← a literal not assigned a value by P
13                  return RBL(C, D, <P, (l, true)>)
```

As might be expected, the procedure is recursive. If at any point unit propagation produces a contradiction c, we use the learn procedure to incorporate c into the solver's current state, and then recurse. (If c is empty, it means that we have derived a contradiction and the procedure fails.) In the backtracking step (line 6), we backtrack not just until c is satisfiable, but until it enables a unit propagation. This leads to increased flexibility in the choice of variables to be assigned after the backtrack is complete, and generally improves performance.

If unit propagation does not indicate the presence of a contradiction or produce a solution to the problem in question, we pick an unvalued literal, set it to true, and recurse again. Note that we don't need to set the literal l to true or false; if we eventually need to backtrack and set l to false, that will be handled by the modification to P in line 6.

Finally, we need to present the procedure used to incorporate a new nogood into the clausal database C. In order to do that, we make the following definition:

Definition 2.4 Let $\vee_i l_i$ be a clause, which we will denote by c, and let P be a partial assignment. We will say that the possible value of c under P is given by $$poss(c, P) = |\{i | \neg l_i \notin P\}| - 1$$

If no ambiguity is possible, we will write simply poss(c) instead of poss(c, P). In other words, poss(c) is the number of literals that are either already satisfied or not valued by P, reduced by one (since the clause requires at least one true literal).

Note that $poss(c, P) = |c \cap [U(P) \cup S(P)]| - 1$, since each expression is one less than the number of potentially satisfiable literals in c.

The possible value of a clause is essentially a measure of what other authors have called its irrelevance. An unsatisfied clause c with poss(c, P)=0 can be used for unit propagation; we will say that such a clause is unit. If poss(c, P)=1, it means that a change to a single variable can lead to a unit propagation, and so on. The notion of learning used in relevance-bounded inference is now captured by:

Procedure 2.5 Given a set of clauses C and an annotated partial assignment P, to compute learn(C, P, c), the result of adding to C a clause c and removing irrelevant clauses:

| | |
|---|---|
| 1 | remove from C any $d \in C$ with poss(d, P) > k |
| 2 | return $C \cup \{c\}$ |

In ZAP, we continue to work with these procedures in approximately their current form, but replace the idea of a clause (a disjunction of literals) with that of an augmented clause:

Definition 2.6 An augmented clause in an n-variable Boolean satisfiability problem is a pair (c, G) where c is a Boolean clause and G is a group such that $G \leq W_n$. A (nonaugmented) clause c' is an instance of an augmented clause (c, G) if there is some $g \in G$ such that $c' = c^g$. The clause c itself will be called the base instance of (c, G).

Roughly speaking, an augmented clause consists of a conventional clause and a group G of permutations acting on it; the intent is that we can act on the clause with any element of the group and still get a clause that is "part" of the original theory. The group G is required to be a subgroup of the group of "permutations and complementations" $W_n = S_2 \wr S_n$, where each permutation $g \in G$ can permute the variables in the problem and flip the signs of an arbitrary subset as well. We showed in ZAP2 that suitably chosen groups correspond to cardinality constraints, parity constraints (the group flips the signs of any even number of variables), and universal quantification over finite domains.

We must now lift the previous three procedures to an augmented setting. In unit propagation, for example, instead of checking to see if any clause $c \in C$ is unit given the assignments in P, we now check to see if any augmented clause (c, G) has a unit instance. Other than that, the procedure is essentially unchanged from Procedure 2.2:

Procedure 2.7 (Unit propagation) To compute UNIT-PROPAGATE (C, P) for a set of clauses C and an annotated partial assignment $P = \langle (l_1, c_1), \ldots, (l_n, c_n) \rangle$:

| | |
|---|---|
| 1 | while there is a (c, G) $\in$ C and g $\in$ G with $c^g \cap S(P) = \emptyset$ and $|c^g \cap U(P)| \leq 1$ |
| 2 | do if $c^g \cap U(P) = \emptyset$ |
| 3 | then $l_i \leftarrow$ the literal in $c^g$ with the highest index in P |

-continued

| | |
|---|---|
| 4 | return $\langle$true, resolve($(c^g, G), c_i$)$\rangle$ |
| 5 | else l $\leftarrow$ the literal in $c^g$ unassigned by P |
| 6 | P $\leftarrow$ $\langle$P, (l, $(c^g, G)$)$\rangle$ |
| 7 | return $\langle$false, P$\rangle$ |

The basic inference procedure itself is also virtually unchanged:

Procedure 2.8 (Relevance-bounded reasoning, RBL) Given a SAT problem C, a set of learned clauses D, and an annotated partial assignment P, to compute RBL(C, D, P):

| | |
|---|---|
| 1 | $\langle x, y \rangle \leftarrow$ UNIT-PROPAGATE(C $\cup$ D, P) |
| 2 | if x = true |
| 3 | then (c, G) $\leftarrow$ y |
| 4 | if c is empty |
| 5 | then return FAILURE |
| 6 | else remove successive elements from P so that c is unit |
| 7 | D $\leftarrow$ learn(D, P, (c, G)) |
| 8 | return RBL(C, D, P) |
| 9 | else P $\leftarrow$ y |
| 10 | if P is a solution to C |
| 11 | then return P |
| 12 | else l $\leftarrow$ a literal not assigned a value by P |
| 13 | return RBL(C, D, $\langle$P, (l, true)$\rangle$) |

In line 3, although unit propagation returns an augmented clause (c, G), the base instance c is still the reason for the backtrack; it follows that line 6 is unchanged from the Boolean version.

To lift Procedure 2.5 to our setting, we need an augmented version of Definition 2.4:

Definition 2.9 Let (c, G) be an augmented clause, and P a partial assignment. Then b?y poss((c, G), P) we will mean the minimum possible value of an instance of (c, G), so that $$poss((c, G), P) = \min_{g \in G} poss(c^g, P)$$

Procedure 2.5 can now be used unchanged, with d being an augmented clause instead of a simple one. The effect of Definition 2.9 is to cause us to remove only augmented clauses for which every instance is irrelevant. Presumably, it will be useful to retain the clause as long, as it has some relevant instance.

In ZAP2, we showed that a proof engine built around the above three procedures would have the following properties:

Since the number of generators of a group is logarithmic in the group size, it would achieve exponential improvements in basic representational efficiency.

Since only k-relevant nogoods are retained as the search proceeds, the memory requirements remain polynomial in the size of the problem being solved.

It can produce polynomially sized proofs of the pigeonhole and clique coloring problems, and any parity problem.

It generalizes first-order inference provided that all quantifiers are universal and all domains of quantification are finite.

We stated without proof (and will show in this paper) that the unit propagation procedure 2.7 can be implemented in a way that generalizes both subsearch and Zhang and Stickel's watched literal idea.

2.2 Group-theoretic Elements

Examining the above three procedures, the elements that are new relative to Boolean engines are the following:

1. In line 1 of the unit propagation procedure 2.7, we need to find unit instances of an augmented clause (c, G).
2. In line 4 of the same procedure 2.7, we need to compute the resolvent of two augmented clauses.
3. In line 1 of the learning procedure 2.5, we need to determine if an augmented clause has any relevant instances.

The first and third of these needs are different from the second. For resolution, we need the following definition:

Definition 2.10 For a permutation p and set S with $S^p=S$, by $p|_S$ we will mean the restriction of p to the given set, and we will say that p is a lifting of $p|_S$ back to the original set on which p acts.

Definition 2.11 For $K_i \subseteq \Omega$ and $G_i \leq \text{Sym}(\Omega)$, we will say that a permutation $w \in \text{Sym}(\Omega)$ is a stable extension of $\{G_i\}$ for $\{K_i\}$ if there are $g_i \in G_i$ such that for all i, $w|_{K_i G_i} = g_i|_{K_i G_i}$. We will denote the set of stable extensions of $\{G_i\}$ for $\{K_i\}$ by $\text{stab}(K_i, G_i)$.

The set of stable extensions $\text{stab}(K_i, G_i)$ is closed under composition, and is therefore a subgroup of $\text{Sym}(\Omega)$.

Definition 2.12 Suppose that $(c_1, G_1)$ and $(c_2, G_2)$ are augmented clauses. Then the (canonical) resolvent of $(c_1, G_1)$ and $(c_2, G_2)$, to be denoted by $\text{resolve}((c_1, G_1), (c_2, G_2))$, is the augmented clause $(\text{resolve}(c_1, c_2), \text{stab}(c_i, G_i) \cap W_n)$.

It follows from the above definitions that computing the resolvent of two augmented clauses as required by Procedure 2.7 is essentially a matter of computing the set of stable extensions of the groups in question. We will return to this problem in Section 4.

The other two problems can both be viewed as instances of the following:

Definition 2.13 Let c be a clause, viewed as a set of literals, and G a group of permutations acting on c. Now fix sets of literals S and U, and an integer k. We will say that the k-transporter problem is that of finding a $g \in G$ such that $c^g \cap S = \emptyset$ and $|c^g \cap U| \leq k$, or reporting that no such g exists.

To find a unit instance of (c, G), we set S to be the set of satisfied literals and U the set of unvalued literals. Taking k=1 implies that we are searching for an instance with no satisfied and at most one unvalued literal.

To find a relevant instance, we set $S = \emptyset$ and U to be the set of all satisfied or unvalued literals. Taking k to be the relevance bound corresponds to a search for a relevant instance.

The remainder of the theoretical material in this paper is therefore focused on these two problems: Computing the stable extensions of a pair of groups, and solving the k-transporter problem. Before we discuss the techniques used to solve these two problems, we present a brief overview of computational group theory generally.

3 Computational Group Theory

Our goal here is to provide enough general understanding of computational group theory that it will be possible to work through some examples in what follows. With that in mind, there are three basic ideas that we hope to convey:

1. Stabilizer chains. These underlie the fundamental technique whereby large groups are represented efficiently. They also underlie many of the subsequent computations done using those groups.
2. Group decompositions. Given a group G and a subgroup H<G, H can be used in a natural way to partition G. Each of the partitions can itself be partitioned using a subgroup of H, and so on; this gradual refinement underpins many of the search-based group algorithms that have been developed.
3. Lex-leader search. In general, it is possible to establish a lexicographic ordering on the elements of a permutation group; if we are searching for an element of the group having a particular property (as in the k-transporter problem), we can assume without loss of generality that we are looking for an element that is minimal under this ordering. This often allows the search to be pruned, since any portion of the search that can be shown not to contain such a minimal element can be eliminated.

3.1 Stabilizer Chains

While the fact that a group G can be described in terms of an exponentially smaller number of generators $\{g_i\}$ is attractive from a representational point of view, there are many issues that arise if a large set of clauses is represented in this way. Perhaps the most fundamental is that of simple membership: How can we tell if a fixed clause c' is an instance of the augmented clause (c, G)?

In general, this is an instance of the 0-transporter problem; we need some $g \in G$ for which $c^g$, the image of c under 9, does not intersect the complement of c'. A simpler but clearly related problem assumes that we have a fixed permutation g such that $c^g = c'$; is $g \in G$ or not? Given a representation of G in terms simply of its generators, it is not obvious how this can be determined quickly.

Of course, if G is represented via a list of all of its elements, we could sort the elements lexicographically and use a binary search to determine if g were included. Virtually any problem of interest to us can be solved in time polynomial in the size of the groups involved, but we would like to do better, solving the problems in time polynomial in the number of generators, and therefore polynomial in the logarithm of the size of the groups (and so polylog in the size of the original clausal database). We will call a procedure polynomial only if it is indeed polytime in the number of generators of G and in the size of the set of literals on which G acts. It is only for such polynomial procedures that we can be assured that ZAP's representational efficiencies will mature into computational gains.[1]

[1] The development of computationally effective procedures for solving group theoretic problems appears to have begun with Sims' pioneering work on stabilizer chains.

For the membership problem, that of determining if $g \in G$ given a representation of G in terms of its generators, we need to have a coherent way of understanding the structure of the group G itself. We suppose that G is a subgroup of the group $\text{Sym}(\Omega)$ of symmetries of some set $\Omega$, and we enumerate the elements of $\Omega$ as $\Omega = \{1_1, \ldots, 1_n\}$.

There will now be some subset of $G^{[2]} \subseteq G$ that fixes $1_1$ in that for any $h \in G^{[2]}$, we have $1_1^h = 1_1$. It is easy to see that $G^{[2]}$ is closed under composition, since if any two elements fix $1_1$, then so does their composition. It follows that $G^{[2]}$ is a subgroup of G. In fact, we have:

Definition 3.1 Given a group G and set L, the point stabilizer of L is the subgroup $G_L \leq G$ of all $g \in G$ such that $l^g = l$ for every $l \in L$. The set stabilizer of L is that subgroup $G_{\{L\}} \leq G$ of all $g \in G$ such that $L^g = L$.

Having defined $G^{[2]}$ as the point stabilizer of $1_1$, we can go on to define $G^{[3]}$ as the point stabilizer of $1_2$ within $G^{[2]}$, so that $G^{[3]}$ is in fact the point stabilizer of $\{1_1, 1_2\}$ in G. Similarly, we define $G^{[i+1]}$ to be the point stabilizer of $1_i$ in $G^{[i]}$ and thereby construct a chain of stabilizers $$G = G^{[1]} \geq G^{[2]} \geq \ldots \geq G^{[n]} = 1$$

where the last group is necessarily trivial because once n−1 points of Ω are stabilized, the last point must be also.

If we want to describe G in terms of its generators, we will now assume that we describe all of the $G^{[i]}$ in terms of generators, and furthermore, that the generators for $G^{[i]}$ are a superset of the generators for $G^{[i+1]}$. We can do this because $G^{[i+1]}$ is a subgroup of $G^{[i]}$.

Definition 3.2 A strong generating set S for a group G≦Sym $(l_1, \ldots, l_n)$ is a set of generators for G with the property that $$\langle S \cap G^{[i]} \rangle = G^{[i]}$$

for i=1, ..., n.

As usual, $\langle g_i \rangle$ denotes the group generated by the $g_i$.

It is easy to see that a generating set is strong just in case it has the property discussed above, in that each $G^{[i]}$ can be generated incrementally from $G^{[i+1]}$ and the generators that are in fact elements of $G^{[i]} - G^{[i+1]}$.

As an example, suppose that $G=S_4$, the symmetric group on 4 elements (which we denote 1, 2, 3, 4). Now it is not hard to see that $S_4$ is generated by the 4-cycle (1, 2, 3, 4) and the transposition (3, 4), but this is not a strong generating set. $G^{[2]}$ is the subgroup of $S_4$ that stabilizes 1 (and is therefore isomorphic to $S_3$, since it can randomly permute the remaining three points) but $$\langle S \cap G^{[2]} \rangle = \langle (3, 4) \rangle = G^{[3]} \neq G^{[2]} \quad (1)$$

If we want a strong generating set, we need to add (2, 3, 4) or a similar permutation to the generating set, so that (1) becomes $$\langle S \cap G^{[2]} \rangle = \langle (2, 3, 4), (3, 4) \rangle = G^{[2]}$$

Here is a slightly more interesting example. Given a permutation, it is always possible to write that permutation as a composition of transpositions. One possible construction maps 1 where it is supposed to go, then ignores it for the rest of the construction, and so on. Thus we have for example $$(1, 2, 3, 4) = (1, 2)(1, 3)(1, 4) \quad (2)$$

where the order of composition is from left to right, so that 1 maps to 2 by virtue of the first transposition and is then left unaffected by the other two, and so on.

While the representation of a permutation in terms of transpositions is not unique, the parity of the number of transpositions is; a permutation can always be represented as a product of an even or an odd number of transpositions, but not both. Furthermore, the product of two transpositions of lengths $l_1$ and $l_2$ can be represented as a product of length $l_1 + l_2$, and it follows that the product of two "even" transpositions is itself even, and we have:

Definition 3.3 The alternating group of order n, to be denoted by $A_n$, is the subgroup of even transpositions of $S_n$.

What about a strong generating set for $A_n$? If we fix the first n−2 points, then the transposition (n−1, n) is odd, so we must have $A_n^{[n-1]} = 1$, the trivial group. For any smaller i, we can get a subset of $A_n$ by taking the generators for $S_n^{[i]}$ and operating on each as necessary with the transposition (n−1, n) to make it even. It is not hard to see that an n-cycle is odd if and only if n is even (consider (2) above), so given the strong generating set {(n−1, n), (n−2, n−1, n), ..., (2, 3, ..., n), (1, 2, ..., n)} for $S_n$, a strong generating set for $A_n$ if n is odd is

{(n−2, n−1, n), (n−1, n)(n−3, n−2, n−1, n), ..., (n−1, n)(2, 3, ..., n), (1, 2, ..., n)} and if n is even is

{(n−2, n−1, n), (n−1, n)(n−3, n−2, n−1, n), ..., (2, 3, ..., n), (n−1, n)(1, 2, ..., n)}

We can simplify these expressions slightly to get

{(n−2, n−1, n), (n−3, n−2, n−1), ..., (2, 3, ..., n−1), (1, 2, ..., n)} if n is odd and

{(n−2, n−1, n), (n−3, n−2, n−1), ..., (2, 3, ..., n), (1, 2, ..., n−1)} if n is even.

Given a strong generating set, we can compute the size of the original group G. To do this, we need the following definition and result:

Definition 3.4 Given groups H≦G and g∈G, we define Hg to be the set of all hg for h∈H. For any such g, we will say that Hg is a (right) coset of H in G.

Proposition 3.5 Let $Hg_1$ and $Hg_2$ be two cosets of H in G. Then $|Hg_1| = |Hg_2|$ and the cosets are either identical or disjoint.

In other words, given a subgroup H of a group G, the cosets of H partition G. This leads to:

Definition 3.6 For groups H≦G, the index of H in G, denoted [G: H], is the number of distinct cosets of H in G.

Corollary 3.7 For a finite group G, $$[G:H] = \frac{|G|}{|H|}.$$

Given that the cosets partition the original group G, it is natural to think of them as defining an equivalence relation on G, where x≈y if and only if x and y belong to the same coset of H. We have:

Proposition 3.8 x≈y if and only if $xy^{-1} \in H$.

Proof. If $xy^{-1} = h \in H$ and x is in a coset Hg so that x=h'g for some h'∈H, then $y = h^{-1}x = h^{-1}h'g$ is in the same coset. Conversely, if x=hg and y=h'g are in the same coset, then $xy^{-1} = hgg^{-1}h'^{-1} = hh'^{-1} \in H$.

Many equivalence relations on groups are of this form. So many, in fact, that given an equivalence relation on the elements of a group, it is natural to look for a subgroup H such that the cosets of H define the equivalence relation.

Returning to stabilizer chains, recall that we denote by $l_i^{G^{[i]}}$ the orbit of $l_i$ under $G^{[i]}$ (i.e, the set of all points to which $G^{[i]}$ maps $l_i$). We now have:

Proposition 3.9 Given a group G acting on a set $\{l_i\}$ and stabilizer chain $G^{[i]}$, $$|G| = \prod_i |l_i^{G^{[i]}}| \quad (3)$$

Proof. We know that $$|G| = \frac{|G|}{|G^{[2]}|}|G^{[2]}| = [G:G^{[2]}]|G^{[2]}|$$

or inductively that $$|G| = \prod_i [G^{[i]} : G^{[i+1]}]$$

But it is easy to see that the distinct cosets of $G^{[i+1]}$ in $G^{[i]}$ correspond exactly to the points to which $G^{[i]}$ maps $l_i$, so that $$[G^{[i]}:G^{[i+1]}] = |l_i^{G^{[i]}}|$$

and the result follows.

Note that the expression in (3) is easy to compute given a strong generating set. As an example, given the strong generating set $\{(1, 2, 3, 4), (2, 3, 4), (3, 4)\}$ for $S_4$, it is clear that $S_4^{[3]} = \langle (3, 4) \rangle$ and the orbit of 3 is of size 2. The orbit of 2 in $S_4^{[2]} = \langle (2, 3, 4), (3, 4) \rangle$ is of size 3, and the orbit of 1 in $S_4^{[1]}$ is of size 4. So the total size of the group is 4!=24, hardly a surprise.

For $A_4$, the strong generating set is $\{(3, 4)(1, 2, 3, 4), (2, 3, 4)\} = \{(1, 2, 3), (2, 3, 4)\}$. The orbit of 2 in $A_4^{[2]} = \langle (2, 3, 4) \rangle$ is clearly of size 3, and the orbit of 1 in $A_4^{[1]} = A_4$ is of size 4. So $|A_4|=12$. In general, of course, there are exactly two cosets of the alternating group because all of the odd permutations can be constructed by multiplying the even permutations in $A_n$ by a fixed transposition t. Thus $|A_n|=n!/2$.

We can evaluate the size of $A_n$ using strong generators by realizing that the orbit of 1 is of size n, that of 2 is of size n−1, and so on, until the orbit of n−2 is of size 3. The orbit of n−1 is of size 1, however, since the transposition (n−1, n) is not in $A_n$. Thus $|A_n|=n!/2$ as before.

We can also use the strong generating set to test membership in the following way. Suppose that we have a group G described in terms of its strong generating set (and therefore its stabilizer chain $G^{[i]}$), and a specific permutation w. Now if w(1)=k, there are two possibilities:
1. If k is not in the orbit of 1 in $G=G^{[1]}$, then clearly $w \notin G$.
2. If k is in the orbit of 1 in $G^{[1]}$, select $g_1 \in G^{[1]}$ with $1^{g_1} = g_1(1) = k$. Now we construct $w_1 = wg_1^{-1}$, which fixes 1, and we determine recursively if $w_1 \in G^{[2]}$.

At the end of the process, we will have stabilized all of the elements moved by G, and should have $w_{n+1}=1$. If so, the original $w \in G$; if not, $w \notin G$. This procedure (which we will revisit in Section 4) is known as sifting.

Continuing with our example, let us see if the 4-cycle w=(1, 2, 3, 4) is in $S_4$ and in $A_4$. For the former, we see that w(1)=2 and (1, 2, 3, 4)∈$S_4^{[1]}$. This produces $w_1=1$, and we can stop and conclude that $w \in S_4$ (once again, hardly a surprise).

For the second, we know that (1, 2, 3)∈$A_4^{[1]}$ and we get $w_1=(1, 2, 3, 4)(1, 2, 3)^{-1}=(3, 4)$. Now we could actually stop, since (3, 4) is odd, but let us continue with the procedure. Since 2 is fixed by $w_1$, we have $w_2=w_1$. Now 3 is moved to 4 by $w_2$, but $A_4^{[3]}$ is the trivial group, so we conclude correctly that (1, 2, 3, 4)∉$A_4$.

3.2 Coset Decomposition

Some of the group problems that we will be considering (e.g., the k-transporter problem) subsume what was described in ZAP1 as subsearch. Subsearch is known to be NP-complete, so it follows that k-transporter must be as well. That suggests that the group-theoretic methods for solving it will involve search in some way.

The search involves a potential examination of all of the instances of some augmented clause (c, G), or, in group theoretic terms, a potential examination of each member of the group G. The computational group theory community often approaches such a search problem by gradually decomposing G into smaller and smaller cosets. What we will call a coset decomposition tree is produced, where the root of the tree is the entire group G and the nodes are individual elements of G:

Definition 3.10 Let G be a group, and $G^{[i]}$ a stabilizer chain for it. By the coset decomposition tree for G we will mean a tree whose vertices at the ith level are the cosets of $G^{[i]}$ and for which the parent of a particular $G^{[i]}g$ is that coset of $G^{[i-1]}$ that contains it.

At any particular level i, the cosets correspond to the points to which the sequence $\langle l_1, \ldots, l_i \rangle$ can be mapped, with the points in the image of $l_i$ identifying the children of any particular node at level i−1.

Figure 6:
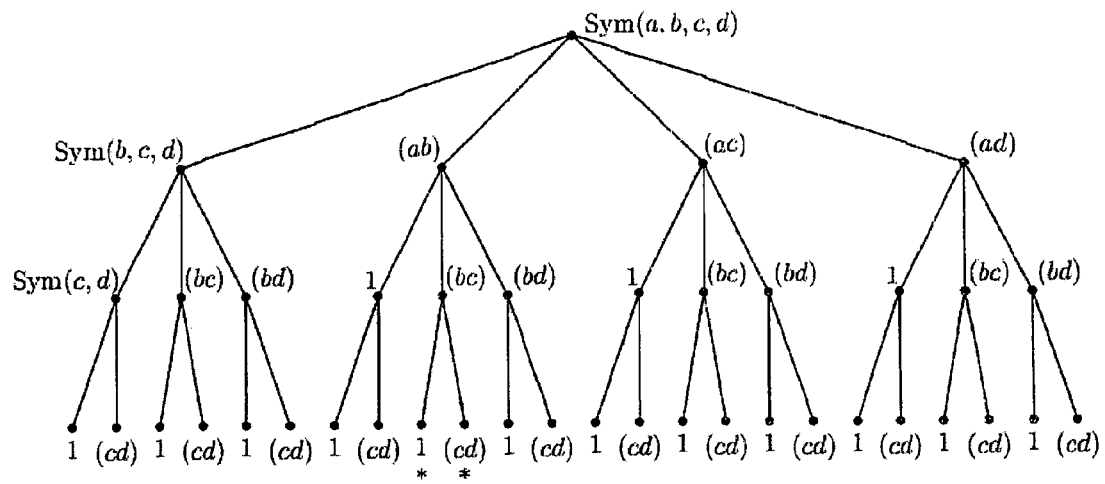
FIGS. 6-16 illustrate diagrams representing examples of search spaces utilized by an embodiment of the present invention.

As an example, suppose that we consider the augmented clause $$(a \vee b, Sym(a, b, c, d)) \qquad (4)$$

corresponding to the collection of ground clauses $a \vee b$ $a \vee c$ $a \vee d$ $b \vee c$ $b \vee d$ $c \vee d$ Suppose also that we are working with an assignment for which a and b are true and c and d are false, and are trying to determine if any instance of (4) is unsatisfied. Assuming that we take $l_1$ to be a through $l_4$=d, the coset decomposition tree associated with $S_4$ is shown in FIG. 6.

An explanation of the notation here is surely in order. The nodes on the lefthand edge are labeled by the associated groups; for example, the node at level 2 is labeled with Sym(b, c, d) because this is the point at which we have fixed a but b, c and d are still allowed to vary.

As we move across the row, we find representatives of the cosets that are being considered. So moving across the second row, the first entry (ab) means that we are taking the coset of the basic group Sym(b, c, d) that is obtained by multiplying each element by (ab) on the right. This is the coset that maps a uniformly to b.

On the lower rows, we multiply the coset representatives associated with the nodes leading to the root. So the third node in the third row, labeled with (bd), corresponds to the coset Sym(c, d)·(bd). The two elements of this coset are (bd) and (cd)(bd)=(bdc). The point b is uniformly mapped to d, a is fixed, and c can either be fixed or mapped to b.

The fourth point on this row corresponds to the coset $$Sym(c, d) \cdot (ab) = \{(ab), (cd)(ab)\}$$

The point a is uniformly mapped to b, and b is uniformly mapped to a. c and d can be swapped or not.

The fifth point is the coset $$Sym(c, d) \cdot (bc)(ab) = Sym(c, d) \cdot (abc) = \{(abc), (abcd)\} \qquad (5)$$

a is still uniformly mapped to b, and b is now uniformly mapped to c. c can be mapped either to a or to d.

For the fourth line, the basic group is trivial and the single member of the coset can be obtained by multiplying the coset representatives on the path to the root. Thus the ninth and tenth nodes (marked with asterisks in the tree) correspond to the permutations (abc) and (abcd) respectively, and do indeed partition the coset of (5).

Figure 7:
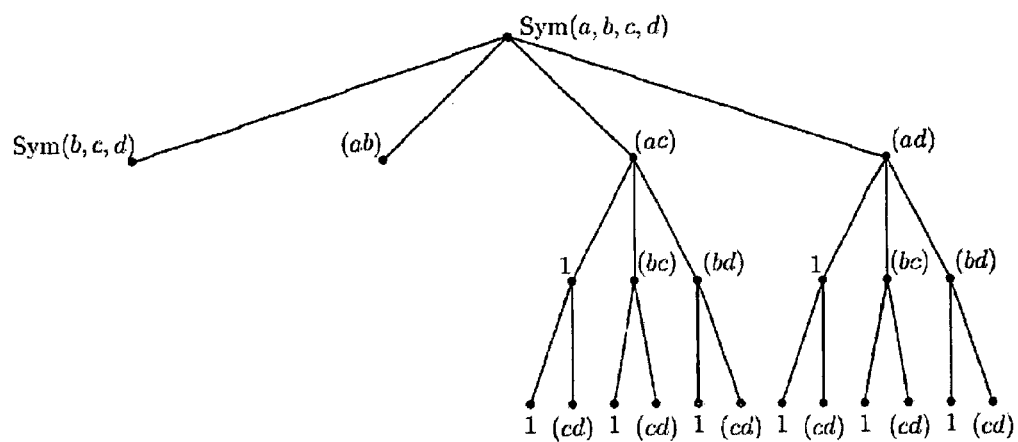

Understanding how this structure is used in search is straightforward. At the root, the original augmented clause (4) may indeed have unsatisfiable instances. But when we move to the first child, we know that the image of a is a, so that the instance of the clause in question is a ∨x for some x. Since a is true for the assignment in question, it follows that the clause must be satisfied. In a similar way, mapping a to b also must produce a satisfied clause. The search space is already reduced to the structure shown in FIG. 7.

Figure 8:
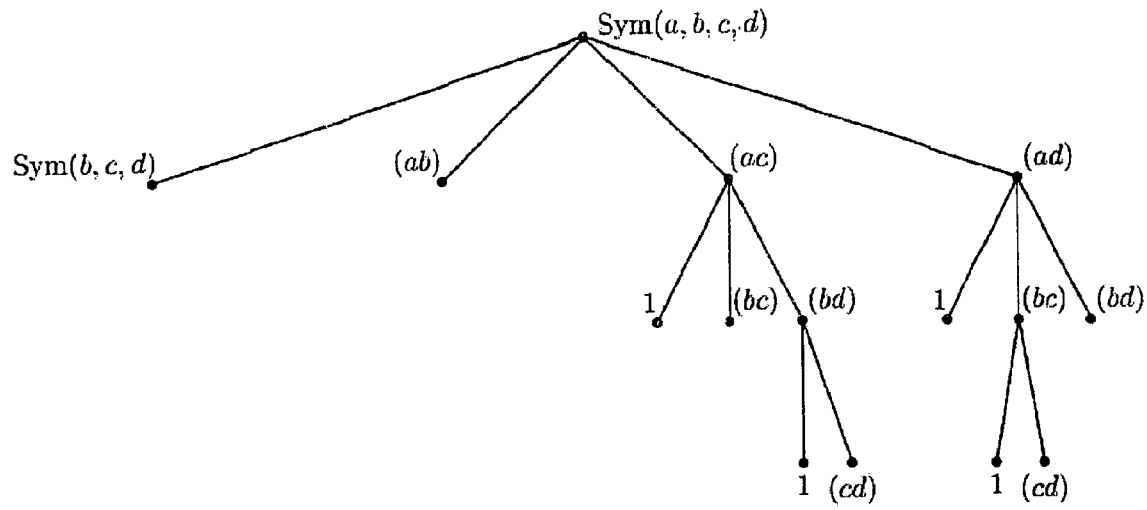

If we map a to c, then the first point on the next row corresponds to mapping b to b, producing a satisfiable clause. If we map b to a (the next node; b is mapped to c at this node but then c is mapped to a by the permutation (ac) labeling the parent), we also get a satisfiable clause. If we map b to d, we will eventually get an unsatisfiable clause. The case where a is mapped to d is similar, and the final search tree is shown in FIG. 8.

Figure 9:
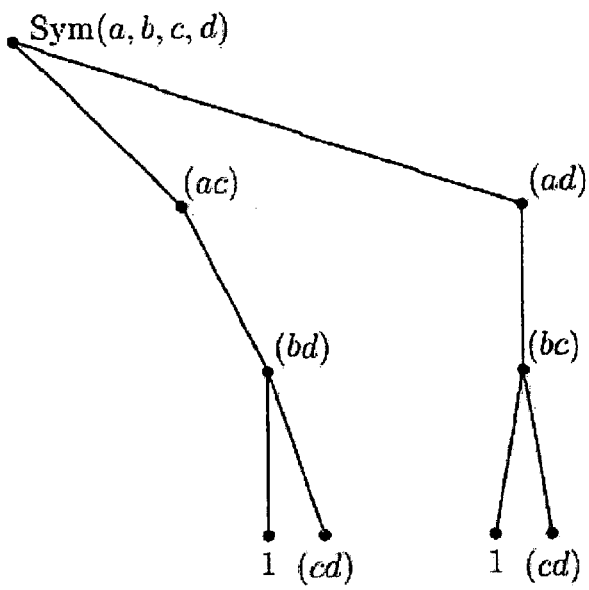

Instead of the six clauses that might need to be examined as instances of the original (4), only four leaf nodes need to be considered. The internal nodes that were pruned above can be pruned without generation, since the only values that need to be considered for a are necessarily c and d (the unsatisfied literals in the theory). At some level, then, the above search space becomes as shown in FIG. 9.

3.3 Lex Leaders

Figure 10:
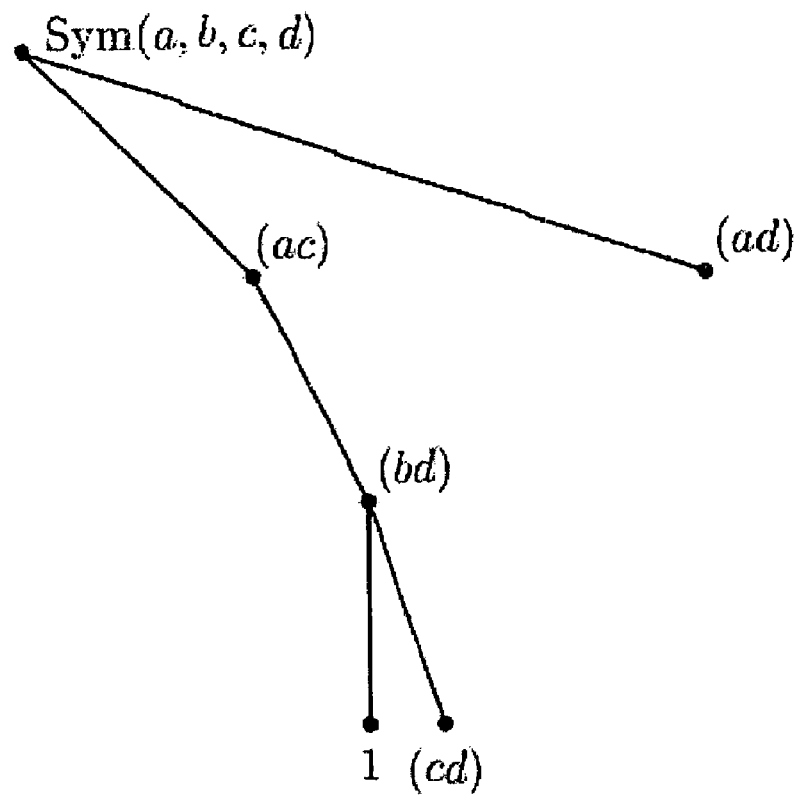

Although the remaining search space in this example already examines fewer leaf nodes than the original, there still appears to be some redundancy. To understand one possible simplification, recall that we are searching for a group element g for which $c^g$ is unsatisfied given the current assignment. Since any such group element suffices, we can (if we wish) search for that group element that is smallest under the lexicographic ordering of the group itself. (Where $g_1 < g_2$ if $a^{g_1}$ is earlier in the alphabet than $a^{g_2}$ or $a^{g_1} = a^{g_2}$ and $b^{g_1} < b^{g_1}$ left hand node precede those under the right hand node in the lexicographic ordering, so it follows that the lexicographically least element (which is all that we're looking for) is not under the right hand node, which can therefore be pruned. The search space becomes as shown in FIG. 10.

This particular technique is quite general: whenever we are searching for a group element with a particular property, we can restrict our search to lex leaders of the set of all such elements and prune the search space on that basis. A more complete discussion in the context of the problems typically considered by computational group theory can be found in Seress; an example in the context of the k-transporter problem specifically can be found in Section 5.5.

Finally, we note that the two remaining leaf nodes are equivalent, since they refer to the same instance—once we know the images of a and of b, the overall instance is fixed and no further choices are relevant. So assuming that the variables in the problem are ordered so that those in the clause are considered first, we can finally prune the search below depth three to get the structure shown in FIG. 11. Only a single leaf node need be considered.

4 Augmented Resolution

We now turn to our ZAP-specific requirements. First, we have the definition of augmented resolution, which involves computing the group of stable extensions of the groups appearing in the resolvents. Specifically, we have augmented clauses $(c_1, G_1)$ and $(c_2, G_2)$ and need to compute the group G of stable extensions of $G_1$ and $G_2$. Recalling Definition 2.11, this is the group of all permutations w with the property that there is some $g_1 \in G_1$ such that $$w|_{c_1} G_1 = g_1|_{c_1} G_1$$

and similarly for $g_2$, $G_2$ and $c_2$. We are viewing the clauses $c_i$ as sets, with $c_i^{G_i}$ being the image of the set under the given permutation group.

As an example, consider the two clauses $$(c_1, G_1) = (a \vee b, <(ad), (be), (bf)>)$$

and $$(c_2, G_2) = (c \vee b, <(be), (bg)>)$$

The image of $c_1$ under $G_1$ is $\{a, b, d, e, f\}$ and $c_2^{G_2} = \{b, c, e, g\}$. We therefore need to find a permutation w such that when w is restricted to $\{a, b, d, e, f\}$, it is an element of $<(ad), (be), (bf)>$, and when restricted to $\{b, c, e, g\}$ is an element of $<(be), (bg)>$.

From the second condition, we know that c cannot be moved by w, and any permutation of b, e and g is acceptable because (be) and (bg) generate the symmetric group Sym(b, e, g). This second restriction does not impact the image of a, d or f under w.

From the first condition, we know that a and d can be swapped or left unchanged, and any permutation of b, e and f is acceptable. But recall from the second condition that we must also permute b, e and g. These conditions combine to imply that we cannot move f or g, since to move either would break the condition on the other. We can swap b and e or not, so the group of stable extensions is $<(ad), (be)>$, and that is what our construction should return.

Procedure 4.1 Given augmented clauses $(c_1, G_1)$ and $(c_2, G_2)$, to compute stab$(c_i, G_i)$:

```
1  c_image₁ ← c₁^G1, c_image₂ ← c₂^G2
2  g_restrict₁ ← G₁|_c_image₁, g_restrict₂ ← G₂|_c_image₂
3  C∩ ← c_image₁ ∩ c_image₂
4  g_stab₁ ← g_restrict₁{C∩}, g_stab₂ ← g_restrict₂{C∩}
5  g_int ← g_stab₁|_C∩ ∩ g_stab₂|_C∩
6  {gᵢ} ← {generators of g_int}
7  {l₁ᵢ} ← {gᵢ, lifted to g_stab₁}, {l₂ᵢ} ← {gᵢ, lifted to g_stab₂}
8  {l'₂ᵢ} ← {l₂ᵢ|_c_image₂-C∩}
9  return <g_restrict₁C∩, g_restrict₂C∩, {l₁ᵢ · l'₂ᵢ}>
```

Here, we present an example of the computation in use and discuss the computational issues surrounding Procedure 4.1. The example we will use is that with which we began this section, but we modify $G_1$ to be $<(ad), (be), (bf), (xy)>$ instead of the earlier $<(ad), (be), (bf)>$. The new points x and y don't affect the set of instances in any way, and thus should not affect the resolution computation, either.

1. c_image$_i$ ← $c_1^{G_1}$. This amounts to computing the images of the $c_i$ under the $G_i$; as described earlier, we have c_image$_1$ = $\{a, b, d, e, f\}$ and c_image$_2$ = $\{b, c, e, g\}$.

2. g_restrict$_i$ ← $G_i|_{c\_image_i}$. Here, we restrict each group to act only on the corresponding c_image$_i$. In this example, g_restrict$_2$ = $G_2$ but g_restrict$_1$ = $<(ad), (be), (bf)>$ as the irrelevant points x and y are removed.

Note that it is not always possible to restrict a group to an arbitrary set; one cannot restrict the permutation (xy) to the set $\{x\}$ because you need to add y as well. But in this case, it is possible to restrict $G_i$ to c_image$_i$, since this latter set is closed under the action of the group.

3. $C_\cap \leftarrow \text{c\_image}_1 \cap \text{c\_image}_2$. The construction itself works by considering three separate sets—the intersection of the images of the two original clauses (where the computation is interesting because the various w must agree), and the points in only the image of $c_1$ or only the image of $c_2$. The analysis on these latter sets is straightforward; we just need w to agree with any element of $G_1$ or $G_2$ on the set in question.

In this step, we compute the intersection region $C_\cap$. In our example, $C_\cap = \{b, e\}$.

4. $\text{g\_stab}_i \leftarrow \text{g\_restrict}_{i\{C_\cap\}}$. We find the subgroup of g_restrict$_i$ that set stabilizes $C_\cap$, in this case the subgroup that set stabilizes the pair $\{b, e\}$. For g_restrict$_1$=<(ad), (be), (bf)>, this is <(ad), (be)> because we can no longer swap b and f, while for g_restrict$_2$=<(be), (bg)>, we get g_stab$_2$=<(be)>.

5. $\text{g\_int} \leftarrow \text{g\_stab}_1|_{C_\cap} \cap \text{g\_stab}_2|_{C_\cap}$. Since w must simultaneously agree with both $G_1$ and $G_2$ when restricted to $C_\cap$ (and thus with g_restrict$_1$ and g_restrict$_2$ as well), the restriction of w to $C_\cap$ must lie within this intersection. In our example, g_int=<(be)>.

6. $\{g_i\} \leftarrow \{\text{generators of g\_int}\}$. Any element of g_int will lead to an element of the group of stable extensions provided that we extend it appropriately from $C_\cap$ back to the full set $c_1^{G_1} \cup c_2^{G_2}$; this step begins the process of building up these extensions. It suffices to work with just the generators of g_int, and we construct those generators here. We have $\{g_i\} = \{(be)\}$.

7. $\{l_{ki}\} \leftarrow \{g_i, \text{lifted to g\_stab}_k\}$. Our goal is now to build up a permutation on c_image$_1 \cup$c_image$_2$ that, when restricted to $C_\cap$, matches the generator $g_i$. We do this by lifting $g_i$ separately to c_image$_1$ and to c_image$_2$. Any such lifting suffices, so we can take (for example)

$$l_{11} = (be)(ad)$$

and $$l_{21} = (be)$$

In the first case, the inclusion of the swap of a and d is neither precluded nor required; we could just as well have used $l_{11}$=(be).

8. $\{l'_{2i}\} \leftarrow \{l_{2i}|_{\text{c\_image}_2 - C_\cap}\}$. We cannot simply compose $l_{11}$ and $l_{21}$ to get the desired permutation on c_image$_1 \cup$ c_image$_2$ because the part of the permutations acting on the intersection c_image$_1 \cap$ c_image$_2$ will have acted twice. In this case, we would get $l_{11} \cdot l_{21}$=(ad) which no longer captures our freedom to exchange b and e.

We deal with this by restricting $l_{21}$ away from $C_\cap$ and only then combining with $l_{11}$. In the example, restricting (be) away from $C_\cap = \{b, e\}$ produces the trivial permutation $l'_{21}$=( ).

9. Return <g_restrict$_{1C_\cap}$, g_restrict$_{2C_\cap}$, $\{l_{1i} \cdot l'_{2i}\}$>. We now compute the final answer from three sources: The combined $l_{1i} \cdot l'_{2i}$ that we have been working to construct, along with elements of g_restrict$_1$ that fix every point in the image of $c_2$ and elements of g_restrict$_2$ that fix every point in the image of $c_1$. These latter two sets consist of stable extensions. An element of g_restrict$_1$ point stabilizes the image of $c_2$ if and only if it point stabilizes the points that are in both the image of $c_1$ (to which g_restrict$_1$ has been restricted) and the image of $c_2$; in other words, if and only if it point stabilizes $C_\cap$.

In our example, we have $$\text{g\_restrict}_{1C_\cap} = \langle(ad)\rangle$$

$$\text{g\_restrict}_{2C_\cap} = 1$$

$$\{l_{1i} \cdot l'_{2i}\} = \{(be)(ad)\}$$

so that the final group returned is $$\langle(ad), (be)(ad)\rangle$$

This group is identical to $$\langle(ad), (be)\rangle$$

We can swap either the (a, d) pair or the (b, e) pair, as we see fit. The first swap (ad) is sanctioned for the first "resolvent" $(c_1, G_1)$=(a $\vee$b, <(ad), (be), (bf)>) and does not mention any relevant variable in the second $(c_2, G_2)$=(c $\vee$b, <(be), (bg)>). The second swap (be) is sanctioned in both cases.

Computational issues We conclude this section by discussing some of the computational issues that arise when we implement Procedure 4.1, including the complexity of the various operations required.

1. $\text{c\_image}_i \leftarrow c_i^{G_i}$. Efficient algorithms exist for computing the image of a set under a group. The basic method is to use a flood-fill like approach, adding and marking the result of acting on the set with a single generator, and recurring until no new points are added.

2. $\text{g\_restrict}_i \leftarrow G_i|_{\text{c\_image}_i}$. A group can be restricted to a set that it stabilizes by restricting the generating permutations individually.

3. $C_\cap \leftarrow \text{c\_image}_1 \cap \text{c\_image}_2$. Set intersection is straightforward.

4. $\text{g\_stab}_i \leftarrow \text{g\_restrict}_{i\{C_\cap\}}$. Set stabilizer is not straightforward, and is not known to be polynomial in the number of generators of the group being considered. The most effective implementations work with a coset decomposition as described in Section 3.2; in computing $G_{\{S\}}$ for some set S, a node can be pruned when it maps a point inside of S out of S or vice versa. GAP implements this, although more efficient implementations are possible in some cases.

5. $\text{g\_int} \leftarrow \text{g\_stab}_1|_{C_\cap} \cap \text{g\_stab}_2|_{C_\cap}$. Group intersection is also not known to be polynomial in the number of generators; once again, a coset decomposition is used. Coset decompositions are constructed for each of the groups being combined, and the search spaces are pruned accordingly.

6. $\{g_i\} \leftarrow \{\text{generators of g\_int}\}$. Groups are typically represented in terms of their generators, so reconstructing a list of those generators is trivial. Even if the generators are not known, constructing a strong generating set is known to be polynomial in the number of generators constructed.

7. $\{l_{ki}\} \leftarrow \{g_i, \text{lifted to g\_stab}_k\}$. Suppose that we have a group G acting on a set T, a subset $V \subseteq T$ and a permutation h acting on V such that we know that h is the restriction to V of some $g \in G$, so that $h = g|_V$. To find such a g, we first construct a stabilizer chain for G where the ordering used puts the elements of T−V first. Now we are basically looking for a $g \in G$ such that the sifting procedure of Section 3.1 produces h at the point that the points in T−V have all been fixed. We can find such an g in polynomial time by inverting the sifting procedure itself.

8. $\{l'_{2i}\} \leftarrow \{l_{2i}|_{\text{c\_image}_2 - C_\cap}\}$. As in line 2, restriction is still easy.

9. Return <g_restrict$_{1C_\cap}$, g_restrict$_{2C_\cap}$, $\{l_{1i} \cdot l'_{2i}\}$>. Since groups are typically represented by their generators, we need simply take the union of the generators for the three arguments. Point stabilizers (needed for the first two arguments) are straightforward to compute using stabilizer chains.

5 Unit Propagation and the (Ir)relevance Test

As we have remarked, the other main computational requirement of an augmented satisfiability engine is the ability to solve the k-transporter problem: Given an augmented clause (c, G) where c is once again viewed as a set of literals, and sets S and U of literals and an integer k, we want to find a g∈G such that $c^g \cap S = \emptyset$ and $|c^g \cap U| \leq k$, if such a g exists.

5.1 A Warmup

We begin with a somewhat simpler problem, assuming that $U = \emptyset$ so we are simply looking for a g such that $c^g \cap S = \emptyset$.

We need the following definitions:

Definition 5.1 Let $H \leq G$ be groups. By a transversal of H in G we will mean any subset of G that contains one element of each coset of H. We will denote such a transversal by G/H.

Note that since H itself is one of the cosets, the transversal must contain a (unique) element of H. We will generally assume that the identity is this unique element.

Definition 5.2 Let c be a set and G a group acting on c. By $c_G$ we will denote the elements of c that are fixed by G.

As the search proceeds, we will gradually fix more and more points of the clause in question. The notation of Definition 5.2 will let us refer easily to the points that have been fixed thus far.

Procedure 5.3 Given groups $H \leq G$, an element $t \in G$, sets c and S, to find a group element g=map(G, H, t, c, S) with g∈H and $c^{gt} \cap S = \emptyset$:

```
1  if c_H^t ∩ S ≠ ∅
2      then return FAILURE
3  if c = c_H
4      then return 1
5  α ← an element of c − c_H
6  for each t' in H/H_α
7      do r ← map(G, H_α, t't, c, S)
8         if r ≠ FAILURE
9             then return rt'
10 return FAILURE
```

This is essentially a codification of the example that was presented in Section 3.2. We terminate the search when the clause is fixed by the remaining group H, but have not yet included any analog to the lex-leader pruning that we discussed in Section 3.3. In the recursive call in line 7, we retain the original group, for which we will have use in subsequent versions of the procedure.

Proposition 5.4 map(G, G, 1, c, S) returns an element g∈G for which $c^g \cap S = \emptyset$, if such element exists, and returns FAILURE otherwise.

Proof. The proof in the appendix shows the slightly stronger result that map(G, H, t, c, S) returns an element g∈H for which $c^{gt} \cap S = \emptyset$ if such an element exists.

Figure 12:
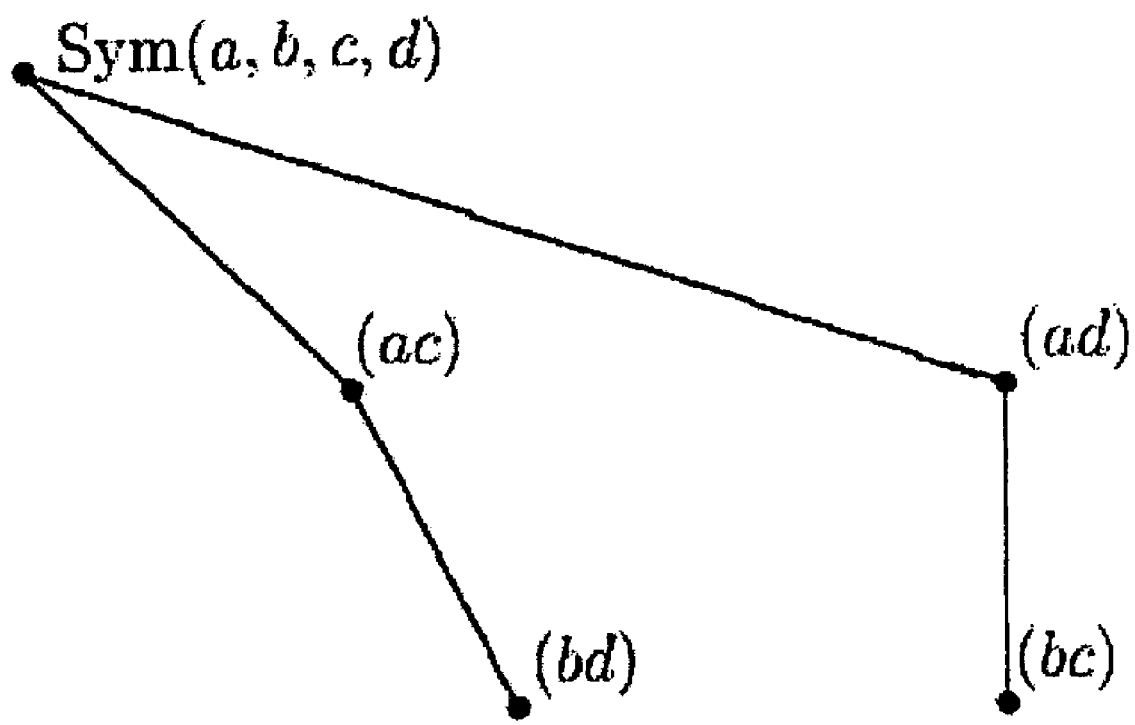

Given that the procedure terminates the search when all elements of c are stabilized by G but does not include lex-leader considerations, the search space examined in the example from Section 3.2 is as shown by the structure in FIG. 12. It is still important to prune the node in the lower right, since for a larger problem, this node may be expanded into a significant search subtree. We discuss this pruning in Section 5.5. (We have replaced the variables a, b, c, d with $x_1, x_2, x_3, x_4$ to avoid confusion with our current use of c to represent the clause in question.)

In the interests of clarity, let us go through the example explicitly. Recall that the clause $c = x_1 \vee x_2$, $G = \text{Sym}(x_1, x_2, x_3, x_4)$ permutes the $x_i$ arbitrarily, and that $S = \{x_1, x_2\}$.

On the initial pass through the procedure, $c_H = \emptyset$; suppose that we select $x_1$ to stabilize first. Step 6 now selects the point to which $x_1$ should be mapped; if we select $x_1$ or $x_2$, then $x_1$ itself will be mapped into S and the recursive call will fail on line 2. So suppose we pick $X_3$ as the image of $x_1$.

Now $c_H = \{x_1\}$, and we need to fix the image of another point; $x_2$ is all that's left in the original clause c. As before, selecting $x_1$ or $x_2$ as the image of $x_2$ leads to failure. $x_3$ is already taken (it's the image of $x_1$), so we have to map $x_2$ into $x_4$. Now every element of c is fixed, and the next recursive call returns the trivial permutation on line 4. This is combined with $(x_2 x_4)$ on line 9 in the caller as we fix $x_4$ as the image of $x_2$. The original invocation then combines with $(x_1 x_3)$ to produce the final answer of $(x_2 x_4)(x_1 x_3)$.

5.2 The k-transporter Problem

Extending the above algorithm to solve the k-transporter problem is straightforward; in addition to requiring that $c_H^t \cap S = \emptyset$ in line 2, we also need to keep track of the number of points that have been (or will be) mapped into the set U and make sure that we won't be forced to exceed the limit k.

To understand this, suppose that we are examining a node in the coset decomposition tree labeled with a permutation t, so that the node corresponds to permutations gt for various g in the subgroup being considered at this level. We want to ensure that there is some g for which $|c^{gt} \cap U| \leq k$. Since $c^{gt}$ is assumed to avoid the set S completely, we can replace this with the slightly stronger $$|c^{gt} \cap (S \cup U)| \leq k \qquad (6)$$

This is in turn equivalent to $$|c^g \cap (S \cup U)^{t^{-1}}| \leq k \qquad (7)$$

since the set in (7) is simply the result of operating on the set in (6) with the permutation $t^{-1}$.

We will present a variety of ways in which the bound of (7) can be approximated; for the moment, we simply introduce an auxiliary function overlap(H, c, V), which we assume computes a lower bound on $|c^h \cap V|$ for all h∈H. Procedure 5.3 becomes:

Procedure 5.5 Given groups $H \leq G$, an element $t \in G$, sets c, S and U and an integer k, to find a group element g=transport(G, H, t, c, S, U, k) with g∈H, $c^{gt} \cap S = \emptyset$ and $|c^{gt} \cap U| \leq k$:

```
1  if c_H^t ∩ S ≠ ∅
2      then return FAILURE
3  if overlap(H, c, (S ∪ U)^{t^{-1}}) > k
4      then return FAILURE
5  if c = c_H
6      then return 1
7  α ← an element of c − c_H
8  for each t' in H/H_α
9      do r ← transport(G, H_α, t't, c, S, U, k)
10        if r ≠ FAILURE
11            then return rt'
12 return FAILURE
```

For convenience, we will denote transport(G, G, 1, c, S, U, k) by transport(G, c, S, U, k). This is the "top level" function corresponding to the original invocation of Procedure 5.5.

Proposition 5.6 Provided that $|c^h \cap V| \geq$ overlap(H, c, V)$\geq |c_H \cap V|$ for all h∈H, transport(G, c, S, U, k) as computed by Procedure 5.5 returns an element g∈G for which $c^g \cap S = \emptyset$ and $|c^g \cap U| \leq k$, if such an element exists, and returns FAILURE otherwise.

The procedure is simplified significantly by the fact that we only need to return a single g with the desired properties, as opposed to all such g. In the examples arising in (ir)relevance calculations, a single answer suffices. But if we want to compute the unit consequences of a given literal, we need all of the unit instances of the clause in question. There are other considerations at work in this case, however, and we defer discussion of this topic until Section 6.

Our initial version of overlap is:

Procedure 5.7 Given a group H, and two sets c, V, to compute overlap(H, c, V), a lower bound on the overlap of $c^h$ and V for any h∈H:

1 return $|c_H \cap V|$

Having defined overlap, we may as well use it to replace the test in line 1 of Procedure 5.6 with a check to see if overlap(H, c, $S^{t^{-1}}$)>0, indicating that for any h∈H, $|c^h \cap S^{t^{-1}}| > 0$ or, equivalently, that $c^{ht} \cap S \neq \emptyset$. For the simple version of overlap defined above, there is no difference between the two procedures. But as overlap matures, this change will lead to additional pruning in some cases.

5.3 Orbit Pruning

There are two general ways in which nodes can be pruned in the k-transporter problem. Lexicographic pruning is a bit more difficult, so we defer it until Section 5.5. To understand the other, we begin with the following example.

Suppose that the clause $c = x_1 \lor x_2 \lor x_3$ and that the group G permutes the variables $\{x_1, x_2, x_3, x_4, x_5, x_6\}$ arbitrarily. If $S = \{x_1, x_2, x_3, x_4\}$, is there a g∈G with $c^g \cap S = \emptyset$?

Clearly not; there isn't enough "room" because the image of c will be of size three, and there is no way that this 3-element set can avoid the 4-element set S in the 6-element universe $\{x_1, x_2, x_3, x_4, x_5, x_6\}$.

We can do a bit better in many cases. Suppose that our group G is $\langle (x_1 x_4), (x_2 x_5), (x_3 x_6) \rangle$ so that we can swap $x_1$ with $x_4$ (or not), $x_2$ with $x_5$, or $x_3$ with $x_6$. Now if $S = \{x_1, x_4\}$, can we find a g∈G with $c^g \cap S = \emptyset$?

Once again, the answer is clearly no. Recall the definition of the orbit of a point, or the closure of an arbitrary set, under a group:

Definition 5.8 Let G be a group acting on a set S. Then for any x∈S, the orbit of x in G, to be denoted by $x^G$, is given by $x^G = \{x^g | g \in G\}$. If $T \subseteq S$, then the G-closure of T, to be denoted $T^G$, is the set $$T^G = \{t^g | t \in T \text{ and } g \in G\}$$

The orbit of $x_1$ in G is $\{x_1, x_4\}$ and since $\{x_1, x_4\} \subseteq S$, $x_1$'s image cannot avoid the set S.

In the general case appearing in Procedure 5.5, consider the initial call, where t=1, the identity permutation. Given the group G, consider the orbits of the points in c. If there is any such orbit W for which $|W \cap c| > |W - S|$, we can prune the search. The reason is that each of the points in W∩c must remain in W when acted on by any element of G; that is what the definition of an orbit requires. But there are too many points in W∩c to stay away from S, so we will not manage to have $c^g \cap S = \emptyset$.

What about the more general case, where t≠1 necessarily? For a fixed α in our clause c, we will construct the image $α^{gt}$, acting on α first with g and then with t. We are interested in whether $α^{gt} \in S$ or, equivalently, if $α^g \in S^{t^{-1}}$. Now $α^g$ is necessarily in the same orbit as α, so we can prune if $$|W \cap c| > |W - S^{t^{-1}}|$$

For similar reasons, we can also prune if $$|W \cap c| > |W - U^{t^{-1}}| + k$$

In fact, we can prune if $$|W \cap c| > |W - (S \cup U)^{t^{-1}}| + k$$

because there still is not enough space to fit the image without either intersecting S or putting at least k points into U.

We can do better still. As we have seen, for any particular orbit, the number of points that will eventually be mapped into U is at least $$|W \cap c| - |W - (S \cup U)^{t^{-1}}|$$

In some cases, this expression will be negative; the number of points that will be mapped into U is therefore at least $$\max(|W \cap c| - |W - (S \cup U)^{t^{-1}}|, 0)$$

and we can prune any node for which $$\sum_W \max(|W \cap c| - |W - (S \cup U)^{t^{-1}}|, 0) > k \qquad (8)$$

where the sum is over the orbits of the group.

It will be somewhat more convenient to rewrite this using the fact that $$|W \cap c| + |W - c| = |W| = |W \cap (S \cup U)^{t^{-1}}| + |W - (S \cup U)^{t^{-1}}|$$

so that (8) becomes $$\sum_W \max(|W \cap (S \cup U)^{t^{-1}}| - |W - c|, 0) > k \qquad (9)$$

Incorporating this into Procedure 5.7 gives:

Procedure 5.9 Given a group H, and two sets c, V, to compute overlap(H, c, V), a lower bound on the overlap of $c^h$ and V for any h∈H:

| | |
|---|---|
| 1 | m ← 0 |
| 2 | for each orbit W of H |
| 3 |    do m ← m + max(|W ∩ V| − |W − c|, 0) |
| 4 | return m |

Proposition 5.10 Let H be a group and c, V sets acted on by H. Then for any h∈H, $|c^h \cap V| \geq$ overlap(H, c, V) $\geq |c_H \cap V|$ where overlap is computed by Procedure 5.9.

5.4 Block Pruning

The pruning described in the previous section can be improved further. To see why, consider the following example, which might arise in solving an instance of the pigeonhole problem. We have the two cardinality constraints:

$$x_1 + x_2 + x_3 + x_4 \geq 2 \qquad (10)$$

$$x_5 + x_6 + x_7 + x_8 \geq 2 \qquad (11)$$

presumably saying that at least two of four pigeons are not in hole m and at least two are not in hole n for some m and n.[2] Rewriting the individual cardinality constraints as augmented clauses produces

[2] In an actual pigeonhole instance, all of the variables would be negated. We have dropped the negations for convenience.

$(x_1 \vee x_2 \vee x_3, \text{Sym}(x_1, x_2, x_3, x_4))$ $(x_5 \vee x_6 \vee x_7, \text{Sym}(x_5, x_6, x_7, x_8))$ or, in terms of generators, $(x_1 \vee x_2 \vee x_3, <(x_1 x_2), (x_2 x_3 x_4)>)$ (12)

$(x_5 \vee x_6 \vee x_7, <(x_5 x_6), (x_6 x_7 x_8)>)$ (13)

What we would really like to do, however, is to capture the full symmetry in a single axiom.

We can do this by realizing that we can obtain (13) from (12) by switching $x_1$ and $x_5$, $x_2$ and $x_6$, and $x_3$ and $x_7$ (in which case we want to switch $x_4$ and $x_8$ as well). So we add the generator $(x_1 x_5)(x_2 x_6)(x_3 x_7)(x_4 x_8)$ to the overall group, and modify the permutations $(x_1 x_2)$ and $(x_2 x_3 x_4)$ (which generate $\text{Sym}(x_1, x_2, x_3, x_4)$) so that they permute $x_5, x_6, x_7, x_8$ appropriately as well. The single augmented clause that we obtain is $(x_1 \vee x_2 \vee x_3, <(x_1 x_2)(x_5 x_6), (x_2 x_3 x_4)(x_6 x_7 x_8), (x_1 x_5)(x_2 x_6)(x_3 x_7)(x_4 x_8)>)$ (14)

and it is not hard to see that this does indeed capture both (12) and (13).

Now suppose that $x_1$ and $x_5$ are false, and the other variables are unvalued. Does (14) have a unit instance?

With regard to the pruning condition in the previous section, the group has a single orbit, and the condition (with t=1) is $|W \cap (S \cup U)| - |W - c| > 1$ (15)

But $W = \{x_1, x_2, x_3, x_4, x_5, x_6, x_7, x_8\}$ $S = \emptyset$ $U = \{x_2, x_3, x_4, x_6, x_7, x_8\}$ $c = \{x_1, x_2, x_3\}$ so that $|W \cap (S \cup U)| = 6$, $|W - c| = 5$ and (15) fails.

But it should be possible to conclude immediately that there are no unit instances of (14). After all, there are no unit instances of (10) or (11) because only one variable in each clause has been set, and three unvalued variables remain. Equivalently, there is no unit instance of (12) because only one of $\{x_1, x_2, x_3, x_4\}$ has been valued, and two need to be valued to make $x_1 \vee x_2 \vee x_3$ or another instance unit. Similarly, there is no unit instance of (13). What went wrong?

What went wrong is that the pruning heuristic thinks that both $x_1$ and $x_5$ can be mapped to the same clause instance, in which case it is indeed possible that the instance in question be unit. The heuristic doesn't realize that $x_1$ and $x_5$ are in separate "blocks" under the action of the group in question.

To formalize this, let us first make the following definition:

Definition 5.11 Let T be a set, and G a group acting on it. We will say that G acts transitively on T if T is an orbit of G.

Put somewhat differently, G acts transitively on T just in case for any x, y∈T there is some g∈G such that $x^g = y$.

Definition 5.12 Suppose that a group G acts transitively on a set T. Then a block system for G is a partitioning of T into sets $B_1, \ldots, B_n$ such that G permutes the $B_i$.

In other words, for each g∈G and each block $B_i$, $B_i^g = B_j$ for some j; the image of $B_i$ under g is either identical to it (if j=i) or disjoint (if j≠i, since the blocks partition T).

Every group acting transitively and nontrivially on a set T has at least two block systems:

Definition 5.13 For a group G acting transitively on a set T, a block system $B_1, \ldots, B_n$ will be called trivial if either n=1 or n=|T|.

In the former case, there is a single block consisting of the entire set T (which is a block system). If n=|T|, each point is in its own block; since G permutes the points, it permutes the blocks.

Lemma 5.14 All of the blocks in a block system are of identical size.

In the example we have been considering, $B_1 = \{x_1, x_2, x_3, x_4\}$ and $B_2 = \{x_5, x_6, x_7, x_8\}$ is also a block system for the action of the group on the set $T = \{x_1, x_2, x_3, x_4, x_5, x_6, x_7, x_8\}$. And while it is conceivable that a clause is unit within the overall set T, it is impossible for it to have fewer than two unvalued literals within each particular block. Instead of looking at the overall expression $|W \cap (S \cup U)| - |W - c| > 1$ (16)

we can work with individual blocks.

The clause $x_1 \vee x_2 \vee x_3$ is in a single block in this block system, and will therefore remain in a single block after being acted on with any g∈G. If the clause winds up in block $B_i$, then the condition (16) can be replaced with $|B_i \cap (S \cup U)| - |B_i - c| > 1$ or, in this case, $|B_i \cap (S \cup U)| > |B_i - c| + 1 = 2$ so that we can prune if there are more than two unvalued literals in the block in question. After all, if there are three or more unvalued literals, there must be at least two in the clause instance being considered, and it cannot be unit.

Of course, we don't know exactly which block will eventually contain the image of c, but we can still prune if $\min(|B_i \cap (S \cup U)|) > 2$ since in this case any target block will generate a prune. And in the example that we have been considering, $|B_i \cap (S \cup U)| = 3$ for each block in the block system.

Generalizing this idea is straightforward. For notational convenience, we introduce:

Definition 5.15 Let $T = \{T_i\}$ be sets, and suppose that $T_{i_1}, \ldots, T_{i_n}$ are the n elements of T of smallest size. Then we will denote $\Sigma_{j=1}^n |T_{i_j}|$ by $\min_{+n}\{T_i\}$.

Proposition 5.16 Let G be a group acting transitively on a set T, and let c, V ⊆ T. Suppose also that $\{B_i\}$ is a block system for G and that $c \cap B_i \neq \emptyset$ for n of the blocks in $\{B_i\}$. Then if b is the size of an individual block $B_i$ and g∈G, $|c^g \cap V| \geq |c| + \min_{+n}\{B_i \cap V\} - nb$ (17)

Proposition 5.17 If the block system is trivial (in either sense), (17) is equivalent to $$|c^g \cap V| \geq |T \cap V| - |T - c| \qquad (18)$$

Proposition 5.18 Let $\{B_i\}$ be a block system for a group G acting transitively on a set T. Then (17) is never weaker than (18).

In any event, we have shown that we can strengthen Procedure 5.9 to:

Procedure 5.19 Given a group H, and two sets c, V, to compute overlap(H, c, V), a lower bound on the overlap of $c^h$ and V for any h∈H:

```
1  m ← 0
2  for each orbit W of H
3      do {B_i} ← a block system for W under H
4          n = |{i|B_i ∩ c ≠ ∅}|
5          m ← m + max(|c ∩ W| + min_{+n}{B_i ∩ V} − n|B_1|, 0)
6  return m
```

Which block system should we use in line 3 of the procedure? There seems to be no general best answer to this question, although we have seen from Proposition 5.18 that any block system is better than one of the trivial ones. In practice, the best choice appears to be a minimal block system (i.e., one with blocks of the smallest size) for which c is contained within a single block. Now Procedure 5.19 becomes:

Procedure 5.20 Given a group H, and two sets c, V, to compute overlap(H, c, V), a lower bound on the overlap of $c^h$ and V for any h∈H:

```
1  m ← 0
2  for each orbit W of H
3      do {B_i} ← a minimal block system for W under H for
              which c ∩ W ⊆ B_i for some i
4          m ← m + max(|c ∩ W| + min(B_i ∩ V) − |B_1|, 0)
5  return m
```

Proposition 5.21 Let H be a group and c, V sets acted on by H. Then for any h∈H, $|c^h \cap V| \geq $overlap$(H, c, V) \geq |c_H \cap V|$ where overlap is computed by Procedure 5.20.

Note that the block system being used depends only on the group H and the original clause c. This means that in an implementation it is possible to compute these block systems once and then use them even if there are changes in the sets S and U of satisfied and unvalued literals respectively.

GAP includes algorithms for finding minimal block systems for which a given set of elements (called a "seed" in GAP) is contained within a single block. The basic idea is to form an initial block "system" where the points in the seed are in one block and each point outside of the seed is in a block of its own. The algorithm then repeatedly runs through the generators of the group, seeing if any generator g maps elements x, y in one block to $x^g$ and $y^g$ that are in different blocks. If this happens, the blocks containing $x^g$ and $y^g$ are merged. This continues until every generator respects the candidate block system, at which point the procedure is complete.

5.5 Lexicographic Pruning

Block pruning will not help us with the example at the end of Section 5.1. The final space being searched is illustrated by FIG. 12. As we have remarked, the first fringe node (where a is mapped to c and b to d) is essentially identical to the second (where a is mapped to d and b to c). It is important not to expand both since more complicated examples may involve a substantial amount of search below the nodes that are fringe nodes in the above figure.

This is the sort of situation in which lexicographic pruning can generally be applied. We want to identify the two fringe nodes as equivalent in some way, and then expand only the lexicographically least member of each equivalence class. For any particular node n, we need a computationally effective way of determining if n is the lexicographically least member of its equivalence class.

We begin by identifying conditions under which two nodes are equivalent. To understand this, recall that we are interested in the image of the clause c under a particular group element g. That means that we don't care about where any particular literal l is mapped, because we care only about the image of the entire clause c. We also don't care about the image of any literal that isn't in c.

From a formal point of view, we begin by extending our set stabilizer notation somewhat:

Definition 5.22 For a permutation group G and sets $S_1, \ldots, S_k$ acted on by G, by $G_{\{S_1, \ldots, S_k\}}$ we will mean that subgroup of G that simultaneously set stabilizes each of the $S_i$; equivalently, $G_{\{S_1, \ldots, S_k\}} = \cap_i G_{\{S_i\}}$.

In computing a multiset stabilizer $G_{\{S_1, \ldots, S_k\}} = \cap_i G_{\{S_i\}}$, we need not compute the individual set stabilizers and then take their intersection. Instead, recall that the set stabilizers themselves are computed using coset decomposition; if any stabilized point is moved either into or out of the set in question, the given node can be pruned in the set stabilizer computation. It is straightforward to modify the set stabilizer algorithm so that if any stabilized point is moved into or out of any of the $S_i$, the node in question is pruned. This allows $G_{\{S_1, \ldots, S_k\}}$ to be computed in a single traversal of G's decomposition tree.

Now suppose that j is a permutation in G that stabilizes the set c. If $c^g$ satisfies the conditions of the transporter problem, then so will $c^{jg}$. After all, acting with j first doesn't affect the set corresponding to c, and the image of the clause under jg is therefore identical to its image under g. This means that two permutations g and h are "equivalent" if h=jg for some $j \in G_{\{c\}}$, the set stabilizer of c in G. Alternatively, the permutation g is equivalent to any element of the coset Jg, where $J = G_{\{c\}}$.

On the other hand, suppose that k is a permutation that simultaneously stabilizes the sets S and U of satisfied and unvalued literals respectively. Now it is possible to show that if we operate with k after operating successfully with g, we also don't impact the question of whether or not $c^g$ is a solution to the transporter problem. The upshot of this is the following:

Definition 5.23 Let G be a group with $J \leq G$ and $K \leq G$, and let g∈G. Then the double coset JgK is the set of all elements of G of the form jgk for j∈J and k∈K.

Proposition 5.24 Let G be a group of permutations, and c a set acted on by G. Suppose also that S and U are sets acted on by G. Then for any instance I of the k-transporter problem and any g∈G, either every element of $G_{\{c\}} g G_{\{S,U\}}$ is a solution of I, or none is.

To understand why this is important, imagine that we prune the overall search tree so that the only permutations g remaining are ones that are minimal in their double cosets JgK, where $J = G_{\{c\}}$ and $K = G_{\{S,U\}}$ as above. Will this impact the solubility of any instance of the k-transporter problem?

It will not. If a particular instance has no solutions, pruning the tree will not introduce any. If the particular instance has a solution g, then every element of JgK is also a solution, so specifically the minimal element of JgK is a solution, and this minimal element will not be pruned under our assumptions.

We see, then, that we can prune any node n for which we can show that every permutation g underneath n is not minimal in its double coset JgK. To state precise conditions under which this lets us prune the node n, suppose that we have some coset decomposition of a group G, and that $x_j$ is the point fixed at depth j of the tree. Now if n is a node at depth i in the tree, we know that n corresponds to a coset Ht of G, where H stabilizes each $x_j$ for $j \leq i$. We will denote the image of $x_j$ under t by $z_j$. If there is no $g \in Ht$ that is minimal in its double coset JgK for $J=G_{\{c\}}$ and $K=G_{\{S,U\}}$ as in Proposition 5.24, then the node n corresponding to Ht can be pruned.

Lemma 5.25 (Leon) If $x_1 \in x_k^{J_{x_1}, \cdots, x_{k-1}}$ for some $k \leq 1$ and $z_k > \min(z_l^{K_{z_1} z_2, \cdots z_{k-1}})$, then no $g \in Ht$ is the first element of JgK.

Lemma 5.26 (reported by Seress) Let s be the length of the orbit $x_l^{J_{x_1}, \cdots, x_{l-1}}$. If $z_l$ is among the last s−1 elements of its orbit in $G_{z_1, z_2, \ldots, z_{l-1}}$, then no $g \in Ht$ is the first element of JgK.

Both of these results give conditions under which a node in the coset decomposition can be pruned when searching for a solution to an instance of the k-transporter problem. Let us consider an example of each.

We begin with Lemma 5.25. If we return to our example from the end of Section 5.1, we have G=Sym(a, b, c, d), c={a, b}=S, and U=Ø. Thus $J=K=G_{\{a,b\}}$=Sym(a, b)×Sym(c, d)=((ab), (cd)).

Consider the node that we have repeatedly remarked can be pruned at depth 1, where we fix the image of a to be d. In this case, $x_1$=a and $z_1$=d. If we take k=l in the statement of the lemma, $x_l \in x_l^{J_{x_1}, \cdots, x_{l-1}}$ since $1 \in J_{x_1, \ldots, x_{l-1}}$. Thus we can prune if $$z_l > \min(z_l^{K_{z_1} z_2, \cdots z_{l-1}})$$

Further restricting to l=1 gives us $$z_1 > \min(z_1^K) \quad (19)$$

Figure 11:
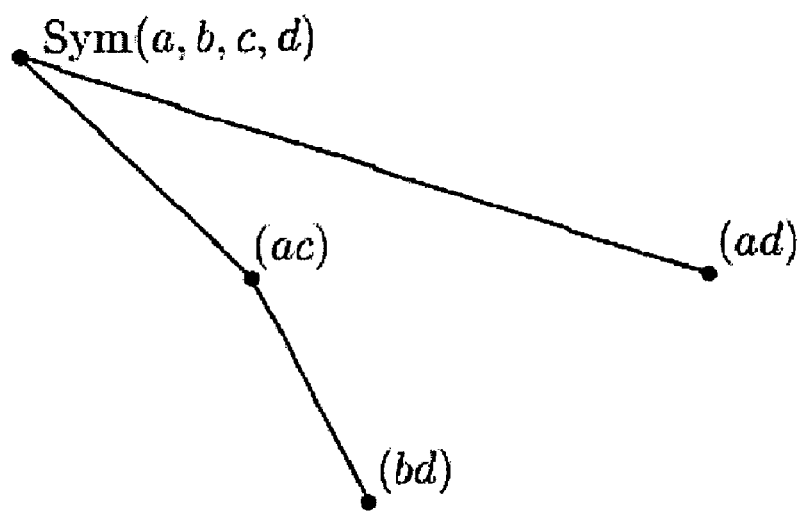

In this example, $z_1$=d, so $z_1^K$={c, d} and (19) holds (assuming that d>c in our ordering). The node can be pruned, and we finally get the reduced search space as shown in FIG. 11 as desired.

This node can be pruned by Lemma 5.26 as well. The conditions of the lemma require that we take s to be the length of the orbit of a under J (since l=1 here), so s=|{a, b}|=2. Thus the image of a cannot be among the last 2−1=1 points in a's orbit under G. Since the orbit of a under G is {a, b, c, d}, we can once again prune this node. (The previous node, which maps a to c, cannot be pruned, of course.)

This particular example is simple. The nodes being examined are at depth one, and there is significant overlap in the groups in question. While the same node is pruned by either lemma here, the lemmas prune different nodes in more complex cases. Note also that the groups $J=G_{\{c\}}$ and $K=G_{\{S,U\}}$ can be computed at the root of the tree, and the group J is independent of the sets S and U and can therefore be cached with the augmented clause (c, G).

Lemmas 5.25 and 5.26 are both well known results in the computational group theory community. We will also have use of the following:

Lemma 5.27 Suppose that t is the permutation labeling some node Ht of a coset decomposition tree at depth k, so that $x_i^t = z_i$ for $i \leq k$ and $G_{x_1, \ldots, x_k}$ is the residual group at this level. Let M be the set of points moved by $G_{x_1, \ldots, x_k}$. Now if $z_i > \min(x_i^{J_{Mx_1}, \cdots x_{i-1}^t})$ for any $i \leq k$, then no $g \in Ht$ is the first element of JgK.

As an example, consider the cardinality constraint $$x_1 + \ldots + x_m \geq n$$

corresponding to the augmented clause (c, G) with $$c = x_1 \vee \ldots \vee x_{m-n+1}$$

and G=Sym(X), where X is the set of all of the $x_i$.

Suppose that we fix the images of the xi in order, and that we are considering a node where the image of $x_1$ is fixed to $z_1$ and the image of $x_2$ is fixed to $z_2$, with $z_2 < z_1$. Now $J=G_{\{c\}}$=Sym($x_1, \ldots, x_{m-n+1}$)×Sym($x_{m-n+2}, \ldots, x_m$), so taking i=k=1 in Lemma 5.27 gives us $J_{x_{k+1}, \ldots, x_m^t}$=Sym($x_1, x_2$) since we need to fix all of the $x_j$ after $x_2$. But $x_1^{J_{x_{k+1}, \cdots x_m^t}} = \{z_1, z_2\}$, and since $z_1$ is not the smallest element of this set, this is enough to prune this node. See the proof of Proposition 6.9 for another example.

We will refer to Lemmas 5.25-5.27 as the pruning lemmas.

Adding lexicographic pruning to our k-transporter procedure gives us:

Procedure 5.28 Given groups $H \leq G$, an element $t \in G$, sets c, S and U and an integer k, to find a group element g=transport(G, H, t, c, S, U, k) with $g \in H$, $c^{gt} \cap S = \emptyset$ and $|c^{gt} \cap U| \leq k$:

```
 1  if overlap(H, c, S^{t^{-1}}) > 0
 2      then return FAILURE
 3  if overlap(H, c, (S ∪ U)^{t^{-1}}) > k
 4      then return FAILURE
 5  if c = c_H
 6      then return 1
 7  if a pruning lemma can be applied
 8      then return FAILURE
 9  α ← an element of c − c_H
10  for each t' in H/H_α
11      do r ← transport(G, H_α, t't, c, S, U, k)
12          if r ≠ FAILURE
13              then return rt'
14  return FAILURE
```

Note that the test in line 7 requires access to the groups J and K, and therefore to the original group G with which the procedure was called. This is why we retain a copy of this group in the recursive call on line 11.

It might seem that we have brought too much mathematical power to bear on the k-transporter problem specifically, but we disagree. High-performance satisfiability engines, running on difficult problems, spend in excess of 90% of their CPU time in unit propagation, which we have seen to be an instance of the k-transporter problem. Effort spent on improving the efficiency of Procedure 5.28 (and its predecessors) can be expected to lead to substantial performance improvements in any practical application.

We do, however, note that while lexicographic pruning is important, it is also expensive. This is why we defer it to line 7 of Procedure 5.28. An earlier lexicographic prune would be independent of the S and U sets, but the count-based pruning is so much faster that we defer the lexicographic check to the extent possible.

6 Unit Propagation

Procedure 5.28 was designed around the need to find a single permutation $g \in G$ satisfying the conditions of the k-transporter problem, and this technically suffices for ZAP's needs. In unit propagation, however, it is useful to collect all of the unit consequences of an augmented clause (c, G) at once, as opposed to collecting them via repeated transitions of G's coset decomposition tree.

As we work through the consequences of this observation, it will help to have an example that illustrates the points we are going to be making. To this end, we will consider the augmented clause $$(a \vee_b \vee_e, \text{Sym}(a, b, c, d) \times \text{Sym}(e, f)) \quad (20)$$

in a situation where a, b and c are false and d, e and f are unvalued. Both e and f are unit consequences of instances of (20).

Note, however, that we cannot simply collect all the group elements associated with each unit instance, since many group elements may correspond to the same clause instance $c^g$ or to the same unit literal $c^g \cap U$. In the above example, both ( ) and (ab) correspond to the identical clause a $\vee$b $\vee$e, and both this clause and a $\vee$c $\vee$e lead to the same conclusion e given the current partial assignment.

Our goal will therefore be to compute not a set of permutations, but the associated set of all unit conclusions:

Definition 6.1 Let (c, G) be an augmented clause, and P a partial assignment. The unit consequences of (c, G) given P is the set of all literals 1 such that there is a g∈G with $c^g \cap S(P) = \emptyset$ and $c^g \cap U(P) = \{1\}$. For a fixed literal w, the unit w-consequences of (c, G) given P is the set of all literals 1 such that there is a g∈G with w∈$c^g$, $c^g \cap S(P) = \emptyset$ and $c^g \cap U(P) = \{1\}$.

The unit w-consequences involve an additional requirement that the literal w appear in the clause instance in question. This will be useful when we discuss watched literals in the next section.

In our example, the unit consequences of (20) are e and f. The unit c-consequences are the same (although we can no longer use the identity permutation ( ), since the needed c is not in the base instance of (20)). There are no unit d-consequences of (20).

If the partial assignment is to be annotated, we will need not just the unit consequences, but the reasons as well:

Definition 6.2 Let X be a set of pairs <l, g>, where g∈G and l is a literal for each pair. We will denote by L(X) the set of literals that appear in pairs in X.

If (c, G) is an augmented clause and P a partial assignment, X will be called an annotated set of unit consequences of (c, G) given P if:
1. $c^g \cap S(P) = \emptyset$ and $c^g \cap U(P) = \{1\}$ for every <l, g>∈X and
2. L(X) is the set of unit consequences of (c, G) given P.

Once again returning to our example, <e, ( )> is an annotated consequence, as is <e, (abc)>. So are <f, (ef)> and <f, (abc)(ef)>. The set {<e, (abc)>, <f, (ef)>} is an annotated set of unit consequences, as is {<e, (abc)>, <f, (ef)>, <f, (abc)(ef)>}. But {<f, (ef)>, <f, (abc)(ef)>} is not an annotated set of unit consequences, since e does not appear as a consequence.

We now modify our k-transporter procedure so that we search the entire tree while accumulating an annotated set of unit consequences. We need to be careful, however, because the pruning lemmas may prune a node because it includes a permutation g that is not minimal in its double coset JgK. This is a problem because g and the minimal element of JgK may correspond to distinct unit consequences. In our running example, it may well be that none of the minimal elements of JgK supports f as a conclusion; if we accumulate all of the minimal elements, we will not get a full set of unit consequences as a result.

Given a successful g that is minimal in its double coset, reconstructing the relevant orbits under J and K is easy, so we begin by introducing some definitions that cater to this. The basic idea is that we want the minimal g to "entail", in some sense, the conclusions that can be drawn from other permutations in the double coset JgK.

In our example, the subgroup of G that simultaneously stabilizes S and U is $G_{\{S,U\}}$=Sym(a, b, c)×Sym(e, f). Once we have a permutation $g_1$ that allows us to conclude e, we can operate with $g_1 \cdot (ef) \in g_1 G_{\{S,U\}}$ to conclude f as well. We formalize this as follows:

Definition 6.3 Given a group G, we will say that <$l_1$, $g_1$> G-entails <$l_2$, $g_2$>, writing <$l_1$, $g_1$>$\vDash_G$<$l_2$, $g_2$>, if there is some g∈G such that $l_2 = l_1^g$ and $g_2 = g_1 g$. We will say that a set of pairs X G-entails a set of pairs Y, writing X$\vDash_G$Y, if every pair in Y is G-entailed by some pair in X.

A skeletal set of unit consequences of (c, G) given P is any set X of unit consequences that $G_{\{S(P),U(P)\}}$-entails an annotated set of unit consequences of (c, G) given P.

In our running example, we have $l_1$=e and g=(ef), allowing (for example) <e, ( )> to $G_{\{S,U\}}$-entail <f, (ef)>. Thus we see that {<e, ( )>} is a skeletal set of unit consequences of (20) given the partial assignment {¬a, ¬b, ¬c}.

Lemma 6.4 If X$\vDash_G$Y, then $L(Y) \subseteq L(X)^G$.

Proof. Every pair in Y is of the form <$l_1^g$, $g_1 g$> for <$l_1$, $g_1$>∈X and g∈G. Thus the associated literal is in $L(X)^G$.

To construct a full set of unit consequences from a skeletal set, we repeatedly find new unit conclusions until no more are possible:

Procedure 6.5 Given a set X of pairs <l, g> and a group C, to compute complete(X, G), where X$\vDash_G$ complete(X, G) and L(complete(X, G))=$L(X)^G$:

```
1    Y ← ∅
2    for each <l, g> ∈ X
3        do for each l' ∈ l^G
4            do if l' ∉ L(Y)
5                then select h ∈ G such that l^h = l'
6                    Y ← Y ∪ <l', gh>
7    return Y
```

Proposition 6.6 X$\vDash_G$ complete(X, G) and L(complete(X, G))=$L(X)^G$.

Now we can apply the pruning lemmas as the search proceeds, eventually returning a skeletal set of unit consequences for the clause in question. In addition, if there is a unit instance that is in fact unsatisfiable, we should return a failure marker of some sort. We handle this by returning two values, the first indicating whether or not a contradiction was found and the second the set of unit consequences.

Procedure 6.7 Given groups H≦G, an element t∈G, sets c, S and U, to find Transport (G, H, t, c, S, U), a skeletal set of unit consequences for (c, G) given P:

```
1    if overlap(H, c, S^{t^{-1}}) > 0
2        then return <false, ∅>
3    if overlap(H, c, (S ∪ U)^{t^{-1}}) > 1
4        then return <false, ∅>
5    if c = c_H
6        then if c^t ∩ U = ∅
7            then return <true, 1>
8            else return <false, <c^t ∩ U, 1>>
9    if a pruning lemma can be applied
10       then return <false, ∅>
11   Y ← ∅
```

-continued

```
12    α ← an element of c − c_H
13    for each t' in H/H_α
14        do <u, V> ← Transport(G, H_α, t't, c, S, U)
15           if u = true
16               then return <true, Vt'>
17               else Y ← Y ∪ {<l, gt'>|<l, g> ∈ V}
18    return <false, Y>
```

Proposition 6.8 Assume that $|c^h \cap V| \geq \text{overlap}(H, c, V) \geq |c_H \cap V|$ for all $h \in H$, and let Transport(G, c, S, U) be computed by Procedure 6.7. Then if there is a $g \in G$ such that $c^g \cap S = c^g \cap U = \emptyset$, Transport(G, c, S, U)=<true, g> for such a g. If there is no such g, Transport(G, c, S, U) (false, Z), where Z is a skeletal set of unit consequences for (c, G) given P.

As an application of the pruning lemmas, we have:

Proposition 6.9 Let (c, G) be an augmented clause corresponding to a cardinality constraint. Then for any sets S and U, Procedure 6.7 will expand at most a linear number of nodes in finding a skeletal set of unit consequences of (c, G).

In the original formulation of cardinality constraints (as in ZAP1), determining if a particular constraint is unit (and finding the implied literals if so) takes time linear in the length of the constraint, since it involves a simple walk along the constraint itself. It therefore seems appropriate for a linear number of nodes to be expanded in this case.

7 Watched Literals

There is one pruning technique that we have not yet considered, and that is the possibility of finding an analog in our setting to Zhang and Stickel's watched literal idea.

To understand the basic idea, suppose that we are checking to see if the clause a ∨ b ∨ c is unit in a situation where a and b are unvalued. It follows that the clause cannot be unit, independent of the value assigned to c.

At this point, we can watch the literals a and b; as long as they remain unvalued, the clause cannot be unit. In practice, the data structures representing a and b include a pointer to the clause in question, and the unit test needs only be performed for clauses pointed to by literals that are changing value.

As we continue to discuss these ideas, it will be useful to distinguish among three different types of clauses: those that are satisfied given the current partial assignment, those that are unit, and those that are neither:

Definition 7.1 Let C be a clause, and P a (possibly annotated) partial assignment. We will say that C is settled by P if it is either satisfied nor unit; otherwise it is unsettled.

We now have:

Definition 7.2 Let C be a clause, and P a (possibly annotated) partial assignment. If C is unsettled by P, then a watching set for C under P is any set of literals W such that $|W \cap C \cap U(P)| > 1$.

In other words, W contains at least two unvalued literals in C if C.

What about if C is satisfied or unit? What should the watching set be in this case?

In some sense, it doesn't matter. Assuming that we notice when a clause changes from unsettled to unit (so that we can either unit propagate or detect a potential contradiction), the clause becomes uninteresting from this perspective, since it can never generate a second unit propagation. So we can watch it or not as we see fit.

In another sense, however, it does matter. One of the properties that we would like the watching sets to have is that they remain valid during a backtrack. That means that if a settled clause C becomes unsettled during a backtrack, there must be two watched and unvalued variables after that backtrack.

In order to discuss backtracking in a formal way, we introduce:

Definition 7.3 Let P be a partial assignment for a set T of (possibly augmented) clauses. We will say that P is T-closed if no clause $C \in T$ has a unit consequence given P. A T-closure of P is any minimal, sound and T-closed extension of P, and will be denoted by either $\overline{P_T}$ or by simply $\overline{P}$ if T is clear from context.

The definition of closure makes sense because the intersection of two closed partial assignments is closed as well. To compute the closure, we simply add unit consequences one at a time until no more are available. Note that there is still some ambiguity; if there is more than one unit consequence that can be added at some point, we can add the unit consequences in any order.

Definition 7.4 Let P be a partial assignment. We will say that a subassignment P' of P is a backtrack point for P if either P'=P or P'=$\overline{P'}$. We will denote by P_ the largest backtrack point for P that is not P itself.

If C is a clause, we will say that the P-retraction of C, to be denoted $P\neg_C$, is the largest backtrack point for P for which C is unsettled.

Note that we require a backtrack to the point that C is unsettled, as opposed to simply unsatisfied. In general, there is no difference because Definition 7.4 does not permit a backtrack to a point where C is unit. But if C is unit under P, we want to evaluate the watching set in the partial assignment before C became unit.

Since P itself is a backtrack point for P, we immediately have:

Lemma 7.5 If C is unsettled by P, then $P\neg_C = P$.

As an example, suppose that we have the following annotated partial assignment P:

| literal | reason |
| --- | --- |
| a | true |
| ¬b | true |
| c | ¬a ∨ b ∨ c |
| d | true |
| e | b ∨ ¬d ∨ e |

If our clause C is b ∨ e ∨ f, the P-retraction of C is ⟨a, ¬b, c⟩. Removing e is sufficient to make C unsettled, but <a, ⟩b, c, d> is not closed and is therefore not a legal backtrack point. If b ∨ e is in our theory, the retraction is in fact (a) because ⟨a, ¬b, c⟩ is not a backtrack point because the unit conclusion e has not been drawn.

We can now generalize Definition 7.2 to include settled clauses:

Definition 7.6 Let C be a clause, and P an annotated partial assignment. A watching set for C under P is any set of literals W such that $|W \cap C \cap U(P\neg_C)| > 1$.

In other words, W will contain at least two unvalued literals in C if we replace P with the P-retraction of C. As discussed earlier, this is the first point to which we could backtrack so that C was no longer satisfied or unit. Continuing our earlier example, $\{e, f\}$ is a watching set for $b \vee e \vee f$, and $\{\neg b, e\}$ is a watching set for $\neg b \vee e$. A watching set for $b \vee e$ is $\{b, e\}$; recall that the definition forces us to backtrack all the way to $<a>$.

Lemma 7.7 If W is a watching set for C under P, then so is any superset of W.

In order for watching sets to be useful, of course, we must maintain them as the search proceeds. Ideally, this maintenance would involve modifying the watching sets as infrequently as possible, so that we could adjust them only as required when variables take new values, and not during backtracking at all. Returning to our example clause where a and b are unvalued and watch the clause $a \vee b \vee c$, if a or b becomes satisfied, we need do nothing since the clause is now satisfied and $\{a, b\}$ is still a watching set. Note that if a (for example) becomes satisfied, we can't remove b from the watching set, since we would then need to replace it if we backtrack to the point that a is unvalued once again. Leaving b in the watching set is required to satisfy Definition 7.6 and needed to ensure that the sets need not be adjusted after a backtrack.

On the other hand, if a (for example) becomes unsatisfied, we need to check the clause to see whether or not it has become unit. If the clause is unit, then b should be set to true by unit propagation, so we need do nothing. If the clause is unsettled, then c must be unvalued, so we can replace a with c in the set of literals watching the clause. Finally, if the clause is already satisfied, then a will be unvalued in the P-retraction of the clause and the watching set need not be modified.

In general, we have:

Proposition 7.8 Suppose that W is a watching set for C under P and l is a literal. Then:
1. W is a watching set for C under any backtrack point for P.
2. If C is settled by $<P, l>$, then W is a watching set for C under $<P, l>$.
3. If C is settled by $<P, l>$, and $|(W-\{\neg l\}) \cap C \cap U(P_{\neg C})| > 1$, then $W-\{\neg l\}$ is a watching set for C under $<P, l>$.
4. If $\neg l \notin W \cap C$, then W is a watching set for C under $<P, l>$.

The proposition tells us how to modify the watching sets as the search proceeds. No modification is required during a backtrack (claim 1). No modification is required if the clause is already satisfied or unit (claim 2), and we can also remove a newly valued literal from a watching set if enough other unvalued variables are present (claim 3). No modification is required unless we add the negation of an already watched literal (claim 4).

In sum, modification to the watching sets is only required when we add the negation of a watched literal to our partial assignment and the watched clause is not currently settled; in this case, we have to add one of the remaining unvalued literals to the watching set. In addition, we can remove literals from the watching set if enough unvalued literals are already in it. Here is an example of the last possibility.

Suppose that we are, as usual, watching a and b in a $\vee b \vee c$. At some point, a becomes true. We can either leave the watching set alone by virtue of condition 4, or we can extend the watching set to include c (extending a watching set is always admissible, by virtue of Lemma 7.7), and then remove a from the watching set. This change is unneeded in a ground prover, but will be useful in the augmented version 7.10 of the proposition below.

To lift these ideas to an augmented setting, we begin by modifying Definition 7.6 to get:

Definition 7.9 Let (c, G) be an augmented clause, and P an annotated partial assignment. A watching set for (c, G) under P is any set of literals W that is a watching set for every instance $c^g$ of (c, G) under P.

This leads to the following augmented analog of Proposition 7.8:

Proposition 7.10 Suppose that W is a watching set for (c, G) under P and l is a literal. Then:
1. W is a watching set for (c, G) under any backtrack point for P.
2. If $\neg l \notin W \cap c^G$, then W is a watching set for (c, G) under $<P, l>$.
3. If $|(W \cup V) \cap c^g \cap U(<P, l>)| > 1$ for every $g \in G$ such that $c^g$ is unsettled by $<P, l>$, then $W \cup V$ is a watching set for (c, G) under $<P, l>$.
4. If $|(W \cup V) \cap c^g \cap [U(<P, l>) \cup (S(P)-S(P\_))]| > 1$ for every $g \in G$, then $W \cup V - \{\neg l\}$ is a watching set for (c, G) under $<P, l>$.

As an example, suppose that we return to the augmented clause we considered in the previous section, $(a \vee b \vee e, \text{Sym}(a, b, c, d) \times \text{Sym}(e, f))$. Suppose that we are initially watching a, b, c and d, and that e is false, and now imagine that a becomes false as well.

We need to augment W so that $|W \cap c^g \cap U(P)| > 1$ for every unsettled instance $c^g$ of (c, G) that contains a. Those instances are $a \vee b \vee f$, $a \vee c \vee f$ and $a \vee d \vee f$. Since b, c and d are already in W, we need to add f. If f had been in the watching set but not b, c and d, we would have had to add those three points instead.

In this case, since the clause has a unit instance ($a \vee b \vee e$, for example), we cannot remove a from the watching set. The reason is that if we do so and later backtrack past this point, we are in danger of watching only b for this unsatisfied clause.

Suppose, however, that e had been unvalued when a became false. Now we would have to add both e and f to the watching set and we would be free to remove a. This is sanctioned by Proposition 7.10, since (c, G) has no settled instances and if $c^g \cap S(P) = \emptyset$ for all $g \in G$ as well, the conditions of claims three and four are equivalent.

What if e, instead of being false or unvalued, had been true? Now we add f to the watching set, but can we remove a from the new watching set $\{a, b, c, d, f\}$? We cannot: the instance $a \vee b \vee e$ would only have one watched literal if we did.

In some cases, however, we can remove the literal that just became false from the watching set. We can surely do so if every clause instance still has two unvalued literals in the watching set, for example. This would correspond to the requirement that $$|(W \cup V) \cap c^g \cap (<P, l>)| > 1$$

for every instance. The stronger condition in the proposition allows us to do slightly better in cases where the satisfied literal in the clause became satisfied sufficiently recently that we know that any backtrack will unvalue it.

The fourth conclusion in Proposition 7.10 is essential to the effective functioning of our overall prover; when we replace a watched literal l that has become false with a new and unvalued literal, it is important that we stop watching the original watched literal l. It is the last claim in the proposition that allows us to do this in most (although not all) practical cases.

We can now use the watching sets to reduce the number of clauses that must be examined in line 1 of the unit propagation procedure 2.7. Each augmented clause needs to be associated with a watching set that is initialized and updated as sanctioned by Proposition 7.10.

Initialization is straightforward; for any clause (c, G) with c of length at least two, we need to define an associated watching set W with the property that $|W \cap c^g| > 1$ for every $g \in G$. In fact, we take W to be simply $c^G$, the union of all of the instances $c^g$, and rely on subsequent unit tests to gradually reduce the size of W. The challenge is to modify Procedure 6.7 in a way that facilitates the maintenance of the watching sets.

Before doing this, let us understand in a bit more detail how the watching sets are used in searching for unit instances of a particular augmented clause. Consider the augmented clause corresponding to the quantified clause $$\forall xy. p(x) \char`\^ q(y) \to r$$

If P is the set of instances of p(x) and Q the set of instances of q(y), this becomes the augmented clause $$(\neg p(0) \vee \neg q(0) \vee r, \text{Sym}(P) \times \text{Sym}(Q)) \qquad (21)$$

where p(0) and q(0) are elements of P and Q respectively.

Figure 13:
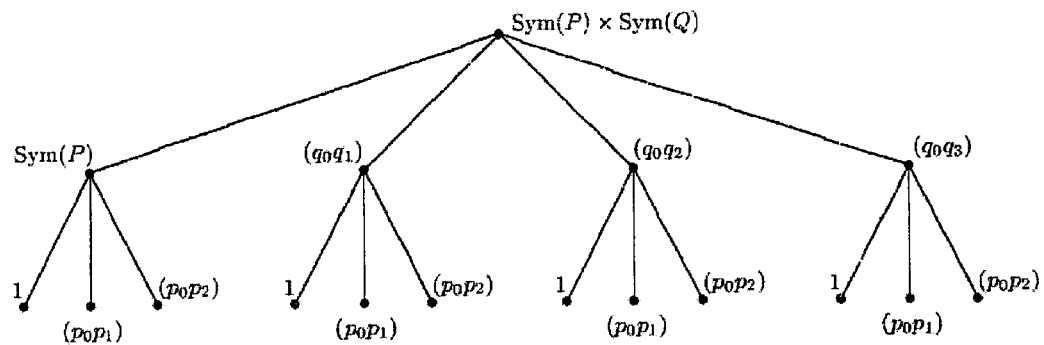

Now suppose that q(y) is true for all y, but p(x) is unvalued, as is r, so that the clause (21) has no unit instances. Suppose also that we search for unit instances of (21) by first stabilizing the image of q and then of p (r is stabilized by the group Sym(P)×Sym(Q) itself). If there are four possible bindings for y (which we will denote 0,1, 2, 3) and three for x (0, 1, 2), the search space is as shown in FIG. 13. In the interests of conserving space, we have written $p_i$ instead of p(i) and similarly for $q_j$.

Each of the fringe nodes fails because both r and the relevant instance of p(x) are unvalued, and we now construct a new watching set for the entire clause (21) that watches r and all of the p(x).

Figure 14:
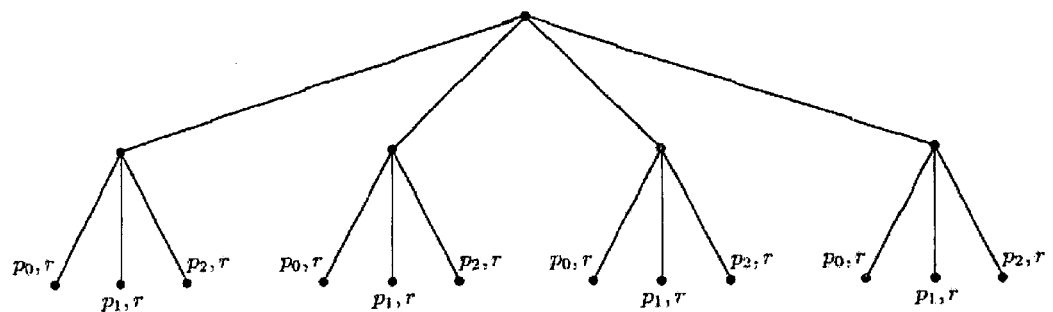

Note that this causes us to lose significant amounts of information regarding portions of the search space that need not be reexamined. In this example, the responsible literals at each fringe node are as shown in FIG. 14. When we simply accumulate these literals at the root of the search tree, we conclude that the reason for the failure is the watching set $\{p_0, p_1, p_2, r\}$. If any of these watched literals now changes value, we potentially have to reexamine the entire search tree.

Figure 15:
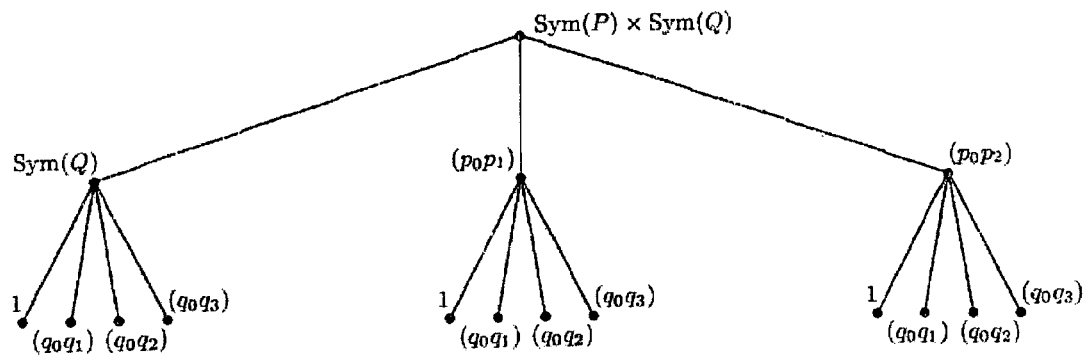

We can address this by changing the order of variable stabilization, replacing the search space depicted above with the space illustrated in FIG. 15.

Figure 16:
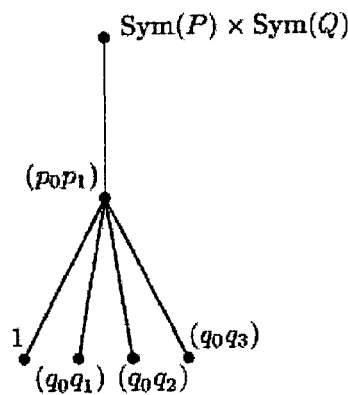

Now only the center node needs reexpansion if the value of $p_1$ changes, since it is only at this node that $p_1$ appears. The search space becomes simply the one shown in FIG. 16, which is what one would expect if $p_1$ changes value.

The upshot of this is that while we collect a new watching set for the original augmented clause corresponding to (21), we also need to modify our unit propagation procedure so that we first stabilize points that can be mapped to a specific watched literal that has become unsatisfied.

To see how to keep the watching set updated, consider Proposition 7.10. When searching for the unit instances of an augmented clause (c, G), we need to compute some set W such that $|W \cap c^g \cap U(P)| > 1$ for every unsettled instance $c^g$ of (c, G) that contains a fixed literal w. How are we to do this?

The solution lies in Procedure 6.7, which describes our search for unit instances. If all of the remaining clause instances below some particular search node are determined to be nonunit in the test on line 3, instead of simply recognizing that every instance under this node is nonunit, we need to be able to identify a set of unvalued literals that meets every unsettled instance of $c^g$ at least twice. We modify the overlap procedure 5.20 to become:

Procedure 7.11 Given a group H, two sets c, V acted on by H, and a bound $k \geq 0$, to compute overlap(H, c, V, k), a collection of elements of V sufficient to guarantee that for any $h \in H$, $|c^h \cap V| > k$, or Ø if no such collection exists:

```
1   m ← 0
2   W ← Ø
3   for each orbit X of H
4      do {B_i} ← a minimal block system for
             X under H for which c ∩ X ⊆ B_i for some i
5      Δ = |c ∩ X| + min(B_i ∩ V) − |B_1|
6      if Δ > 0
7         then m ← m + Δ
8                W ← W ∪ (X ∩ V)
9         if m > k
10            then return W
11  return Ø
```

Proposition 7.12 Procedure 7.11 returns a nonempty set W if and only if Procedure 5.20 returns a value in excess of k. In this case, $|c^h \cap W| > k$ for every $h \in H$.

We are finally in a position to replace Procedure 6.7 with a version that uses watched literals:

Procedure 7.13 Given groups $H \leq G$, an element $t \in G$, sets c, S and U, and optionally a watched element w, to find Transport (G, H, t, c, S, U, w), a skeletal set of unit w-consequences for (c, G) given P:

```
1   if w is supplied and w^{t^{-1}} ∉ c^H
2      then return <false, Ø, Ø>
3   V ← overlap(H, c, S^{t^{-1}}, 0)
4   if V ≠ Ø
5      then return <false, Ø, Ø>
6   V ← overlap(H, c, (S ∪ U)^{t^{-1}}, 1)
7   if V ≠ Ø
8      then return (false, Ø, V^t)
9   if c = c_H
10     then if c^t ∩ U = Ø
11        then return <true, 1, Ø>
12        else return <false, <c^t ∩ U, 1>, Ø>
13  if a pruning lemma can be applied
14     then return <false, Ø, Ø>
15  α ← an element of c − c_H. If w is supplied
         and w ∈ c^t_H, choose α so that w^{t^{-1}} ∈ α^H.
16  Y ← Ø
17  W ← Ø
18  for each t' in H/H_α
19     do <u, V, X> ← Transport(G, H_α, t't, c, S, U, w)
20        if u = true
21           then return <true, Vt', Ø>
22           else W ← W ∪ X
23                Y ← Y ∪ {<l, gt'>|<l, g> ∈ V}
24  return <false, Y, W>
```

In the application of the pruning lemmas in line 13, we need to use the restricted group $G_{\{S,U,\{w\}\}}$, so that we do not prune a group element g with $w \in c^g$ on the basis of another group element jgk for which $w \in c^{jgk}$, since jgk might itself then be pruned on line 2.

Proposition 7.14 Suppose that overlap(H, c, V, k) is computed using Procedure 7.11, or otherwise satisfies the conclusion of Proposition 7.12. Then if there is a $g \in G$ such that $w \in c^g$ and $c^g \cap S = c^g \cap U = Ø$, Transport(G, c, S, U, w) as computed by Procedure 7.13 returns <true, g> for such a g. If there is no such g, Procedure 7.13 returns <false, Z, W>, where Z is a skeletal set of unit w-consequences of (c, G) given P, and W is such that $|W^{G_{\{S,U,\{w\}\}}} \cap c^h \cap U| > 1$ for every $h \in H$ such that $w \in c^h$ and $c^h$ is unsettled by P.

Note that the pruning lemmas are applied relatively late in the procedure (line 13) even though a successful application prunes the space without increasing the size of the watching set. It might seem that the pruning lemmas should be applied earlier.

This appears not to be the case. The pruning lemmas are relatively complex to check; moving the test earlier (to precede line 6, presumably) actually slows the unit propagation procedure by a factor of approximately two, primarily due to the need to compute the set stabilizer $G_{\{S,U\}}$ even in cases where a simple counting argument suffices. In addition, the absolute impact on the watching sets can be expected to be quite small.

To understand why, suppose that we are executing the procedure for an instance where it will eventually fail. Now if n is a node that can be pruned either by a counting argument (with the new contribution $W_n$ to the set of watched literals) or by a lexicographic argument using another node n', then since the node n' will eventually fail, it will contribute its own watching set $W_{n'}$ to the eventually returned value. While it is possible that $W_n \neq W_{n'}$ (different elements can be selected by the overlap function in line 6, for example), we expect that in the vast majority of cases we will have $W_n = W_{n'}$ and the non-lexicographic prune will have no impact on the eventual watching set computed.

Proposition 7.14 implies that the watching set returned by Procedure 7.13 can be used to update the watching set as in the third claim of Proposition 7.10. For the fourth claim, where we hope to remove ¬l from the new watching set, we need to check to see if $$|W \cap c^g \cap [U(<P, l>) \cup (S(P) - S(P_-))]| > 1$$

for each $g \in G$, where W is the new watching set. This can be determined by a single call to transport; if there is no $g \in G$ for which $$|c^g \cap [W \cap (U(<P, l>) \cup (S(P) - S(P_-)))]| < 1 \quad (22)$$

we can remove ¬l from W. In some cases, we can save the call to transport by exploiting the fact (as shown in the proof of Proposition 7.10) that (22) cannot be satisfied if $<P, l>$ has a unit consequence.

We are finally in a position to describe watched literals in an augmented setting. As a start, we have:

Definition 7.15 A watched augmented clause is a pair $<(c, G), W>$ where $(c, G)$ is an augmented clause and W is a watching set for $(c, G)$.

Procedure 7.16 (Unit propagation) To compute UNIT-PROPAGATE(C, P, L) where C is a set of watched augmented clauses, P is an annotated partial assignment, and L is a set of pairs $<l, r>$ of literals l and reasons r:

```
1   while L ≠ ∅
2       do <l, r> ← an element of L
3           L ← L − <l, r>
4           P ← <P, <l, r>>
5           for each <(c, G), W> ∈ C
6               do if ¬l ∈ W
7                   then <r, H, V> ← Transport(G, c, S(P), U(P), ¬l)
8                       if r = true
9                           then l_i ← the literal in c^H with the highest index in P
10                          return <true, resolve((c^H, G), c_i)>
11                      H' ← complete(H, G_{S(P),U(P),{l}})
12                      for each h ∈ H'
13                          do z ← the literal in c^h unassigned by P
14                              if there is no <z, r'> in L
15                                  then L ← L ∪ <z, c^h>
16                      W ← W ∪ (U(P) ∩ V^{G{S(P),U(P),{l}}})
17                      U ← U(P) ∪ (S(P) − S(P_−))
18                      if H = ∅ ∧transport(G, c, ∅, W ∩ U, 1, ¬l) = FAILURE
19                          then W ← W − {¬l}
20  return <false, P>
```

On line 18, we invoke a version of the transport function that accepts as an additional argument a literal that is required to be included in the clause instance being sought. This modification is similar to the introduction of such a literal w in the Transport procedure 7.13.

Proposition 7.17 Let P be an annotated partial assignment, and C a set of watched augmented clauses, where for every $<(c, G), W> \in C$, W is a watching set for $(c, G)$ under P. L be the set of unit consequences of clauses in C. If UNIT-PROPAGATE (C, P, L) returns $<$true, c$>$ for an augmented clause c, then c is a nogood for P, and any modified watching sets in C are still watching sets under P. Otherwise, the value returned is (false, $\overline{P}$) and the watching sets in C will all have been replaced with watching sets under $\overline{P}$.

Procedure 7.16 can be modified and incorporated into Procedure 2.8, where the literal most recently added to the partial assignment is added to L and thereby passed into the unit propagation procedure.

8 Resolution Revisited

There is one additional theoretical point that we need to discuss before turning our attention to experimental issues.

The goal in augmented resolution is to produce many (if not all) of the resolvents sanctioned by instances of the augmented clauses being resolved. As we showed in ZAP2, however, it is not always possible to produce all such resolvents. Here is another example of that phenomenon.

Suppose that we are resolving the two clauses $$(a \vee c, (ab)) \quad (23)$$

and $$(b \vee \neg c, (ab)) \quad (24)$$

The result is:

$$(a \vee b, (ab)) \quad (25)$$

But consider the example. The instances of (23) are a $\vee$c and b $\vee$c; those of (24) are b $\vee \neg$c and a $\vee \neg$c. Surely it is better to have the resolvent be (a, (ab)) instead of (25). In general, we never want to conclude (c, G) when it is possible to conclude (c', G) for c' ⊂ c where the set inclusion is proper. The resolvent with c' is properly stronger than that with c.

There is an additional consideration as well. Suppose that we are resolving two augmented clauses, and can choose instances so that the resolvent is (a $\vee$(c, G)) or (b $\vee$(c, G)), where a and b are literals and the two possible resolvents are distinct because (ab)∉G. Which should we select?

A reasonable heuristic is to make the choice based on the order in which literals were added to the current partial assignment. Assuming that the resolvent is a nogood, presumably a and b are both false for the current partial assignment P. We should select the resolvent that allows a larger backjump; in this case, the resolvent involving the literal that was added to P first.

All of these considerations have no analog in a conventional Boolean satisfiability engine. For any particular literal l, the resolvent of the reasons for l and for ¬l is just that; there is no flexibility possible.

Definition 8.1 Let $(\alpha, G)$ and $(\beta, H)$ be two augmented clauses resolving on a literal l, so that $l \in \alpha$ and $\neg l \in \beta$. A candidate l-resolvent for $(\alpha, G)$ and $(\beta, H)$ will be any clause obtained by resolving $\alpha^g$ and $\beta^h$ for $g \in C$ and $h \in H$ such that $l \in \alpha^g$ and $\neg l \in \beta^h$.

Note that the group Z in the resolvent clause (resolve($\alpha^g$, $\beta^h$), Z) is independent of the candidate resolvent selected, so we can focus our attention strictly on the syntactic properties of the candidate resolvent.

We next formalize the fact that the partial assignment P induces a natural lexicographic ordering on the set of nogoods for a given theory:

Definition 8.2 Let P be a partial assignment, and c a ground clause. We will say that the depth of c is the latest position in P of a literal ¬l for some $l \in c$; the depth is zero if c no such literal exists and will be denoted by $c^{?P}$.

Now if $c_1$ and $c_2$ are two nogoods, we will say that $c_1$ is earlier than $c_2$ for P, writing $c_1 <_P c_2$, if either $c_1^{?P} < c_2^{?P}$, or $c_1^{?P} = c_2^{?P}$ and $c_1 - \neg l_{c_1}?P <_P c_2 - \neg l_{c_2} P$.

As an example, suppose that P is <a, b, c, d, e>. The depth of ¬a ∨ ¬c is three, since c is the third variable assigned in P. The depth of ¬b ∨ ¬d is four. Thus ¬a ∨ ¬c $<_P$ ¬b ∨ ¬d; we would rather learn ¬a ∨ ¬c because it allows us to backjump to c instead of to d. Similarly ¬a ∨ ¬c ∨ ¬e $<_P$ ¬b ∨ ¬d ∨ ¬e; once the common element ¬e is eliminated, we would still rather backtrack to c than to d. In general, our goal when resolving two augmented clauses is to select a candidate resolvent that is minimal under $<_P$. Note that we have:

Lemma 8.3 If $c_1 \subset c_2$ are two nogoods for P, then $c_1 <_P c_2$.

Procedure 8.4 Suppose we are given two augmented clauses $(\alpha, G)$ and $(\beta, H)$ that are unit for a partial assignment $P = <l_1, \ldots, l_n>$, with $l \in \alpha$ and $\neg l \in \beta$. To find $\alpha <_P$-minimal candidate l-resolvent of $(\alpha, G)$ and $(\beta, H)$:

```
1   U ← {l, ¬l}    ▷literals you can't avoid
2   α_f ← α
3   β_f ← β
4   p ← [(α ∪ β) − U]^{?P}
5   while p > 0
6       do g ← transport(G, α, {¬l_p, ..., ¬l_n} − U, ∅, l)
7           h ← transport(H, β, {¬l_p, ..., ¬l_n} − U, ∅, ¬l)
8           if g = FAILURE ∨ h = FAILURE
9               then U ← U ∪ {¬l_p}
10              else α_f ← α^g
11                   β_f ← β^h
12                   p ← [(α_f ∪ β_f) − U]^{?P}
13  return resolve(α_f, β_f)
```

The basic idea is that we gradually force the two clause instances away from the end of the partial assignment; as we back up, we keep track of literals that are unavoidable because an associated call to transport failed. The unavoidable literals are accumulated in the set U above, and as we continue to call the transporter function, we have no objection if one or both of the clause instances includes elements of U. At each point, we refocus our attention on the deepest variable that is not yet known to be either avoidable or unavoidable; when we reach the root of the partial assignment, we return the instances found.

Here is an example. Suppose that P=<a, b, c, d, e> as before, and that $(\alpha, G)$ has instances ¬c ∨ ¬d ∨ l and ¬a ∨ ¬e ∨ l. The second clause $(\beta, H)$ has the single instance ¬b ∨ ¬e ∨ ¬l.

If we resolve the $<_P$-minimal instances of the two augmented clauses, we will resolve ¬c ∨ ¬d ∨ l with ¬b ∨ ¬e ∨ ¬l to get ¬b ∨ ¬c ∨ ¬d ∨ ¬e. We do better if we resolve ¬a ∨ ¬e ∨ l and ¬b ∨ ¬e ∨ ¬l instead to get ¬a ∨ ¬b ∨ ¬e. The literals ¬b and ¬e appear in any case, we're better off with ¬a than with ¬c ∨ ¬d.

Suppose that we follow this example through the procedure, with U initially set to {l, ¬l} and (say)α and therefore $α_f$ set to ¬c ∨ ¬d ∨ l. Both β and $β_f$ are set to ¬b ∨ ¬e ∨ ¬l, since this is the only instance of $(β, H)$. The initial value for p is five, since the last literal in $\alpha \cup \beta - U = \{¬b, ¬c, ¬d, ¬e\}$ is ¬e.

We now try to find a way to avoid having ¬e appear in the final resolvent. We do this by looking for an instance of $(α, G)$ that includes l (the literal on which we're resolving) and avoids ¬e (and any subsequent literal, but there aren't any). Such an instance is given by α itself. But there is no instance of $(β, H)$ that avoids ¬e, so the call in line 7 fails. We therefore add ¬e to U and leave the clauses $α_f$ and $β_f$ unchanged. We decrement p to four, since ¬e is no longer in $(α_f \cup β_f) - U$.

On the next pass through the loop, we are looking for clause instances that avoid $\{¬d, ¬e\} - U = \{¬d\}$. We know that we'll be forced to include ¬e in the final result, so we don't worry about it. All we hope to do at this point is to exclude ¬d.

Here, we are successful in finding such instances. The existing instance β suffices, as does the other instance ¬a ∨ ¬e ∨ l of $(α, G)$. This becomes the new $α_f$ and p gets reduced to two, since we now have $(α_f \cup β_f) - U = \{¬a, ¬b\}$.

The next pass through the loop tries to avoid ¬b while continuing to avoid ¬c and ¬d (which we know we can avoid because the current $α_f$ and $β_f$ do so). This turns out to be impossible, so ¬b is added to U and p is decremented to one. Avoiding ¬a is impossible as well, so p is decremented to zero and the procedure correctly returns ¬a ∨ ¬b ∨ ¬e.

Proposition 8.5 Suppose that we are given two augmented clauses $(α, G)$ and $(β, H)$ such that α and β are unit for a partial assignment P, with $l \in α$ and $¬l \in β$. Then the value returned by Procedure 8.4 is a $<_P$-minimal candidate l-resolvent of $(α, G)$ and $(β, H)$.

The procedure can be implemented somewhat more efficiently than described above; if $α_f$, for example, already satisfies the condition implicit in line 6, there is no need to reinvoke the transport function for g.

More important than this relatively slender improvement, however, is the fact that resolution now involves repeated calls to the transport function. In general, Boolean satisfiability engines need not worry about the time used by the resolution function, since unit propagation dominates the running time. A naive implementation of Procedure 8.4, however, involves more calls to transport than does the unit propagation procedure, so that resolution comes to dominate ZAP's overall runtime.

To correct this, remember the point of Procedure 8.4. The procedure is not needed for correctness; it is only needed to find improved resolution instances. The amount of time spent looking for such instances should be less than the computational savings achieved by having them. Put slightly differently, there is no requirement that we produce a candidate resolvent that is absolutely minimal under the $<_P$ ordering. A candidate resolvent that is nearly minimal will suffice, especially if producing the truly minimal instance involves large computational cost.

We achieve this goal by working with a modified transport function on lines 6 and 7 of Procedure 8.4. Instead of expanding the coset decomposition tree completely, a limited number of nodes are examined in searching for candidate resolvents. ZAP's current implementation prunes the transporter search after 100 nodes have been examined; in solving the pigeonhole problem, for example, this turns out to be sufficient to ensure that the resulting proof length is the same as it would have been had strictly $<_P$-minimal resolvents been found. We also modify the pruning computation, pruning with $K = G_{S \cup U}$ instead of the more difficult to compute $G_{\{S,U\}}$. Since $G_{S \cup U} \leqq G_{\{S,U\}}$ (stabilizing every element of a set surely stabilizes the set itself), this approximation saves time but reduces the amount of possible pruning. This is appropriate given the artificially reduced size of the overall search tree and the need to produce an answer quickly.

9 Zap Problem Format

Historically, Boolean satisfiability problems are typically in a format where variables correspond to positive integers, literals are nonzero integers (negative integers are negated literals), and clauses are terminated with zeroes. The so-called DIMACS format precedes the actual clauses in the problem with a single line such as p cnf 220 1122 indicating that there are 220 variables appearing in 1,122 clauses in this problem.

This numerical format makes it impossible to exploit any existing understanding that the user might have of the problem in question; this may not be a problem for a conventional Boolean tool (since the problem structure will have been obscured by the Boolean encoding in any event), but was felt to be inappropriate when building an augmented solver. We felt that it was important for the user to be able to:

1. Specify numerical constraints such as appear in cardinality or parity constraints,
2. Quantify axioms over finite domains, and
3. Provide group augmentations explicitly if the above mechanisms were insufficient.

Before discussing the specific provisions ZAP makes in each of these areas, we remark that each ZAP input file begins with a list of domain specifications, giving the names and sizes of each domain used in the theory. This is followed by predicate specifications, giving the arity of each predicate and the domain type of each argument. After the predicates and domains have been defined, it is possible to refer to predicate instances directly (e.g., in [1 3] indicating that the first pigeon is in the third hole) or in a nonground fashion (e.g., in [x y]).

Group definition When a group is specified directly, it is assigned a symbolic designator that can then be used in an augmented clause. The group syntax is the conventional one, with a group being described in terms of generators, each of which is a permutation. Each permutation is a list of cycles, and each cycle is a space-separated list of literals.

An augmented clause that uses a previously defined group is of the form symbols GROUP $group_1 \ldots group_n$ where the symbols are essentially a sequence of literals and each $group_i$ is the designator for a group to be used. The group in the augmented clause is then the group collectively generated by the $group_i$'s.

As an example, here is the group-based encoding of the pigeonhole instance involving four pigeons and three holes:

```
// domain specs
SORT pigeon 4 ;
SORT hole 3 ;
// predicate specs
PREDICATE in(pigeon hole) ;
// group specs
GROUP G <  ((in[1 1] in[2 1]) (in[1 2] in[2 2]) (in[1 3] in[2 3]))
           ((in[1 1] in[3 1] in[4 1]) (in[1 2] in[3 2] in [4 2])
           (in[1 3] in[3 3] in [4 3]))
           ((in[1 1] in[1 2] (in[2 1] in[2 2]) (in[3 1] in[3 2])
           (in[4 1] in[4 2]))
           ((in[1 1] in[1 3]) (in[2 1] in[2 3]) (in[3 1] in[3 3])
           (in[4 1] in[4 3])) > ;
// group-based encoding
-in[1 1] -in[2 1] GROUP G ;
in[1 1] in[1 2] in[1 3] GROUP G ;
```

There are two types of domain variables, pigeons (of which there are four) and holes (of which there are three). There is a single predicate indicating that a given pigeon is in a particular hole. There is a single group, which corresponds to both symmetry over holes and over pigeons. The first axiom says that the first hole cannot contain both of the first two pigeons, and therefore that no hole can contain two distinct pigeons by virtue of the group action. The second axiom says that the first pigeon has to be in some hole, and therefore that every pigeon does.

Cardinality and parity constraints If the group is not specified directly, the general form of a ZAP axiom is quantifiers symbols result where the quantifiers are described in the next section. The result includes information about the desired "right hand side" of the axiom, and can be any of the following:

- A simple terminator, indicating that the clause is Boolean,
- A comparison operator (>, <=, =, etc.) followed by an integer, indicating that the clause is a cardinality constraint, or
- A modular arithmetic operator (% n=) followed by an integer m, indicating that the sum of the values of the literals is required to be congruent to m mod n.

Quantification The quantifiers are of the form $$\forall (x_1, \ldots, x_k)$$

or $$\exists (x_1, \ldots, x_k)$$

where each of the $x_i$ are variables that can then appear in future predicate instances. In addition to the two classical quantifiers above, we also introduce $$\forall\!\!\!/\, (x_1, \ldots, x_k)$$

where the $\forall\!\!\!/\,$ quantifier means that the variables can take any values that do not cause any of the quantified predicate's instances to become identical. As an example, the axiom saying that only one pigeon can be in each hole now becomes simply $$\forall\!\!\!/\,(p_1, p_2) \forall h. \; \neg in(p_1, h) \vee \neg in(p_2, h)$$

or even $$\forall\!\!\!/\,(p_1, p_2, h). \; \neg in(p_1, h) \vee \neg in(p_2, h)$$

The introduction of the new quantifier should be understood in the light of the discussion of Section 6.1 of ZAP2, where we argued that in many cases, the quantification given by ∀̄ is in fact more natural than that provided by ∀. The ∀̄ quantification is also far easier to represent using augmented clauses, and avoids in many cases the need to introduce or to reason about equality. In any event, ZAP supports both forms of universal quantification.

Here is the quantifier-based encoding of the pigeonhole problem:

---
SORT pigeon 9;
SORT hole 8;
PREDICATE in (pigeon hole);
// quantification-based encoding
NOTEQ (x y) FORALL (z) -in[x z] -in[y z] ;
FORALL(z) EXISTS(h) in[z h] ;
---

This is the nine pigeon instance. The two axioms say directly that no hole z can contain two distinct pigeons x and y (note the use of the NOTEQ or ∀̄), and every pigeon z has to be in some hole h. This encoding is presumably more intuitive than the previous one.

CIRCUIT VERIFICATION AND TEST EXAMPLE

As described above, one application domain in which the present invention can be utilized is for testing a digital logic device. What follows is a description demonstrating a use of the present invention to validate a full adder. A full adder is a digital logic device accepting three inputs, two bits and a carry-in, and producing two outputs, a sum and a carry-out. The full adder implements a truth table as follows:

| CI | A | B | S | CO |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 | where CI is the carry-in, A and B are the input bits, S is the sum, and CO is the carry-out.

The description of the input data representing the full adder in the native domain follows. In the description, the line numbers are for reference only, and comments are preceeded by "//". A hyphen before an element indicates a negation and the individual elements are a disjunction.

| 1 | SORT gate 5; | // gates in the circuit |
| 2 | SORT gtype 3; | // types (xor, and, or) |
| 3 | SORT port 3; | // # inputs/outputs |
| 4 | SORT addin 3; | |
| 5 | SORT addout 2; | |

Lines 1-5 give the types of variables appearing in the problem, and the number of instances of each. In the description of the full adder, there are circuit elements, or gates, (of which there are five), gate types (gtypes, of which there are three—AND, OR and XOR), and ports (each gate has three ports, two inputs and one output). There are also the three inputs to the adder, and the two outputs.

| 6 | PREDICATE type(gate gtype); |
| 7 | PREDICATE val(port gate); |
| 8 | PREDICATE input(addin); |
| 9 | PREDICATE output(addout); |

Lines 6-9 give the predicates that are used to describe the circuit. The description says that a gate is of a particular type, or that the value of a port on a gate is true or false (corresponding to high and low circuit values, respectively). The description can also specify values for the inputs and outputs of the entire circuit.

| 10 | GROUP xor val[1 1] val[2 1] val[3 1] %2= 0 ; |
| 11 | GROUP gates FORALL(g) type[g 1] val[1 g] val[2 g] -val[3 g] ; |
| 12 | -type[1 1] val[1 1] val[2 1] -val[3 1] GROUP xor gates ; |

Lines 10-12 describe the behavior of XOR gates. Lines 10-11 specify two groups that will be used. The first group (line 10) says that the sum of the two inputs and the output is equivalent to zero mod 2. The second group (line 11) says that if a gate is an XOR gate (type 1) and the first two inputs are false, the output must be false. Note that these two lines do not actually say anything about the circuit in question; they simply define groups that are used in line 12, where the axiom describing XOR gates is presented.

| 13 | NOTEQ(g i) -type[g 2] val[i g] -val[3 g] ; |
| 14 | NOTEQ(g) -type[g 2] -val[1 g] -val[2 g] val[3 g] ; |
| 15 | NOTEQ(g i) -type[g 3] -val[i g] val[3 g] ; |
| 16 | NOTEQ(g) -type[g 3] val[1 g] val[2 g] -val[3 g] ; |

Lines 13-14 describe AND gates, saying that if g is of type 2 (AND) and any input of g is false, then the output is false. The NOTEQ quantifier is universal but requires that the arguments remain distinct, so that an instance of line 13 is –type[1 2] val[1 2] –val[3 2]

saying that if gate 1 is of type 2 (an AND gate) and port 1 is false, then port 3 must be false as well. Note that –type[1 2] val[3 2] –val[3 2]

is not an instance of line 13, since val[3 2] appears twice in the above candidate axiom. Line 14 says that if both inputs to an AND gate are true, the output will be true as well. Lines 15-16 are similar, but describe OR gates instead of AND gates.

| 17 | type[1 3]; | // OR gate |
| 18 | type[2 1]; | // first XOR |
| 19 | type[3 1]; | // second XOR |
| 20 | type[4 2]; | // first AND |
| 21 | type[5 2]; | // second AND |

Lines 17-21 give the gate types for the components of the full adder. The gate types are indicated by the comments.

| 22 | input[1] val[1 2] %2= 0; |
| 23 | input[1] val[1 4] %2= 0; |
| 24 | input[2] val[2 2] %2= 0; |
| 25 | input[2] val[2 4] %2= 0; |

```
26    input[3] val[2 3] %2= 0;
27    input[3] val[2 5] %2= 0;
28    val[3 2] val[1 3] %2= 0;
29    val[3 2] val[1 5] %2= 0;
30    val[3 4] val[2 1] %2= 0;
31    val[3 5] val[1 1] %2= 0;
32    val[3 3] output[1] %2= 0;
33    val[3 1] output[2] %2= 0;
```

Lines 22-33 describe the "circuit diagram," i.e., the lines describe how the gates are connected. If two points are connected, they must have the same value, which means that they must sum to zero mod 2. Thus, line 22 says that the first input to the adder is connected to port 1 of gate 2. Line 28 says that port 3 of gate 2 is connected to port 1 of gate 3. Line 32 says that port 3 of gate 3 (the output of the second XOR gate) is connected to output 1 of the adder itself.

```
34    -input[1] -input[2] -input[3] -output[1] -output[2];
35    -input[1] -input[2]  input[3]  output[1] -output[2];
36    -input[1]  input[2] -input[3]  output[1] -output[2];
37    -input[1]  input[2]  input[3] -output[1]  output[2];
38     input[1] -input[2] -input[3]  output[1] -output[2];
39     input[1] -input[2]  input[3] -output[1]  output[2];
40     input[1]  input[2] -input[3] -output[1]  output[2];
41     input[1]  input[2]  input[3]  output[1]  output[2];
```

Lines 34-41 say that the circuit is failing in some way. For example, line 34 says:

input 1 is not on OR input 2 is not on OR input 3 is not on OR output 1 is not on OR output 2 is not on.

This statement is equivalent to (input 1 on & input 2 on & input 3 on) IMPLIES (output 1 off OR output 2 off), which is another way of saying that if all of the inputs are true, then one of the outputs is false. This implication can be satisfied by producing a model where either one of the input bits is false, or the adder has failed and one of the outputs is false. Since lines 34-41 characterize all possible inputs, it is impossible for all of these antecedents to fail simultaneously, so any model of the overall theory corresponds to a circuit failure for some specific set of inputs.

When this set of axioms is loaded into the database construction module 214, lines 1-11 are used to define the groups and lines 12-41 are used to produce actual database elements in the group theory representation. These database elements are as follows:

```
12    ( [-type[1 1] -val[3 1] val[2 1] val[1 1]] ,
      < ((val[3 1] val[3 2])
      (val[2 1] val[2 2])
      (val[1 1] val[1 2])
      (type[1 1] type[2 1]))
      ((val[3 1] val[3 3] val[3 4] val[3 5])
      (val[2 1] val[2 3] val[2 4] val[2 5])
      (val[1 1] val[1 3] val[1 4] val[1 5])
      (type[1 1] type[3 1] type[4 1] type[5 1]))
      F2:[val[3 1] val[2 1] val[1 1]] > )
```

In this representation, the clause instance appears first, followed by the relevant group. This group is represented in terms of both generators such as ((val[3 1] val[3 2]) (val[2 1] val[2 2]) (val[1 1] val[1 2]) (type[1 1] type[2 1])) and the special shorthand F2:[val[3 1] val[2 1] val[1 1]], corresponding to the group that flips an even number of the three arguments val[3 1], val[2 1], and val[1 1].

The next four database elements (13-16) are similar.

```
13    ( [-type[5 2] -val[3 5] val[2 5]] ,
      < ((val[2 1] val[1 1])
      (val[2 2] val[1 2])
      (val[2 3] val[1 3])
      (val[2 4] val[1 4])
      (val[2 5] val[1 5]))
      ((val[3 1] val[3 5])
      (val[2 1] val[2 5])
      (val[1 1] val[1 5])
      (type[1 2] type[5 2]))
      ((val[3 1] val[3 4])
      (val[2 1] val[2 4])
      (val[1 1] val[1 4])
      (type[1 2] type[4 2]))
      ((val[3 1] val[3 3])
      (val[2 1] val[2 3])
      (val[1 1] val[1 3])
      (type[1 2] type[3 2]))
      ((val[3 1] val[3 2])
      (val[2 1] val[2 2])
      (val[1 1] val[1 2])
      (type[1 2] type[2 2])) > )
14    ( [-type[1 2] -val[1 1] -val[2 1] val[3 1]] ,
      < ((val[3 1] val[3 2])
      (val[2 1] val[2 2])
      (val[1 1] val[1 2])
      (type[1 2] type[2 2]))
      ((val[3 1] val[3 3] val[3 4] val[3 5])
      (val[2 1] val[2 3] val[2 4] val[2 5])
      (val[1 1] val[1 3] val[1 4] val[1 5])
      (type[1 2] type[3 2] type[4 2] type[5 2])) > )
15    ( [-type[5 3] -val[1 5] val[3 5]] ,
      < ((val[2 1] val[1 1])
      (val[2 2] val[1 2])
      (val[2 3] val[1 3])
      (val[2 4] val[1 4])
      (val[2 5] val[1 5]))
      ((val[3 1] val[3 5])
      (val[2 1] val[2 5])
      (val[1 1] val[1 5])
      (type[1 3] type[5 3]))
      ((val[3 1] val[3 4])
      (val[2 1] val[2 4])
      (val[1 1] val[1 4])
      (type[1 3] type[4 3]))
      ((val[3 1] val[3 3])
      (val[2 1] val[2 3])
      (val[1 1] val[1 3])
      (type[1 3] type[3 3]))
      ((val[3 1] val[3 2])
      (val[2 1] val[2 2])
      (val[1 1] val[1 2])
      (type[1 3] type[2 3])) > )
16    ( [-type[1 3] -val[3 1] val[2 1] val[1 1]] ,
      < ((val[3 1] val[3 2])
      (val[2 1] val[2 2])
      (val[1 1] val[1 2])
      (type[1 3] type[2 3]))
      ((val[3 1] val[3 3] val[3 4] val[3 5])
      (val[2 1] val[2 3] val[2 4] val[2 5])
      (val[1 1] val[1 3] val[1 4] val[1 5])
      (type[1 3] type[3 3] type[4 3] type[5 3])) > )
```

For database elements 17-21, the original axiom did not include a group and the group in the new version is therefore trivial.

```
17    ( [type[1 3]] , < > )
18    ( [type[2 1]] , < > )
19    ( [type[3 1]] , < > )
```

| | | |
|---|---|---|
| 20 | ( [type[4 2]] , < > ) | |
| 21 | ( [type[5 2]] , < > ) | |

Database elements 22-33 (the circuit diagram) include the group corresponding to the mod 2 constraint.

| | |
|---|---|
| 22 | ( [-val[1 2] input[1]] , < F2:[val[1 2] input[1]] > ) |
| 23 | ( [-val[1 4] input[1]] , < F2:[val[1 4] input[1]] > ) |
| 24 | ( [-val[2 2] input[2]] , < F2:[val[2 2] input[2]] > ) |
| 25 | ( [-val[2 4] input[2]] , < F2:[val[2 4] input[2]] > ) |
| 26 | ( [-val[2 3] input[3]] , < F2:[val[2 3] input[3]] > ) |
| 27 | ( [-val[2 5] input[3]] , < F2:[val[2 5] input[3]] > ) |
| 28 | ( [-val[1 3] val[3 2]] , < F2:[val[3 2] val[1 3]] > ) |
| 29 | ( [-val[1 5] val[3 2]] , < F2:[val[3 2] val[1 5]] > ) |
| 30 | ( [-val[2 1] val[3 4]] , < F2:[val[2 1] val[3 4]] > ) |
| 31 | ( [-val[1 1] val[3 5]] , < F2:[val[1 1] val[3 5]] > ) |
| 32 | ( [-output[1] val[3 3]] , < F2:[val[3 3] output[1]] > ) |
| 33 | ( [-output[2] val[3 1]] , < F2:[val[3 1] output[2]] > ) |

Database elements 34-41 once again include the trivial group.

| | |
|---|---|
| 34 | ( [-output[2] -output[1] -input[3] -input[2] -input[1]] , < > ) |
| 35 | ( [-output[2] -input[2] -input[1] input[3] output[1]] , < > ) |
| 36 | ( [-output[2] -input[3] -input[1] input[2] output[1]] , < > ) |
| 37 | ( [-output[1] -input[1] input[2] input[3] output[2]] , < > ) |
| 38 | ( [-output[2] -input[3] -input[2] input[1] output[1]] , < > ) |
| 39 | ( [-output[1] -input[2] input[1] input[3] output[2]] , < > ) |
| 40 | ( [-output[1] -input[3] input[1] input[2] output[2]] , < > ) |
| 41 | ( [input[1] input[2] input[3] output[1] output[2]] , < > ) |

Internally, one embodiment of the database construction module 214 replaces the literals in the above axioms (e.g., input[1] or val[3 2]) with distinct integers. This leads to the following database:

| | |
|---|---|
| 12 | ( [-4 -1 2 3] , <br> < ((1 5)(2 6)(3 7)(4 8)) <br> ((1 9 13 17)(2 10 14 18)(3 11 15 19)(4 12 16 20)) <br> F2:[1 2 3] > ) |
| 13 | ( [-25 -17 18] , <br> < ((2 3)(6 7)(10 11)(14 15)(18 19)) <br> ((1 17)(2 18)(3 19)(21 25)) <br> ((1 13)(2 14)(3 15)(21 24)) <br> ((1 9)(2 10)(3 11)(21 23)) <br> ((1 5)(2 6)(3 7)(21 22)) > ) |
| 14 | ( [-21 -3 -2 1] , <br> < ((1 5)(2 6)(3 7)(21 22)) <br> ((1 9 13 17)(2 10 14 18)(3 11 15 19)(21 23 24 25)) > ) |
| 15 | ( [-30 -19 17] , <br> < ((2 3)(6 7)(10 11)(14 15)(18 19)) <br> ((1 17)(2 18)(3 19)(26 30)) <br> ((1 13)(2 14)(3 15)(26 29)) <br> ((1 9)(2 10)(3 11)(26 28)) <br> ((1 5)(2 6)(3 7)(26 27)) > ) |
| 16 | ( [-26 -1 2 3] , <br> < ((1 5)(2 6)(3 7)(26 27)) <br> ((1 9 13 17)(2 10 14 18)(3 11 15 19)(26 28 29 30)) > ) |
| 17 | ( [26] , < > ) |
| 18 | ( [8] , < > ) |
| 19 | ( [12] , < > ) |
| 20 | ( [24] , < > ) |
| 21 | ( [25] , < > ) |
| 22 | ( [-7 31] , < F2:[7 31] > ) |
| 23 | ( [-15 31] , < F2:[15 31] > ) |
| 24 | ( [-6 32] , < F2:[6 32] > ) |
| 25 | ( [-14 32] , < F2:[14 32] > ) |
| 26 | ( [-10 33] , < F2:[10 33] > ) |
| 27 | ( [-18 33] , < F2:[18 33] > ) |
| 28 | ( [-11 5] , < F2:[5 11] > ) |
| 29 | ( [-19 5] , < F2:[5 19] > ) |
| 30 | ( [-2 13] , < F2:[2 13] > ) |
| 31 | ( [-3 17] , < F2:[3 17] > ) |
| 32 | ( [-34 9] , < F2:[9 34] > ) |
| 33 | ( [-35 1] , < F2:[1 35] > ) |
| 34 | ( [-35 -34 -33 -32 -31] , < > ) |
| 35 | ( [-35 -32 -31 33 34] , < > ) |
| 36 | ( [-35 -33 -31 32 34] , < > ) |
| 37 | ( [-34 -31 32 33 35] , < > ) |
| 38 | ( [-35 -33 -32 31 34] , < > ) |
| 39 | ( [-34 -32 31 33 35] , < > ) |
| 40 | ( [-34 -33 31 32 35] , < > ) |
| 41 | ( [31 32 33 34 35] , < > ) |

The query in this example asks "Is there a model of the given theory?" This query is input to the query formation module 216, and from there is passed to the query execution module 218. The query execution module 218 operates on the database 210 and, in the successful case, reports that no model exists (which means that the circuit is correct).

If the circuit were incorrect designed, perhaps by specifying that gate 2 was an OR gate instead of an XOR, axiom 18 would have been type[2 3] instead of type[2 1]. (In the integer version that is eventually analyzed, axiom 18 is ([27] , < >) instead of ([8],< >).

Now the analysis reports that the circuit does have a model, as follows:

| | |
|---|---|
| 1 | input[1] |
| 2 | input[2] |
| 3 | output[1] |
| 4 | output[2] |
| 5 | type[1 3] |
| 6 | type[2 3] |
| 7 | type[3 1] |
| 8 | type[4 2] |
| 9 | type[5 2] |
| 10 | val[1 2] |
| 11 | val[1 3] |
| 12 | val[1 4] |
| 13 | val[1 5] |
| 14 | val[2 1] |
| 15 | val[2 2] |
| 16 | val[2 4] |
| 17 | val[3 1] |
| 18 | val[3 2] |
| 19 | val[3 3] |
| 20 | val[3 4] |

Lines 5-9 simply repeat the requirements of the input theory regarding gate type. Lines 1-2 say that the failing case is that where the two input bits are true (and the carry-in is false, since it is not included). Both the carry-out and sum bits are true (lines 3-4); the sum bit should be off. The values of the intermediate points in the circuit are shown in lines 10-20 and can be used to assist in identifying the source of the problem if desired.

It will be understood that a reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method to search a database for data satisfying a property specified by a query of a type "find element x that satisfies property P", comprising:
    accessing a database containing data within an application domain and encoded in a group theory representation, the encoded data having one or more augmented database elements, where each augmented database element has a pair (c, G) including a database element c and an associated group G of group elements g acting on c and wherein each augmented database element has an associative binary operator acting on the group elements g such that the associative binary operator has an identity and each group element g has an inverse;
    formulating the query in terms of the group theory representation, the formulated query of a type "find database element c and element g of the associated group G, such that g(c) satisfies property P";
    executing the formulated query on the encoded data in the database to identify one or more database elements and group elements in the group theory representation satisfying the query; and
    outputting the one or more database elements and group elements satisfying the query.

2. The method of claim 1, wherein the group elements g are permutations.

3. The method of claim 1, wherein outputting the one or more database elements and group elements satisfying the query comprises:
    converting the one or more database elements and group elements satisfying the query from the group theory representation to a native representation of the data within the application domain; and
    outputting the one or more converted database and group elements satisfying the query.

4. The method of claim 3, wherein database and group elements satisfying the query include a database element c and a group element g of an associated group G, wherein the converting comprises:
    constructing g(c) to produce the database and group elements in the native representation.

5. The method of claim 1, wherein the query comprises a high-level query, the method further comprising:
    generating one or more low-level queries from the high-level query, wherein the formulating step formulates the low-level queries in the group theory representation and wherein the executing step executes the low-level queries on the data in the database.

6. The method of claim 5, the method further comprising:
    generating one or more additional low-level queries responsive to one or more results of one or more previously-executed low-level queries, wherein the formulating step formulates the one or more additional low-level queries in the group theory representation and wherein the executing step executes the one or more additional low-level queries on the data in the database.

7. The method of claim 1, further comprising:
    representing the one or more database elements and group elements satisfying the query as a subgroup, wherein some elements are described explicitly and remaining elements are described in terms of the explicitly described group elements.

8. The method of claim 1, wherein the data within the application domain describe a digital logic device and wherein the query performs a verification and/or test of the device.

9. The method of claim 1, wherein the executing step comprises:
    identifying one or more database elements $c_1, \ldots c_k$ and for each $c_i$, one or more group elements $g_{i1}, \ldots g_{ik}$, such that $g_{ij}(c_i)$ satisfies the query for every i and j.

10. A computer system for using group theory to manipulate data in a database, comprising:
    a processor adapted to execute computer code;
    a computer-readable storage medium storing computer code adapted to execute on the processor, the computer code comprising:
        a database construction module for receiving input data within an application domain in a native representation and for encoding the input data in a group theory representation having one or more augmented database elements, where each augmented database element has a pair (c, G) including a database element c and a group G of group elements g acting on c and where each augmented database element has an associative binary operator acting on the group elements g such that the associative binary operator has an identity and each group element g has an inverse;
        a query formation module for receiving an input query of a type "find an element x that satisfies property P", and for formulating the input query in terms of the group theory representation, the formulated query of a type "find database element c and element g of an associated group G, such that g(c) satisfies property P"; and
        a query execution module for executing the formulated query on the data in the database within the application domain and encoded in the group theory representation to identify one or more database elements and group elements in the group theory representation satisfying the query; and
        outputting the one or more database elements and group elements satisfying the query.

11. The computer system of claim 10, wherein the group elements g are permutations.

12. The computer system of claim 10, further comprising:
    a result construction module for converting the one or more database elements and group elements satisfying the query from the group theory representation to a native representation of the data within the application domain.

13. The computer system of claim 12, wherein database and group elements satisfying the query include a database element c and a group element g of an associated group D, and wherein the result construction module constructs g(c) to produce the database and group elements in the native representation.

14. The computer system of claim 10,
    wherein the query formation module is adapted to receive a high-level input query, and to generate one or more low-level queries responsive to the high-level input query, the one or more low-level queries specifying searches for database elements and group elements in the group theory representation of the data.

15. The computer system of claim 14, wherein the query formation module is further adapted to generate one or more additional low-level queries in response to one or more results of one or more previously-executed low level queries.

16. The computer system of claim 10, further comprising:
a result construction module for representing the one or more database elements and group elements satisfying the query as a subgroup, wherein some elements are described explicitly and remaining elements are described in terms of the explicitly described group elements.

17. The computer system of claim 10, wherein the data within the application domain describe a digital logic device and wherein the query performs a verification and/or test of the device.

18. The system of claim 10, wherein the query execution module identifies one or more database elements $c_1, \ldots c_k$ and for each $c_i$, one or more group elements $g_{i1}, \ldots g_{ik}$, such that $g_{ij}(c_i)$ satisfies the query for every i and j.

19. A computer program product comprising:
a computer-readable storage medium having executable computer program modules embodied therein using group theory to manipulate data in a database, the computer program modules comprising:
a database construction module for receiving input data within an application domain in a native representation and for encoding the input data in a group theory representation having one or more augmented database elements, where each augmented database element has a pair (c, G) including a database element c and a group G of group elements g acting on c and where each augmented database element has an associative binary operator acting on the group elements g such that the associative binary operator has an identity and each group element g has an inverse;
a query formation module for receiving an input query of a type "find an element x that satisfies property P", and for formulating the input query in terms of the group theory representation, the formulated query of a type "find database element c and element g of an associated group G, such that g(c) satisfies property P"; and
a query execution module for executing the formulated query on the data in the database within the application domain and encoded in the group theory representation to identify one or more database elements and group elements in the group theory representation satisfying the query; and
outputting the one or more database elements and group elements satisfying the query.

20. The computer program product of claim 19, wherein the group elements g are permutations.

21. The computer program product of claim 19, further comprising:
a result construction module for converting the one or more database elements and group elements satisfying the query from the group theory representation to a native representation of the data within the application domain.

22. The computer program product of claim 21, wherein database and group elements satisfying the query include a database element c and a group element g of an associated group G, and wherein the result construction module constructs g(c) to produce the database and group elements in the native representation.

23. The computer program product of claim 19, wherein the query formation module is adapted to receive a high-level input query, and to generate one or more low-level queries responsive to the high-level input query, the one or more low level queries specifying searches for database elements in the group theory representation of the data.

24. The computer program product of claim 23, wherein the query formation module is further adapted to generate one or more additional low-level queries in response to one or more results of one or more previously-executed low-level queries.

25. The computer program product of claim 19, further comprising:
a result construction module for representing the one or more database elements and group elements satisfying the query as a subgroup, wherein some elements are described explicitly and remaining elements are described in terms of the explicitly described group elements.

26. The computer program product of claim 19, wherein the data in the application domain describe a digital logic device and wherein the query performs a verification and/or test of the device.

27. The computer program product of claim 19, wherein the query execution module identifies one or more database elements $c_1, \ldots c_k$ and for each $c_i$, one or more group elements $g_{i1}, \ldots g_{ik}$, such that $g_{ij}(c_i)$ satisfies the query for every i and j.

* * * * *

UNITED STATES PATENT AND TRADEMARK OFFICE
CERTIFICATE OF CORRECTION

| | | |
|---|---|---|
| PATENT NO. | : 7,440,942 B2 | Page 1 of 1 |
| APPLICATION NO. | : 10/989982 | |
| DATED | : October 21, 2008 | |
| INVENTOR(S) | : Heidi E. Dixon et al. | |

It is certified that error appears in the above-identified patent and that said Letters Patent is hereby corrected as shown below:

Column 76, line 54, please change "group D" to "group G".

Signed and Sealed this

Seventeenth Day of March, 2009

JOHN DOLL
*Acting Director of the United States Patent and Trademark Office*